(12) United States Patent
Henker et al.

(10) Patent No.: US 11,543,040 B2
(45) Date of Patent: Jan. 3, 2023

(54) VALVE

(71) Applicant: ILLINOIS TOOL WORKS INC., Glenview, IL (US)

(72) Inventors: Michael Henker, Shanghai (CN); Yue Ma, Shanghai (CN)

(73) Assignee: Illinois Tool Works Inc., Glenview, IL (US)

( * ) Notice: Subject to any disclaimer, the term of this patent is extended or adjusted under 35 U.S.C. 154(b) by 24 days.

(21) Appl. No.: 16/741,240

(22) Filed: Jan. 13, 2020

(65) Prior Publication Data

US 2020/0224779 A1  Jul. 16, 2020

(30) Foreign Application Priority Data

Jan. 14, 2019  (CN) .......................... 201910033220.7
Jan. 14, 2019  (CN) .......................... 201910033574.1
Jan. 14, 2019  (CN) .......................... 201910033576.0
Jan. 14, 2019  (CN) .......................... 201910033590.0
Jan. 8, 2020   (CN) .......................... 202010018409.1

(51) Int. Cl.
*F16K 11/16* (2006.01)
*F16K 27/06* (2006.01)

(52) U.S. Cl.
CPC .......... *F16K 11/165* (2013.01); *F16K 27/067* (2013.01)

(58) Field of Classification Search
CPC .. F16K 11/10; F16K 11/165; F16K 31/52466; F16K 31/5284; F16K 11/163;

(Continued)

(56) References Cited

U.S. PATENT DOCUMENTS 2,539,221 A * 1/1951 Badeaux ............... F16K 31/524
                                                    137/599.11
2,941,788 A    6/1960 Braun
(Continued)

FOREIGN PATENT DOCUMENTS

CN     103114902 A    5/2013
DE       1298805 B    9/1969
(Continued)

OTHER PUBLICATIONS

Extended European Search Report for European Patent Application No. 20151523.6 dated Jun. 4, 2020. (9 pages).

(Continued)

*Primary Examiner* — Michael R Reid
(74) *Attorney, Agent, or Firm* — Quarles & Brady LLP

(57) ABSTRACT

This disclosure relates to a valve comprising a housing, an actuating shaft and a plurality of groups of valve body elements. The plurality of groups of valve body elements are disposed in the housing and capable of rotating in the housing. The actuating shaft is configured to selectively actuate at least one group of valve body elements in the plurality of groups of valve body elements to rotate. The valve is provided with a plurality of fluid passages therein, and the actuated at least one group of valve body elements can connect or disconnect at least one of the plurality of fluid passages. The valve provided by the present disclosure can control and switch more fluid passages when an output power of an actuating device is limited.

15 Claims, 44 Drawing Sheets

(58) Field of Classification Search
CPC ........ F16K 11/18; F16K 11/22; F16K 27/067;
B60H 1/00485; B60H 2001/00935
See application file for complete search history.

(56) References Cited

U.S. PATENT DOCUMENTS

| | | | | |
|---|---|---|---|---|
| 4,749,004 | A * | 6/1988 | Peash | F16K 11/165 137/865 |
| 8,082,947 | B2 * | 12/2011 | Chang | F16K 27/067 137/614.01 |
| 9,382,833 | B2 * | 7/2016 | Morein | F16K 11/165 |
| 9,581,253 | B2 * | 2/2017 | Scaramucci | F16K 5/0605 |
| 10,094,268 | B1 | 10/2018 | Russalian | |
| 10,107,175 | B1 | 10/2018 | Bowler et al. | |
| 2004/0130039 | A1 | 7/2004 | Suzuki et al. | |
| 2005/0241702 | A1 | 11/2005 | Blomquist et al. | |
| 2010/0282190 | A1 | 11/2010 | Stoermer | |
| 2013/0048084 | A1 * | 2/2013 | Bartnick | F16K 11/165 137/1 |

FOREIGN PATENT DOCUMENTS

| | | |
|---|---|---|
| DE | 102016004706 B3 | 6/2017 |
| DE | 102016102583 A1 | 8/2017 |
| EP | 0125976 A1 | 11/1984 |

OTHER PUBLICATIONS

First Examination Report from European Patent Application No. 20151523.6 dated Jun. 21, 2021 (7 pages).

* cited by examiner

VALVE

TECHNICAL FIELD

The present disclosure relates to a valve, and in particular to a valve having a plurality of fluid passages.

BACKGROUND

A plurality of fluid passages are usually provided in a cooling system of a vehicle, and are switched according to different needs to cool various heating components in the vehicle. One control method is switching fluid passages through a valve. The valve usually comprises a housing and a valve body. The housing has a plurality of openings, which are respectively used to connect a plurality of pipes in a coolant flow path. An exemplary valve body has a valve body passage capable of fluidly connecting the plurality of openings on the housing. The valve body can rotate in the housing, and through the rotation of the valve body, the relative position of the valve body passage in the valve body and an opening can be changed, so that the valve body passage can be connected to and disconnected from the openings on the housing, and different fluid passages can be formed accordingly to switch the coolant flow path.

The rotation of the valve body is usually actuated by an actuator. In order to prevent the coolant from leaking during the rotation of the valve body, corresponding sealing is required, especially a sealing element is required between each housing opening and the valve body. However, the presence of the sealing element will increase the frictional force borne by the valve body during rotation, and the actuator that actuates the valve body to rotate is required to have a higher output power to overcome the frictional force.

The existing actuator is generally a small motor with a limited output power. When the frictional force is too large, it is necessary to choose a motor with a higher power or a plurality of actuators. Especially with the development of new energy vehicles, coolant flow paths that need to be adjusted in a vehicle will increase, so openings and sealing elements on a housing of a multi-passage valve are required to increase accordingly, but the existing actuator is limited to power and is difficult to meet the requirement.

SUMMARY OF THE DISCLOSURE

The valve provided by the present disclosure can address at least some of the above technical problems. The valve provided by the present disclosure controls a plurality of groups of fluid passages by a plurality of groups of valve body. When fluid passages are switched, at least one group of valve body rotate, other one group or more than one group of valve body do not rotate. Thus, the valve provided by the present disclosure can decrease the frictional force borne by the valve body, so as to control and switch more fluid passages when an output power of an actuating device is limited.

The present disclosure provides a valve, comprising a housing, an actuating shaft and a plurality of groups of valve body elements. The plurality of groups of valve body elements are disposed in the housing and capable of rotating in the housing. The actuating shaft is configured to selectively actuate at least one group of valve body elements in the plurality of groups of valve body elements to rotate. The valve is provided with a plurality of fluid passages therein, and the actuated at least one group of valve body elements can be connected or disconnected at least one of the plurality of fluid passages.

According to the valve, the valve comprises a plurality of engaging and disengaging structures. The actuating shaft is configured to selectively engage with or disengage from at least one group of valve body elements in the plurality of groups of valve body elements through at least one of the plurality of engaging and disengaging structures.

According to the valve, the plurality of groups of valve body elements are arranged substantially at the same height relative to the actuating shaft.

According to the valve, the plurality of groups of valve body elements are arranged at different heights relative to the actuating shaft.

According to the valve, each of the plurality of groups of valve body elements comprises one valve body or a plurality of valve bodies. The plurality of valve bodies are corotated.

According to the valve, the housing is provided with a plurality of housing openings, which are configured to be capable of forming the plurality of fluid passages. Each valve body element in the plurality of groups of valve body elements is provided with at least one valve body acting portion. When the actuated at least one group of valve body elements rotates at a predetermined angle, at least one valve body acting portion in the actuated at least one group of valve body elements cooperates with at least one corresponding housing opening in the plurality of housing openings, thereby selectively connecting at least one fluid passage.

According to the valve, the at least one valve body acting portion comprises at least one valve body opening portion, and when the actuated at least one group of valve body elements rotates at a predetermined angle, at least one valve body opening portion in the actuated at least one group of valve body elements cooperates with at least one of the plurality of housing openings, so that the at least one valve body opening portion selectively opens the at least one of the plurality of housing openings at least partially to selectively connect the at least one fluid passage.

According to the valve, the valve body opening portion of the at least one valve body acting portion is an inlet or an outlet of a valve body passage in the corresponding valve body element, and the at least one fluid passage can be connected through the valve body passage.

According to the valve, the at least one valve body acting portion comprises at least one valve body blocking portion, and when the actuated at least one group of valve body elements rotates at a predetermined angle, at least one valve body blocking portion in the actuated at least one group of valve body elements cooperates with at least one of the plurality of housing openings, so that the at least one valve body blocking portion selectively blocks the at least one of the plurality of housing openings to selectively disconnect the at least one fluid passage.

According to the valve, when the at least one valve body rotates at a predetermined angle, the at least one valve body acting portion can be aligned with and cooperate with the at least one of the plurality of housing openings.

According to the valve, the valve comprises a plurality of sealing elements, each of which is disposed between each of the plurality of housing openings and a corresponding one of the one or more valve body elements.

According to the valve, the plurality of engaging and disengaging structures are configured such that: when one group of the plurality of groups of valve body elements engages with the actuating shaft, the other one or more groups of the plurality of groups of valve body elements disengage from the actuating shaft.

According to the valve, each of the plurality of engaging and disengaging structures comprises an engageable and disengageable actuating structure and an engageable and disengageable actuated structure, the engageable and disengageable actuating structure is provided on the actuating shaft, and the engageable and disengageable actuated structure is disposed on the corresponding one of the plurality of groups of valve body elements.

According to the valve, each of the plurality of engaging and disengaging structures comprises an engageable and disengageable actuating structure and an engageable and disengageable actuated structure. The engageable and disengageable actuating structure is provided on the actuating shaft, and the engageable and disengageable actuated structure is fixedly connected to the corresponding one of the plurality of groups of valve body elements.

In order to fully understand the purpose, features and effects of the disclosure, the following will further explain the concept, specific structure and technical effect of the disclosure in combination with the attached drawings.

BRIEF DESCRIPTION OF THE DRAWINGS

The present disclosure will become easier to understand when the following detailed description is read in conjunction with the accompanying drawings, in which the same reference numerals represent the same parts, wherein.

DETAILED DESCRIPTION OF EMBODIMENTS

Particular embodiments of the present disclosure are described below with reference to the accompanying drawings which constitute part of this description. It is to be understood that although the terms indicating orientations, such as "front", "rear", "upper", "lower", "left", "right", "inner", "outer", "top" and "bottom", are used in the present disclosure to describe structural parts and elements in various examples of the present disclosure, these terms are used herein only for ease of illustration and are determined based on the exemplary orientations as shown in the accompanying drawings. Since the embodiments disclosed in the present disclosure can be arranged in different directions, these terms indicating directions are only illustrative and should not be considered as limitations.

The ordinal numbers such as "first" and "second" used in the present disclosure are only used to distinguish and identify, and do not have any other meanings. Unless otherwise specified, the ordinal numbers neither indicate a specific order, nor have a specific relevance. For example, the term "first element" itself does not imply the existence of "second element", and the term "second element" itself also does not imply the existence of "first element".

Figure 1A:
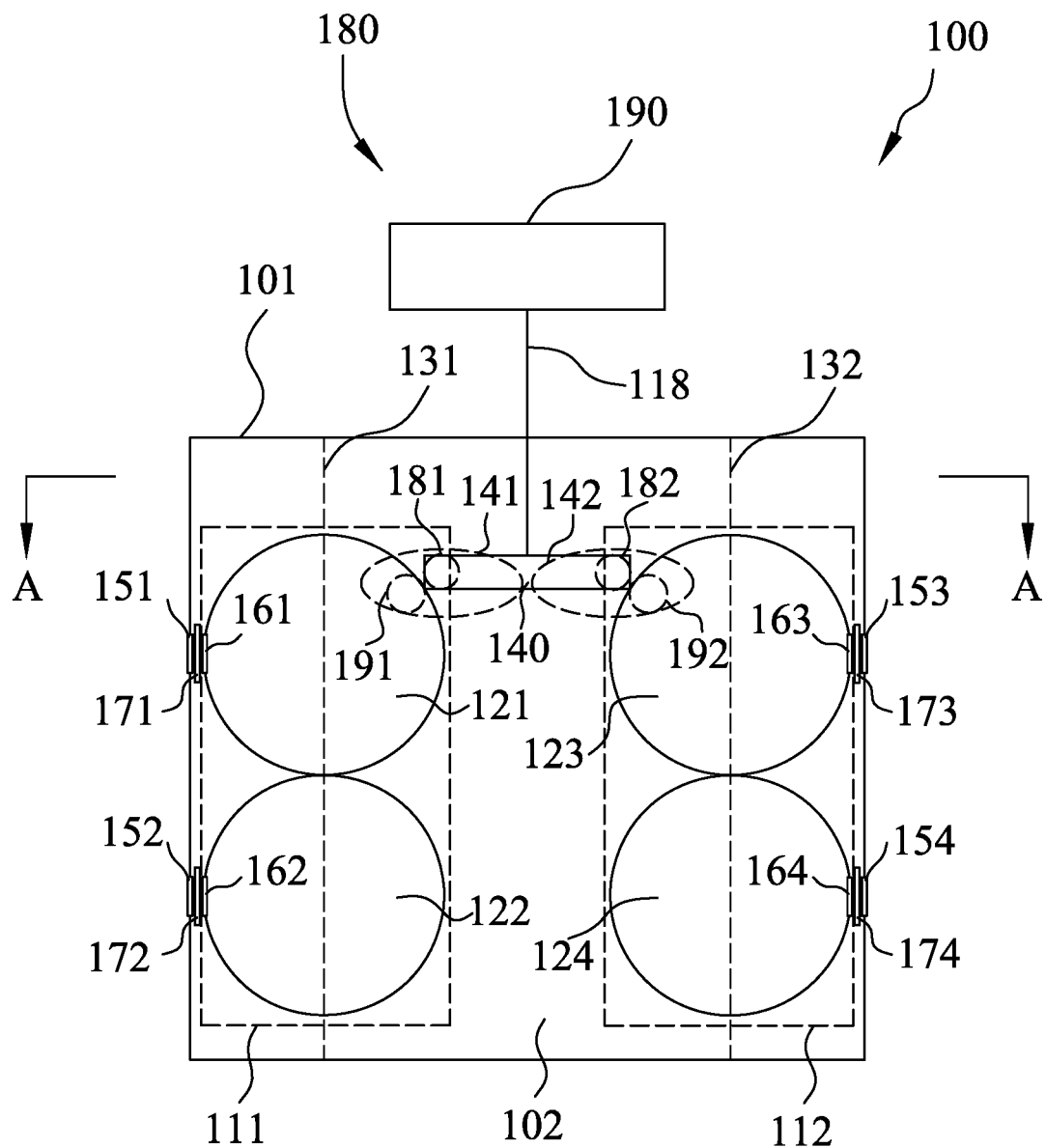
FIG. 1A is a simplified schematic diagram of a first embodiment of a valve of the present disclosure.
Figure 1B:
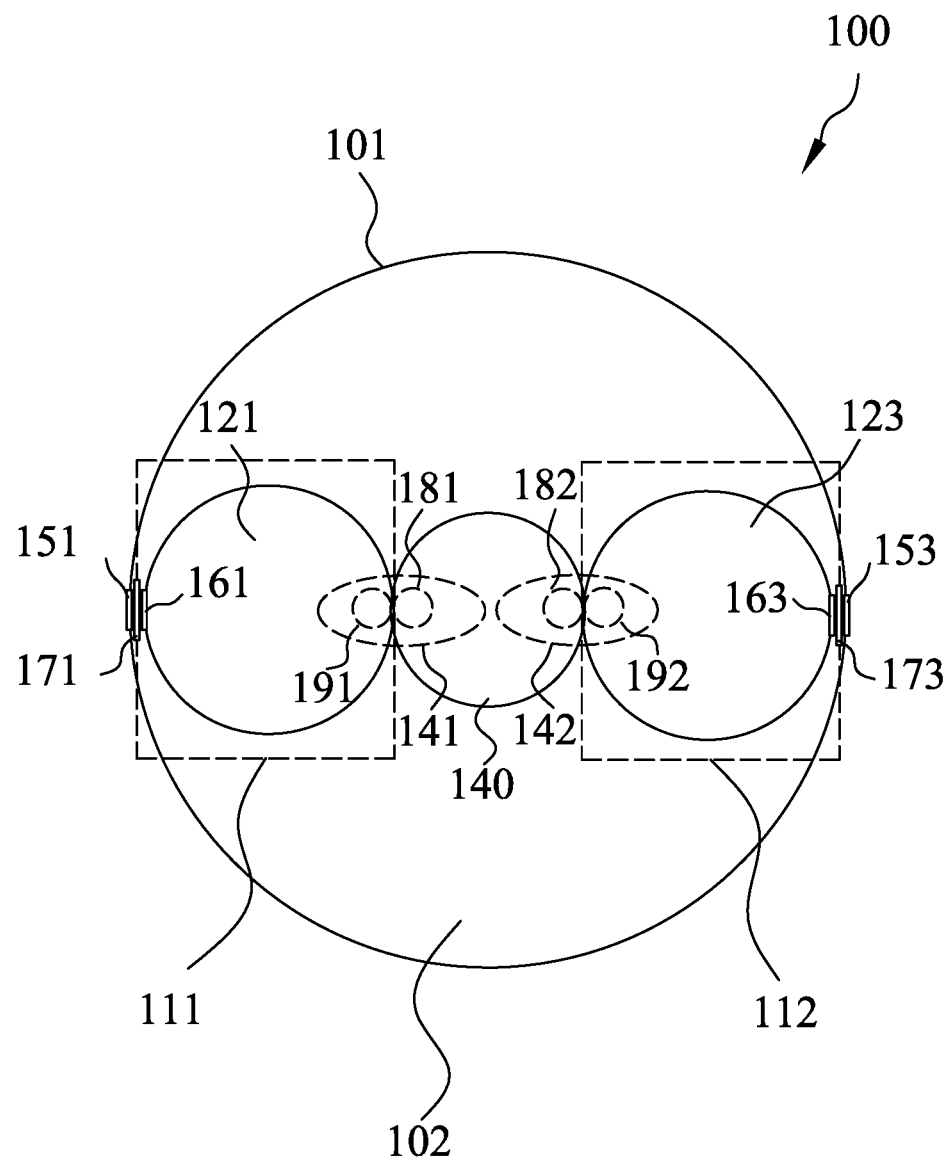
FIG. 1B is a simplified sectional structural diagram of the valve shown in FIG. 1A taken along a line A-A in FIG. 1A.

FIG. 1A is a simplified schematic diagram of a first embodiment of a valve of the present disclosure, showing a schematic structure seen from a side perspective; and FIG. 1B is a simplified sectional structural diagram of the valve 100 shown in FIG. 1A taken along a line A-A in FIG. 1A. As shown in FIG. 1A and FIG. 1B, the valve 100 comprises a housing 101, and the housing 101 has a housing cavity 102 therein. The housing 101 is provided with four housing openings, respectively a first housing opening 151, a second housing opening 152, a third housing opening 153, and a fourth housing opening 154. The housing cavity 102 can fluidly connect the outside of the valve 100 through any one of the first housing opening 151, the second housing opening 152, the third housing opening 153, and the fourth housing opening 154.

The valve 100 further comprises a first group of valve body elements 111 and a second group of valve body elements 112. The first group of valve body elements 111 and the second group of valve body elements 112 are disposed in the housing cavity 102 of the housing 101. The first group of valve body elements 111 comprises a first valve body 121 and a second valve body 122. The first valve body 121 and the second valve body 122 are connected to each other, and are capable of rotating about a rotation axis 131 together (i.e., corotated). The first valve body 121 is spherical, and is provided with a first valve body passage (not shown). One end of the first valve body passage forms a valve body opening portion 161 on the first valve body 121. The first valve body passage can fluidly connect the housing cavity 102. When the valve body opening portion 161 on the first valve body 121 is aligned or partially aligned with the first housing opening 151, the first housing opening 151 is opened by the first valve body 121, and the housing cavity 102 can fluidly connect the outside through the valve body opening portion 161 and the first housing opening 151. When the valve body opening portion 161 on the first valve body 121 is not aligned with the first housing opening 151, the first housing opening 151 is closed or blocked by the first valve body 121, so that the housing cavity 102 cannot fluidly connect the outside through the valve body opening portion 161 and the first housing opening 151. The second valve body 122 is spherical, and is provided with a second valve body passage (not shown). One end of the second valve body passage forms a valve body opening portion 162 on the second valve body 122. The second valve body passage can fluidly connect the housing cavity 102. When the valve body opening portion 162 on the second valve body 122 is aligned or partially aligned with the second housing opening 152, the second housing opening 152 is opened, and the housing cavity 102 can fluidly connect the outside through the valve body opening portion 162 and the second housing opening 152. When the valve body opening portion 162 on the second valve body 122 is not aligned with the second housing opening 152, the second housing opening 152 is closed or blocked by the second valve body 122, so that the housing cavity 102 cannot fluidly connect the outside through the valve body opening portion 162 and the second housing opening 152.

Similarly, the second group of valve body elements 112 comprises a third valve body 123 and a fourth valve body 124. The third valve body 123 and the fourth valve body 124 are connected to each other, and are capable of rotating about a rotation axis 132 together (i.e., corotated). The third valve body 123 is spherical, and is provided with a third valve body passage (not shown). One end of the third valve body passage forms a valve body opening portion 163 on the third valve body 123. The third valve body passage can fluidly connect the housing cavity 102. When the valve body opening portion 163 of the third valve body 123 is aligned or partially aligned with the third housing opening 153, the third housing opening 153 is opened by the third valve body 123, and the housing cavity 102 can fluidly connect the outside through the valve body opening portion 163 and the third housing opening 153. When the valve body opening portion 163 on the third valve body 123 is not aligned with the third housing opening 153, the third housing opening 153 is closed or blocked by the third valve body 123, so that the housing cavity 102 cannot fluidly connect the outside through the valve body opening portion 163 and the third housing opening 153. The fourth valve body 124 is spherical, and is provided with a fourth valve body passage (not shown). One end of the fourth valve body passage forms a valve body opening portion 164 on the fourth valve body 124. The fourth valve body passage can fluidly connect the housing cavity 102. When the valve body opening portion 164 of the fourth valve body 124 is aligned or partially aligned with the fourth housing opening 154, the fourth housing opening 154 is opened by the fourth valve body 124, and the housing cavity 102 can fluidly connect the outside through the valve body opening portion 164 and the fourth housing opening 154. When the valve body opening portion 164 on the fourth valve body 124 is not aligned with the fourth housing opening 154, the fourth housing opening 154 is closed or blocked by the fourth valve body 124, so that the housing cavity 102 cannot fluidly connect the outside through the valve body opening portion 164 and the fourth housing opening 154.

The valve 100 further comprises sealing elements 171, 172, 173, 174. The sealing elements 171, 172, 173, 174 are respectively disposed in the housing 101 and around the housing openings 151, 152, 153, 154 to seal corresponding gaps between the housing openings 151, 152, 153, 154 and one of the valve bodies 121, 122, 123, 124.

The valve 100 further comprises an actuating device 180. The actuating device 180 is configured to actuate the first group of valve body elements 111 and the second group of valve body elements 112 to rotate about the rotation axis 131 and the rotation axis 132, respectively. Specifically, the actuating device 180 comprises an actuator 190 and an actuating shaft 118. The actuating shaft 118 is connected to the actuator 190, so that the actuator 190 can actuate the actuating shaft 118 to rotate.

The valve 100 further comprises a disc 140, a first engaging and disengaging structure 141, and a second engaging and disengaging structure 142. The disc 140 is fixedly connected to the actuating shaft 118. When the actuating shaft 118 rotates, the disc 140 can be actuated to rotate therewith.

Specifically, the first engaging and disengaging structure 141 comprises a first engageable and disengageable actuating structure 181 and a first engageable and disengageable actuated structure 191. The first engageable and disengageable actuating structure 181 is disposed on the disc 140. The first engagable and disengagable actuated structure 191 is provided on the first valve body 121. The first engageable and disengageable actuating structure 181 and the first engageable and disengageable actuated structure 191 are configured to cooperate with each other, so that when the actuating shaft 118 rotates within a first angle range, the actuating shaft 118 can engage with the first group of valve body elements 111, and the first engageable and disengageable actuating structure 181 on the actuating shaft 118 can actuate the first group of valve body elements 111 to rotate.

The second engaging and disengaging structure 142 comprises a second engageable and disengageable actuating structure 182 and a second engageable and disengageable actuated structure 192. The second engageable and disengageable actuating structure 182 is provided on the disc 140. The second engageable and disengageable actuated structure 192 is provided on the second valve body 122. The second engageable and disengageable actuating structure 182 and the second engageable and disengageable actuated structure 192 are configured to cooperate with each other, so that when the actuating shaft 118 rotates within a second angle range, the actuating shaft 118 can engage with the second group of valve body elements 112, and the second engageable and disengageable actuating structure 182 on the actuating shaft 118 can actuate the second group of valve body elements 112 to rotate.

In the embodiment of the present disclosure, the first engageable and disengageable actuating structure 181 and the second engageable and disengageable actuating structure 182 shown in FIG. 1B are arranged on the same disc 140. However, it could be understood by those skilled in the art that the first engageable and disengageable actuating structure 181 and the second engageable and disengageable actuating structure 182 may also be fixedly connected to the actuating shaft 118 in other forms.

Figure 2:
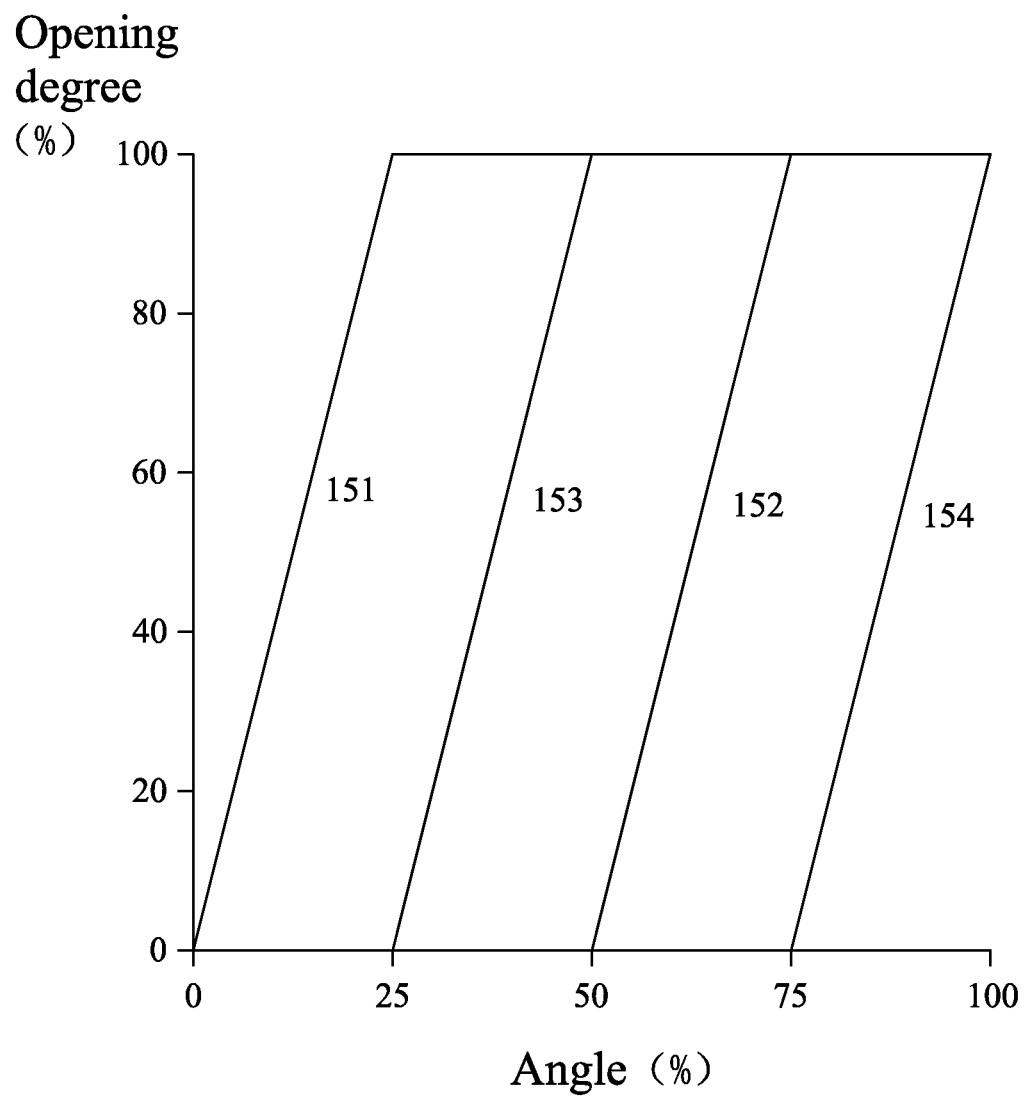
FIG. 2 is a schematic diagram of an embodiment showing the relationships between the rotation angles of the actuating shaft and the opening degrees of the housing openings shown in FIGS. 1A-1B.

FIG. 2 is a schematic diagram of an embodiment showing the relationships between the rotation angles of the actuating shaft 118 and the opening degrees of the housing openings 151, 152, 153, 154 shown in FIGS. 1A-1B. In the embodiment of FIG. 2, a 100% angle indicates that the rotatable angle of the actuating shaft 118 is 360°. When the housing openings 151, 152, 153, 154 are completely opened by the corresponding valve bodies, the opening degree is 100%; and when the housing openings 151, 152, 153, 154 are completely closed or blocked by the corresponding valve bodies, the opening degree is 0%. It could be understood by those skilled in the art that the 100% angle may also indicate that the rotatable angle of the actuating shaft 118 is 90°, 180°, or any other angle.

As shown in FIG. 2, when the actuating shaft 118 rotates within an angle range of 0-25%, the area of alignment between the valve body opening portion 161 of the first valve body 121 and the first housing opening 151 gradually increases, so that the opening degree of the first housing opening 151 is gradually changed from 0% to 100%. When the actuating shaft 118 rotates within an angle range of 25-100%, the valve body opening portion 161 of the first valve body 121 and the first housing opening 151 are always aligned, and the opening degree of the first housing opening 151 is maintained at 100%.

Similarly, for the second housing opening 152, when the actuating shaft 118 rotates within an angle range of 0-50%, the area of alignment between the valve body opening portion 162 of the second valve body 122 and the second housing opening 152 is 0%, the second housing opening 152 is closed or blocked by the second valve body 122, and the opening degree of the second housing opening 152 is maintained at 0%. When the actuating shaft 118 rotates within an angle range of 50-75%, the area of alignment between the valve body opening portion 162 of the second valve body 122 and the second housing opening 152 gradually increases, so that the opening degree of the second housing opening 152 is gradually changed from 0% to 100%. When the actuating shaft 118 rotates within an angle range of 75-100%, the valve body opening portion 162 of the second valve body 122 and the second housing opening 152 are always aligned, and the opening degree of the second housing opening 152 is maintained at 100%.

Similarly, for the third housing opening 153, when the actuating shaft 118 rotates within an angle range of 0-25%, the area of alignment between the valve body opening portion 163 of the third valve body 123 and the third housing opening 153 is 0%, the third housing opening 153 is closed or blocked by the third valve body 123, and the opening degree of the third housing opening 153 is maintained at 0%. When the actuating shaft 118 rotates within an angle range of 25-50%, the area of alignment between the valve body opening portion 163 of the third valve body 123 and the third housing opening 153 gradually increases, so that the opening degree of the third housing opening 153 is gradually changed from 0% to 100%. When the actuating shaft 118 rotates within an angle range of 50-100%, the valve body opening portion 163 and the third housing opening 153 are always aligned, and the opening degree of the third housing opening 153 is maintained at 100%.

Similarly, for the fourth housing opening 154, when the actuating shaft 118 rotates within an angle range of 0-75%, the area of alignment between the valve body opening portion 164 of the fourth valve body 124 and the fourth housing opening 154 is 0%, the fourth housing opening 154 is closed or blocked by the fourth valve body 124, and the opening degree is maintained at 0%. When the actuating shaft 118 rotates within an angle range of 75-100%, the area of alignment between the valve body opening portion 164 of the fourth valve body 124 and the fourth housing opening 154 gradually increases, so that the opening degree of the fourth housing opening 154 is gradually changed from 0% to 100%.

In order to control the opening degree shown in FIG. 2, the valve 100 may be configured such that: when the actuating shaft 118 rotates within the angle ranges of 0-25% and 50-75%, the first valve body 121 and the second valve body 122 are actuated by the actuating shaft 118 to rotate, while the third valve body 123 and the fourth valve body 124 are not actuated by the actuating shaft 118 to rotate; and when the actuating shaft 118 rotates within the angle ranges of 25-50% and 75-100%, the first valve body 121 and the second valve body 122 are not actuated by the actuating shaft 118 to rotate, while the third valve body 123 and the fourth valve body 124 are actuated by the actuating shaft 118 to rotate. That is, when the actuating shaft 118 rotates within the angle ranges of 0-25% and 50-75%, the actuating shaft 118 engages with the first group of valve body elements 111, but disengages from the second group of valve body elements 112; and when the actuating shaft 118 rotates within the angle ranges of 25-50% and 75-100%, the actuating shaft 118 disengages from the first group of valve body elements 111, but engages with the second group of valve body elements 112.

Each of the housing openings 151, 152, 153, 154 of the valve 100 is connected to an external pipe, and the opening and closing states of the housing openings 151, 152, 153, 154 can be controlled by controlling the rotation of the valve bodies 121, 122, 123 and 124 relative to the housing 101. A plurality of fluid passages can be formed in the valve 100 by controlling the opening and closing states of the housing openings 151, 152, 153, 154, and the cooperation between the valve bodies 121, 122, 123 and 124. Each fluid passage is used to connect two corresponding housing openings, so that the external pipes connected to the two corresponding housing openings can be connected through the fluid passage. The plurality of fluid passages in the valve 100 can be connected or disconnected by controlling the rotation of the respective valve bodies.

In order to better explain the fluid passages in the valve, the states when the actuating shaft 118 is at the angles of 50% and 75%, respectively, will be described below as an example in conjunction with FIG. 1A and FIG. 2.

If the first housing opening 151 connects a coolant inlet pipe, and the other three housing openings 152, 153, 154 respectively connected three coolant outlet pipes, the valve 100 can be configured such that three fluid passages A, B and C can be formed in the valve 100. The fluid passage A connects the first housing opening 151 and the second housing opening 152, the fluid passage B connects the first housing opening 151 and the third housing opening 153, and the fluid passage C connects the first housing opening 151 and the fourth housing opening 154.

When the actuating shaft 118 is at an angle of 50%, the valve body opening portion 161 on the first valve body 121 is aligned with the first housing opening 151, so that the first housing opening 151 is opened. The valve body opening portion 163 on the third valve body 123 is aligned with the third housing opening 153, so that the third housing opening 153 is opened. The valve body opening portion 162 on the second valve body 122 is not aligned with the second housing opening 152, so that the second housing opening 152 is closed or blocked; and the valve body opening portion 164 of the fourth valve body 124 is not aligned with the fourth housing opening 154, so that the fourth housing opening 154 is closed or blocked. At this time, the fluid passage B that connects the first housing opening 151 and the third housing opening 153 is connected, and the fluid passage A that connects the first housing opening 151 and the second housing opening 152, and the fluid passage C that connects the first housing opening 151 and the fourth housing opening 154 are disconnected.

When the actuating shaft 118 is at an angle of 75%, the valve body opening portion 161 on the first valve body 121 is aligned with the first housing opening 151, so that the first housing opening 151 is opened. The valve body opening portion 162 on the second valve body 122 is aligned with the second housing opening 152, so that the second housing opening 152 is opened. The valve body opening portion 163 on the third valve body 123 is aligned with the third housing opening 153, so that the third housing opening 153 is opened. The valve body opening portion 164 of the fourth valve body 124 is not aligned with the fourth housing opening 154, so that the fourth housing opening 154 is closed or blocked. At this time, the fluid passage B that connects the first housing opening 151 and the third housing opening 153, and the fluid passage A that connects the first housing opening 151 and the second housing opening 152 are both connected, while the fluid passage C that connects the first housing opening 151 and the fourth housing opening 154 is disconnected.

It should be noted that, in the first embodiment, the valve body opening portion 161, 162, 163, 164 on each valve body forms a valve body acting portion, which is used to cooperate with a corresponding housing opening in the plurality of housing openings when the actuated valve body element rotates at a predetermined angle, thereby selectively connecting at least one fluid passage. In other embodiments, the valve body acting portion may also be a valve body blocking portion, which is used to cooperate with at least one of the plurality of housing openings when the actuated valve body element rotates at a predetermined angle, so that the valve body blocking portion selectively blocks at least one of the plurality of housing openings, thereby selectively disconnecting at least one fluid passage. This will be specifically explained in the embodiment shown in FIGS. 25A-25C.

Figure 3:
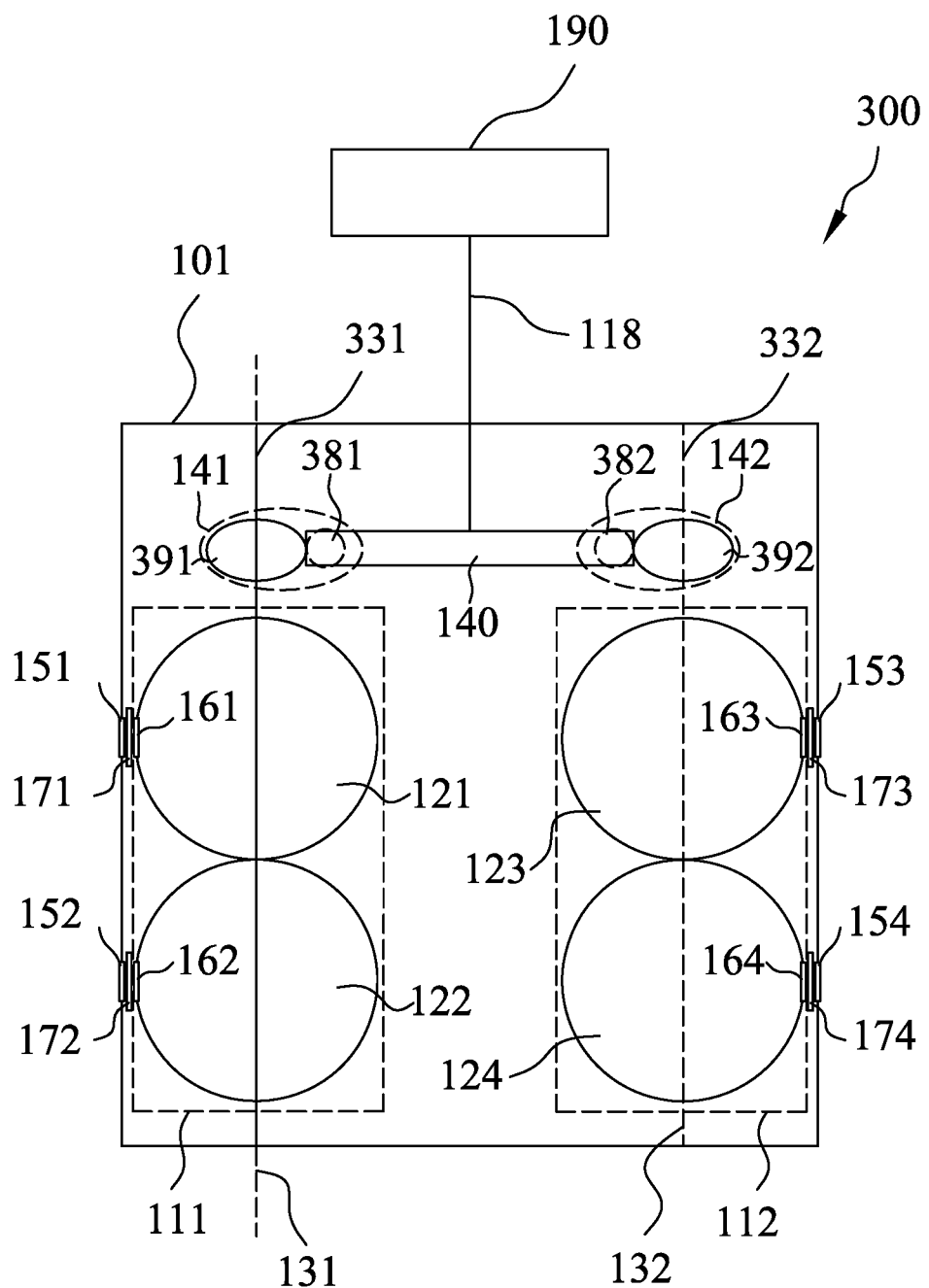
FIG. 3 is a simplified schematic diagram of a second embodiment of a valve of the present disclosure.

FIG. 3 is a simplified schematic diagram of a second embodiment of a valve of the present disclosure. The similarities between the valve 300 shown in FIG. 3 and the valve 100 shown in FIGS. 1A-1B are not described herein again. The difference between the valve 300 shown in FIG. 3 and the valve 100 shown in FIGS. 1A-1B is that: the engageable and disengageable actuated structures of the valve 100 in FIGS. 1A-1B are provided on the valve bodies, while the engageable and disengageable actuated structures of the valve 300 shown in FIG. 3 are fixedly connected to the valve body elements.

Specifically, the valve 300 shown in FIG. 3 comprises a shaft 331 and the first engaging and disengaging structure 141. The shaft 331 is disposed coaxially with the rotation axis 131. The first engaging and disengaging structure 141 comprises a first engageable and disengageable actuating structure 381 and a first engageable and disengageable actuated structure 391. The first engageable and disengageable actuating structure 381 is provided on the disc 140. The first engageable and disengageable actuated structure 391 is provided on the shaft 331, and is fixedly connected to the shaft 331. The first group of valve body elements 111 is also fixedly connected to the shaft 331, so that when the actuating shaft 118 rotates within a first angle range, the actuating shaft 118 can engage with the first group of valve body elements 111, and the first engageable and disengageable actuating structure 381 on the actuating shaft 118 can actuate the first group of valve body elements 111 to rotate.

Similarly, the valve 300 also comprises a shaft 232 and the second engaging and disengaging structure 142. The shaft 332 is disposed coaxially with the rotation axis 132. The second engaging and disengaging structure 142 comprises a second engageable and disengageable actuating structure 382 and a second engageable and disengageable actuated structure 392. The second engageable and disengageable actuating structure 382 is provided on the disc 140. The second engageable and disengageable actuated structure 392 is provided on the shaft 332, and is fixedly connected to the shaft 332. The second group of valve body elements 112 is also fixedly connected to the shaft 232, so that when the actuating shaft 118 rotates within a second angle range, the actuating shaft 118 can engage with the second group of valve body elements 112, and the second engageable and disengageable actuating structure 38 on the actuating shaft 118 can actuate the second group of valve body elements 112 to rotate.

Figure 4:
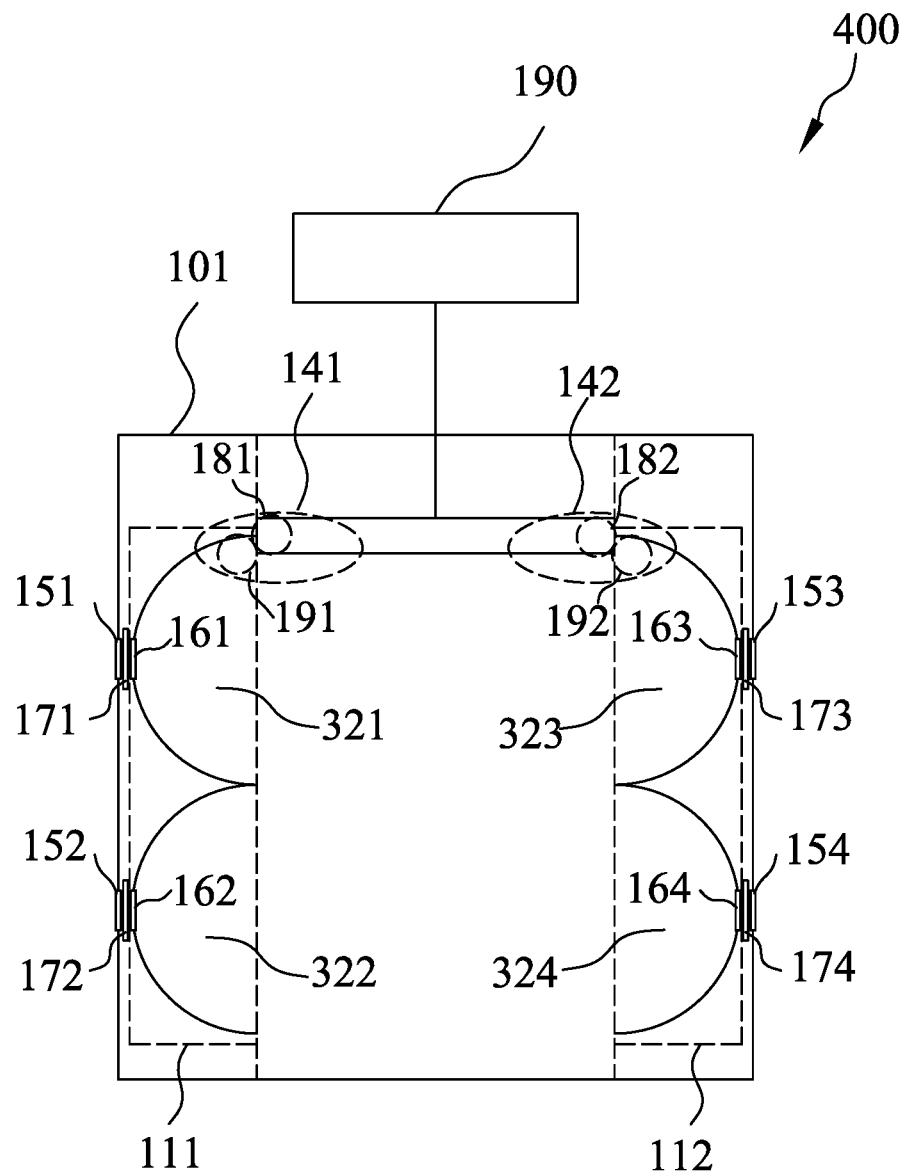
FIG. 4 is a simplified schematic diagram of a third embodiment of a valve of the present disclosure.

FIG. 4 is a simplified schematic diagram of a third embodiment of a valve of the present disclosure. The similarities between the valve 400 shown in FIG. 4 and the valve 100 shown in FIGS. 1A-1B are not described herein again. The difference between the valve 400 shown in FIG. 4 and the valve 100 shown in FIGS. 1A-1B is that: a first valve body 421, a second valve body 422, a third valve body 423, and a fourth valve body 424 of the valve 400 shown in FIG. 4 are hemispherical, while the first valve body 121, the second valve body 122, the third valve body 123, and the fourth valve body 124 of the valve 100 shown in FIGS. 1A-1B are spherical.

It should be noted that the shape of the valve bodies is not limited to the spherical and hemispherical shape exemplified in the present disclosure, but may be any shape, as long as the valve bodies have valve body passages and corresponding valve body opening portions therein.

Figure 5A:
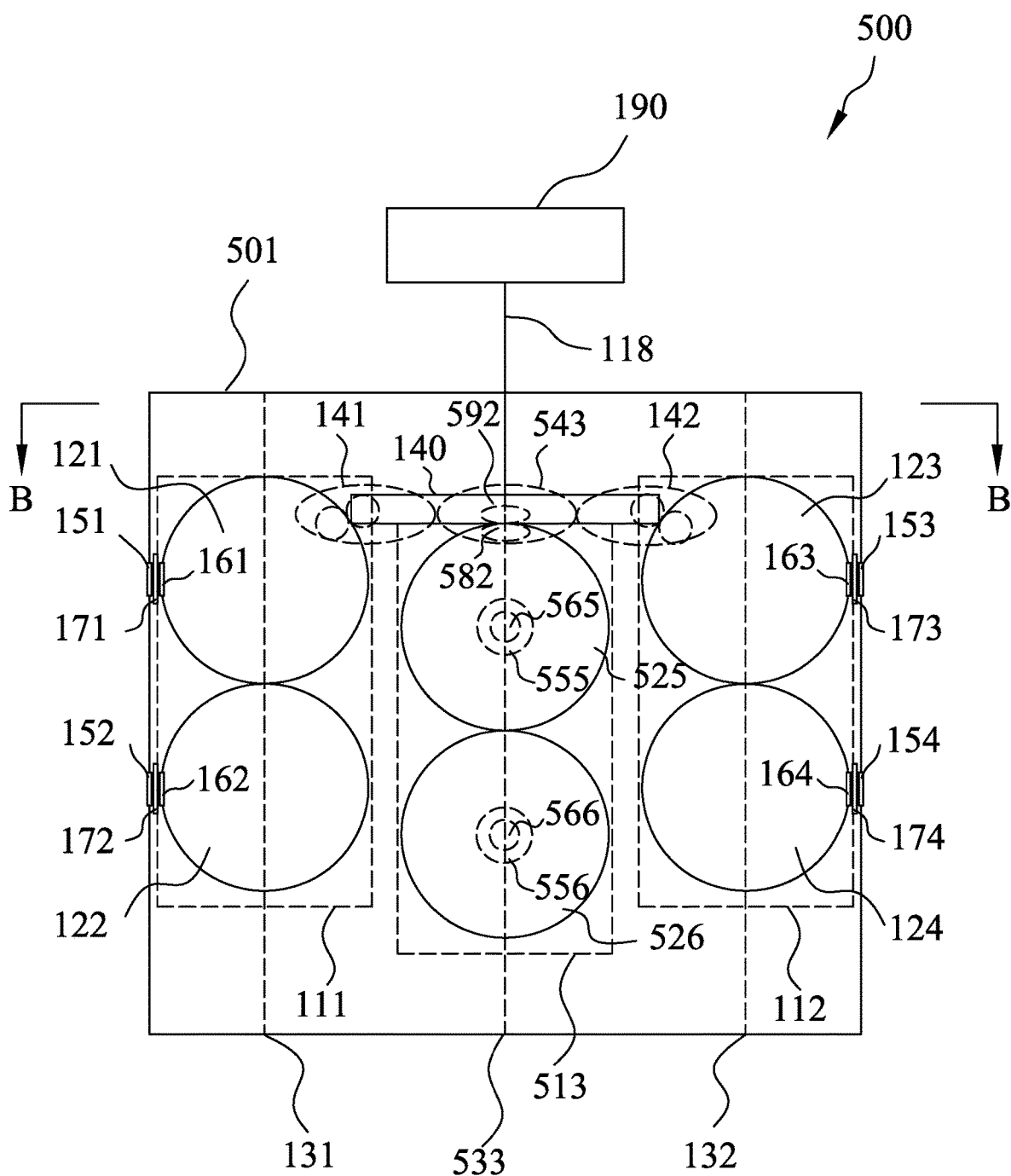
FIG. 5A is a simplified schematic diagram of a fourth embodiment of a valve of the present disclosure.
Figure 5B:
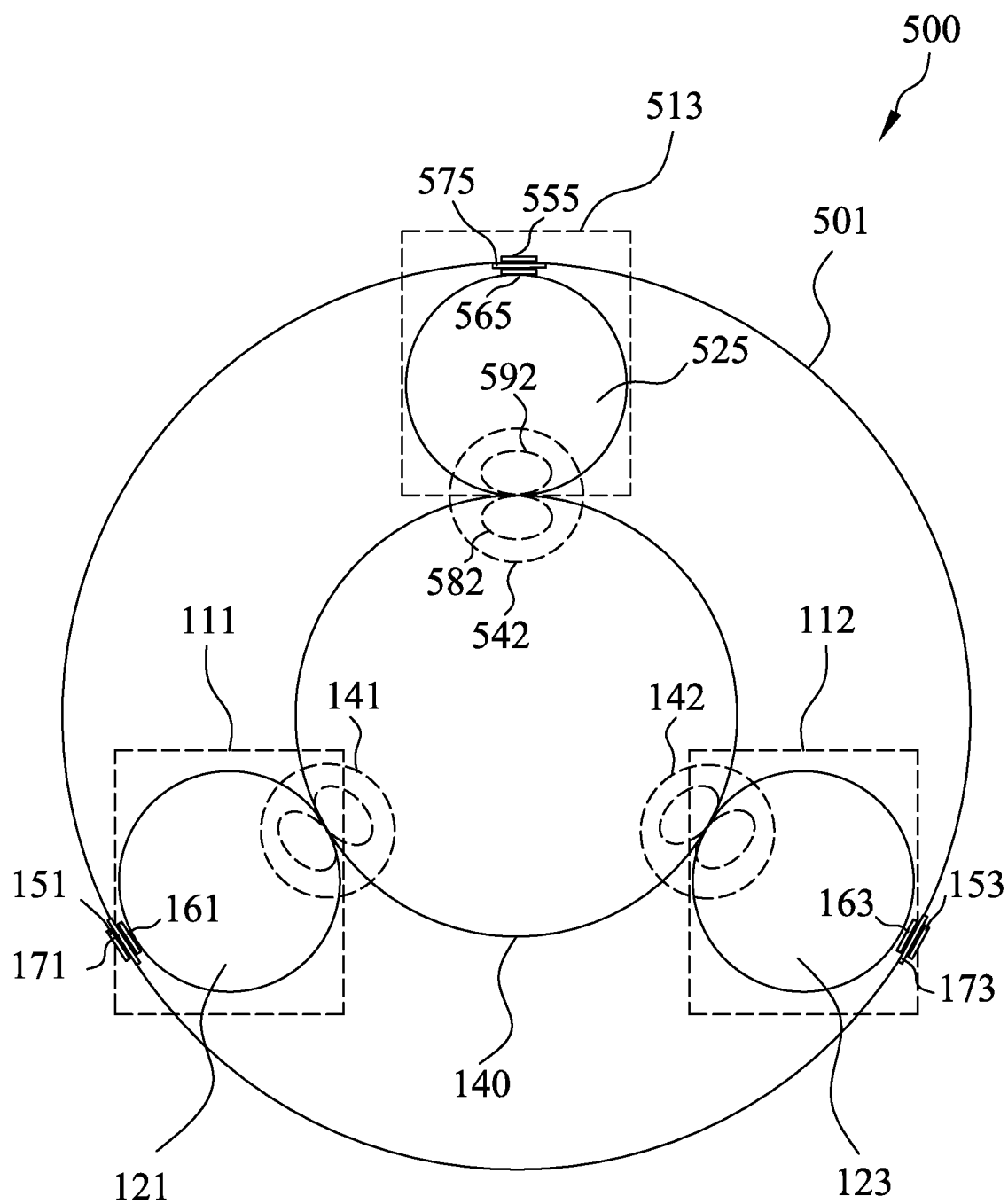
FIG. 5B is a simplified sectional structural diagram of the valve shown in FIG. 5A taken along a line B-B in FIG. 5A.

FIG. 5A is a simplified schematic diagram of a fourth embodiment of a valve of the present disclosure, showing a schematic structure seen from a side perspective; and FIG. 5B is a simplified sectional structural diagram of the valve 500 shown in FIG. 5A taken along a line B-B in FIG. 5A. The similarities between the valve 500 shown in FIGS. 5A-5B and the valve 100 shown in FIGS. 1A-1B are not described herein again. The main difference between the valve 500 shown in FIGS. 5A-5B and the valve 100 shown in FIGS. 1A-1B is that: the valve 500 shown in FIGS. 5A-5B further comprises a third group of valve body elements 513 and a third engaging and disengaging structure 543 cooperating with the same.

Specifically, the third group of valve body elements 513 comprises a fifth valve body 525 and a sixth valve body 526. The fifth valve body 525 and the sixth valve body 526 are connected to each other and can rotate about a rotation axis 533 together. The fifth valve body 525 and the sixth valve body 526 are both spherical, and have respective valve body passages (not shown). One ends of the valve body passages (not shown) form a valve body opening portion 565 and a valve body opening portion 566 on the fifth valve body 525 and the sixth valve body 526, respectively.

Correspondingly, the housing 501 further comprises a fifth housing opening 555 and a sixth housing opening 556, which can be respectively aligned with the valve body opening portions 565, 566 of the third group of valve body elements 513. A sealing element 475 is provided between the fifth housing opening 555 and the fifth valve body 525, and a sealing element (not shown) is provided between the sixth housing opening 556 and the sixth valve body 526.

In addition, the valve 500 further comprises a third engaging and disengaging structure 543. The third engaging and disengaging structure 543 comprises a third engageable and disengageable actuating structure 582 and a third engageable and disengageable actuated structure 592. The third engageable and disengageable actuating structure 582 is provided on the disc 140. The third engageable and disengageable actuated structure 592 is provided on the fifth valve body 525 of the third group of valve body elements 513. The third engageable and disengageable actuating structure 582 and the third engageable and disengageable actuated structure 592 are configured to cooperate with each other, so that when the actuating shaft 118 rotates within a third angle range, the actuating shaft 118 can engage with the third group of valve body elements 513, and the third engageable and disengageable actuating structure 582 on the actuating shaft 118 can actuate the third group of valve body elements 513. The first engaging and disengaging structure 141, the second engaging and disengaging structure 142, and the third engaging and disengaging structure 543 are provided at the same height relative to the actuating shaft 118.

In the embodiments shown in FIGS. 1A-5B, the respective engaging and disengaging structures and the groups of valve body elements are arranged at substantially the same height relative to the actuating shaft 118. By such an arrangement, the valve 100 can be short in height, and can thus be applied to a disclosure environment where the height of the valve is limited.

Figure 6A:
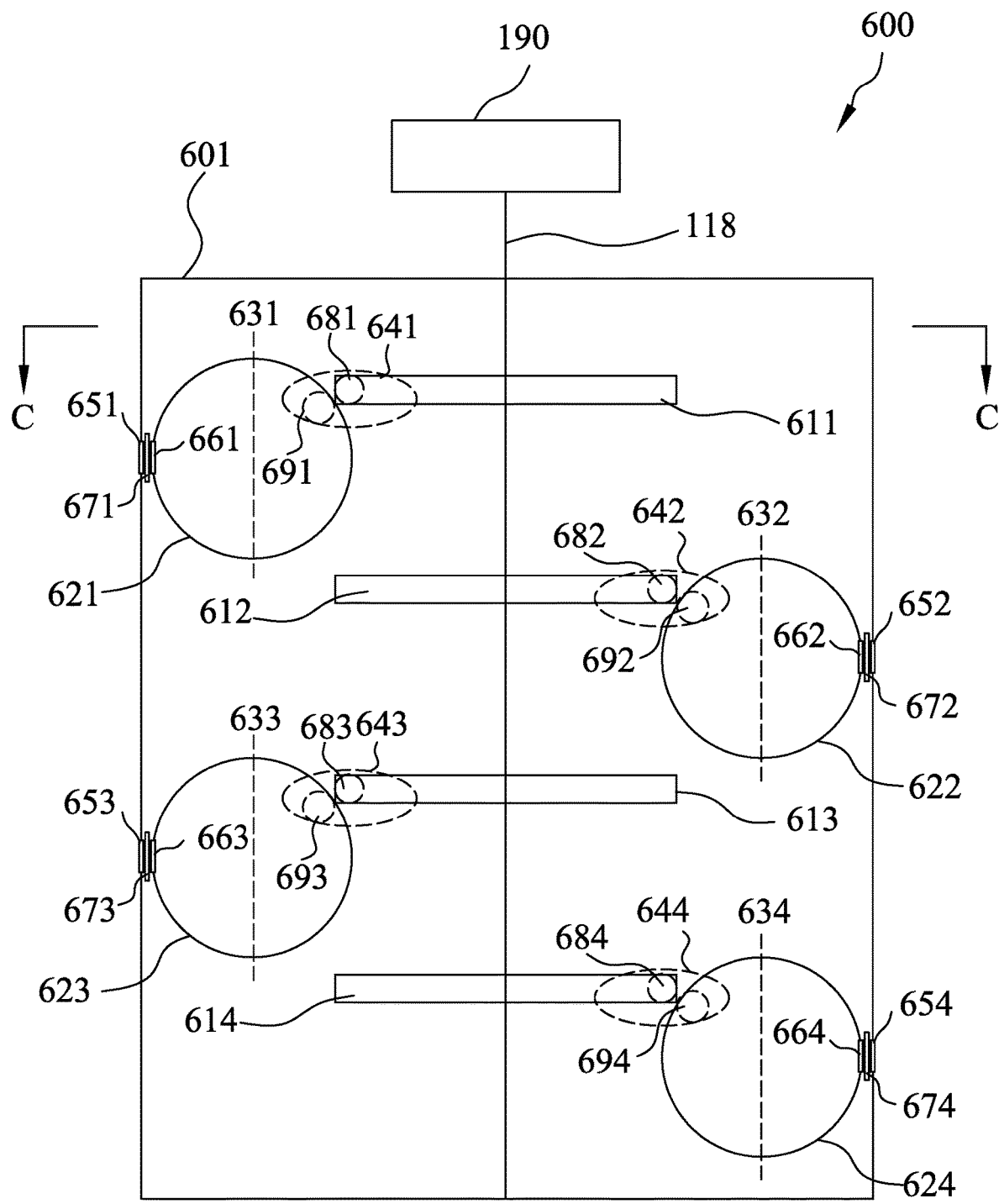
FIG. 6A is a simplified schematic diagram of a fifth embodiment of a valve of the present disclosure, showing a schematic structure seen from a side perspective.
Figure 6B:
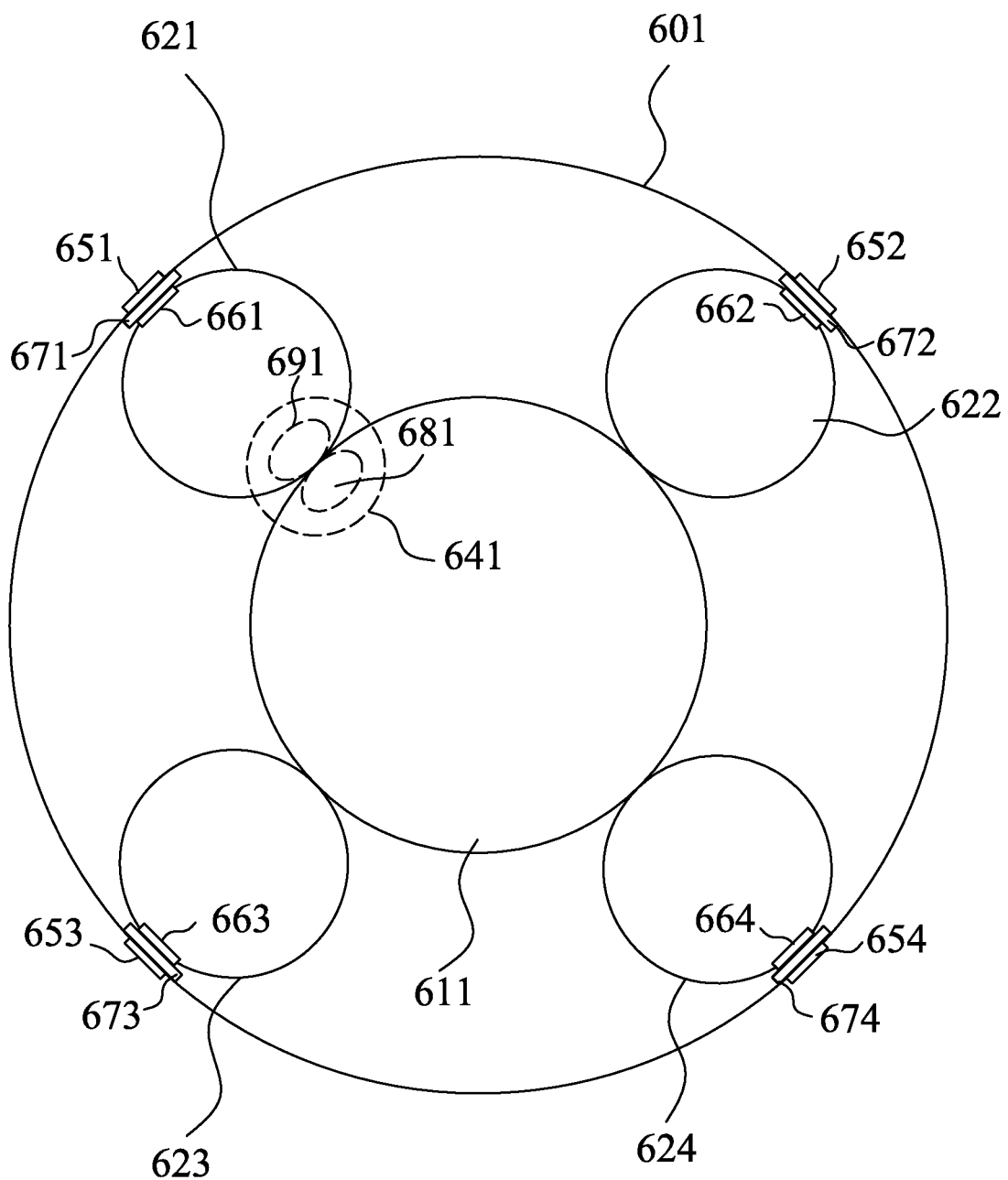
FIG. 6B is a simplified sectional structural diagram of the valve shown in FIG. 6A taken along a line C-C in FIG. 6A.

FIG. 6A is a simplified schematic diagram of a fifth embodiment of a valve of the present disclosure, showing a schematic structure seen from a side perspective; and FIG. 6B is a simplified sectional structural diagram of the valve 600 shown in FIG. 6A taken along a line C-C in FIG. 6A. The similarities between the valve 600 shown in FIGS. 6A-6B and the valve 100 shown in FIGS. 1A-1B are not described herein again. The difference between the valve 600 shown in FIGS. 6A-6B and the valve 100 shown in FIGS. 1A-1B is that: each of a plurality of groups of valve body elements in the valve 600 shown in FIGS. 6A-6B comprises only one valve body element, and each group of valve body elements and a corresponding engaging and disengaging structure are arranged at different heights relative to the actuating shaft 118.

Specifically, the valve 600 comprises a first valve body 621, a second valve body 622, a third valve body 623 and a fourth valve body 624, as well as a first engaging and disengaging structure 641, a second engaging and disengaging structure 642, a third engaging and disengaging structure 643 and a fourth engaging and disengaging structure 644 corresponding to the valve bodies. The specific cooperation relationships between the first valve body 621, the second valve body 622, the third valve body 623 and the fourth valve body 624 and a housing 601 are substantially the same. The specific cooperation relationship will be described below taking the cooperation relationship between the first valve body 621, the first engaging and disengaging structure 641, and the housing 601 as an example.

The first valve body 621 is spherical, and is capable of rotating about a rotation axis 631. The first valve body 621 is provided with a valve body opening portion 661 that can be aligned with a first housing opening 651 on the housing 601. A sealing element 671 is disposed in the housing 601 and around the housing opening 651 to seal a gap between the first housing opening 651 and the first valve body 621.

The first engaging and disengaging structure 641 comprises a first engageable and disengageable actuating structure 681 and a first engageable and disengageable actuated structure 691. The first engageable and disengageable actuating structure 681 is provided on a disc 611. The first engagable and disengagable actuated structure 691 is provided on the first valve body 621. The first engageable and disengageable actuating structure 681 and the first engageable and disengageable actuated structure 691 are configured to cooperate with each other, so that when the actuating shaft 118 rotates within a first angle range, the actuating shaft 118 can engage with the first valve body 621, and the first engageable and disengageable actuating structure 681 on the actuating shaft 118 can actuate the first valve body 621 to rotate.

Similarly, the second engaging and disengaging structure 642, the third engaging and disengaging structure 643 and the fourth engaging and disengaging structure 644 are configured to respectively engage with the second valve body 622, the third valve body 623 and the fourth valve body 624 when the actuating shaft 118 rotates within a second angle range, a third angle range and a fourth angle range, thereby actuating the second valve body 622, the third valve body 623 and the fourth valve body 624 to rotate, so that the valve body opening portions on the first valve body 621, the second valve body 622, the third valve body 623 and the fourth valve body 624 can be aligned with the first housing opening 651, the second housing opening 652, the third housing opening 653 and the fourth housing opening 654, respectively.

Figure 7:
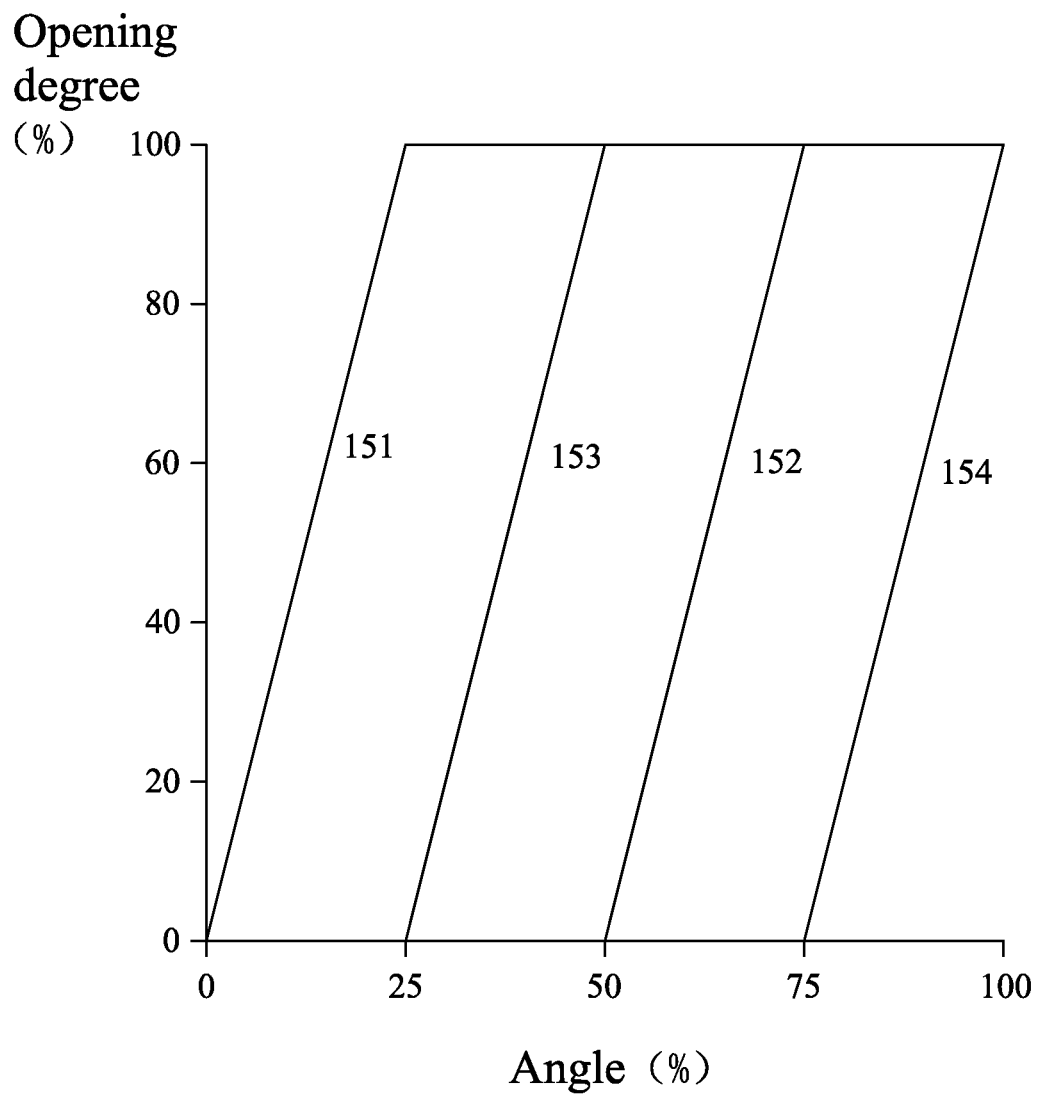
FIG. 7 is a schematic diagram of an embodiment showing the relationships between the rotation angles of the actuating shaft 118 and the opening degrees of the housing openings shown in FIGS. 6A-6B.

FIG. 7 is a schematic diagram of an embodiment showing the relationships between the rotation angles of the actuating shaft 118 and the opening degrees of the housing openings 651, 652, 653, 654 shown in FIGS. 6A-6B. In the embodiment of FIG. 7, a 100% angle indicates that the rotatable angle of the actuating shaft 118 is 360°. When the housing openings 651, 652, 653, 654 are completely opened by the corresponding valve bodies, the opening degree is 100%; and when the housing openings 651, 652, 653, 654 are completely closed or blocked by the corresponding valve bodies, the opening degree is 0%. It could be understood by those skilled in the art that the 100% angle may also indicate that the rotatable angle of the actuating shaft 118 is 90°, 180°, or any other angle.

As shown in FIG. 7, when the actuating shaft 118 rotates within an angle range of 0-25%, the area of alignment between the valve body opening portion 661 of the first valve body 621 and the first housing opening 651 gradually increases, so that the opening degree of the first housing opening 651 is gradually changed from 0% to 100%. When the actuating shaft 118 rotates within an angle range of 25-100%, the valve body opening portion 661 of the first valve body 621 and the first housing opening 651 are always aligned, and the opening degree of the first housing opening 651 is maintained at 100%.

Similarly, for the second housing opening 652, when the actuating shaft 118 rotates within an angle range of 0-50%, the area of alignment between the valve body opening portion 662 of the second valve body 622 and the second housing opening 652 is 0%, the second housing opening 652 is closed or blocked by the second valve body 622, and the opening degree of the second housing opening 652 is maintained at 0%. When the actuating shaft 118 rotates within an angle range of 50-75%, the area of alignment between the valve body opening portion 662 of the second valve body 622 and the second housing opening 652 gradually increases, so that the opening degree of the second housing opening 652 is gradually changed from 0% to 100%. When the actuating shaft 118 rotates within an angle range of 75-100%, the valve body opening portion 662 of the second valve body 622 and the second housing opening 652 are always aligned, and the opening degree of the second housing opening 652 is maintained at 100%.

Similarly, for the third housing opening 653, when the actuating shaft 118 rotates within an angle range of 0-25%, the area of alignment between the valve body opening portion 663 of the third valve body 623 and the third housing opening 653 is 0%, the third housing opening 653 is closed or blocked by the third valve body 623, and the opening degree of the third housing opening 653 is maintained at 0%. When the actuating shaft 118 rotates within an angle range of 25-50%, the area of alignment between the valve body opening portion 663 of the third valve body 623 and the third housing opening 653 gradually increases, so that the opening degree of the third housing opening 653 is gradually changed from 0% to 100%. When the actuating shaft 118 rotates within an angle range of 50-100%, the valve body opening portion 663 and the third housing opening 653 are always aligned, and the opening degree of the third housing opening 653 is maintained at 100%.

Similarly, for the fourth housing opening 654, when the actuating shaft 118 rotates within an angle range of 0-75%, the area of alignment between the valve body opening portion 664 of the fourth valve body 624 and the fourth housing opening 654 is 0%, the fourth housing opening 654 is closed or blocked by the fourth valve body 124, and the opening degree is maintained at 0%. When the actuating shaft 118 rotates within an angle range of 75-100%, the area of alignment between the valve body opening portion 664 of the fourth valve body 624 and the fourth housing opening 654 gradually increases, so that the opening degree of the fourth housing opening 654 is gradually changed from 0% to 100%.

In order to control the opening degree shown in FIG. 2, the valve 100 may be configured such that: when the actuating shaft 118 rotates within an angle range of 0-25%, the actuating shaft 118 engages with the first valve body 621, but disengages from the second valve body 622, the third valve body 623 and the fourth valve body 624, so that the first valve body 621 is actuated by the actuating shaft 118 to rotate, while the second valve body 622, the third valve body 623 and the fourth valve body 624 are not actuated by the actuating shaft 118 to rotate; when the actuating shaft 118 rotates within an angle range of 25-50%, the actuating shaft 118 engages with the third valve body 623, but disengages from the first valve body 621, the second valve body 622 and the fourth valve body 624, so that the third valve body 623 is actuated by the actuating shaft 118 to rotate, while the first valve body 621, the second valve body 622 and the fourth valve body 624 are not actuated by the actuating shaft 118 to rotate; when the actuating shaft 118 rotates within an angle range of 50-75%, the actuating shaft 118 engages with the second valve body 622, but disengages from the first valve body 621, the third valve body 623 and the fourth valve body 624, so that the second valve body 622 is actuated by the actuating shaft 118 to rotate, while the first valve body 621, the third valve body 623 and the fourth valve body 624 are not actuated by the actuating shaft 118 to rotate; and when the actuating shaft 118 rotates within an angle range of 75-100%, the actuating shaft 118 engages with the fourth valve body 6243, but disengages from the first valve body 621, the second valve body 622 and the third valve body 623, so that the fourth valve body 624 is actuated by the actuating shaft 118 to rotate, while the first valve body 621, the second valve body 622 and the third valve body 623 are not actuated by the actuating shaft 118 to rotate.

Each of the housing openings 651, 652, 653, 654 of the valve 600 is connected to an external pipe, and the opening and closing states of the housing openings 651, 652, 653, 654 can be controlled by controlling the rotation of the valve bodies 621, 622, 623, 624 relative to the housing 101. A plurality of fluid passages can be formed in the valve 600 by controlling the opening and closing states of the housing openings 651, 652, 653, 654, and the cooperation between the valve bodies 621, 622, 623, 624; and each fluid passage is used to connect two corresponding housing openings, so that the external pipes connect the two corresponding housing openings can be connected through the fluid passage. The plurality of fluid passages in the valve 600 can be connected or disconnected by controlling the rotation of the respective valve bodies.

Figure 8:
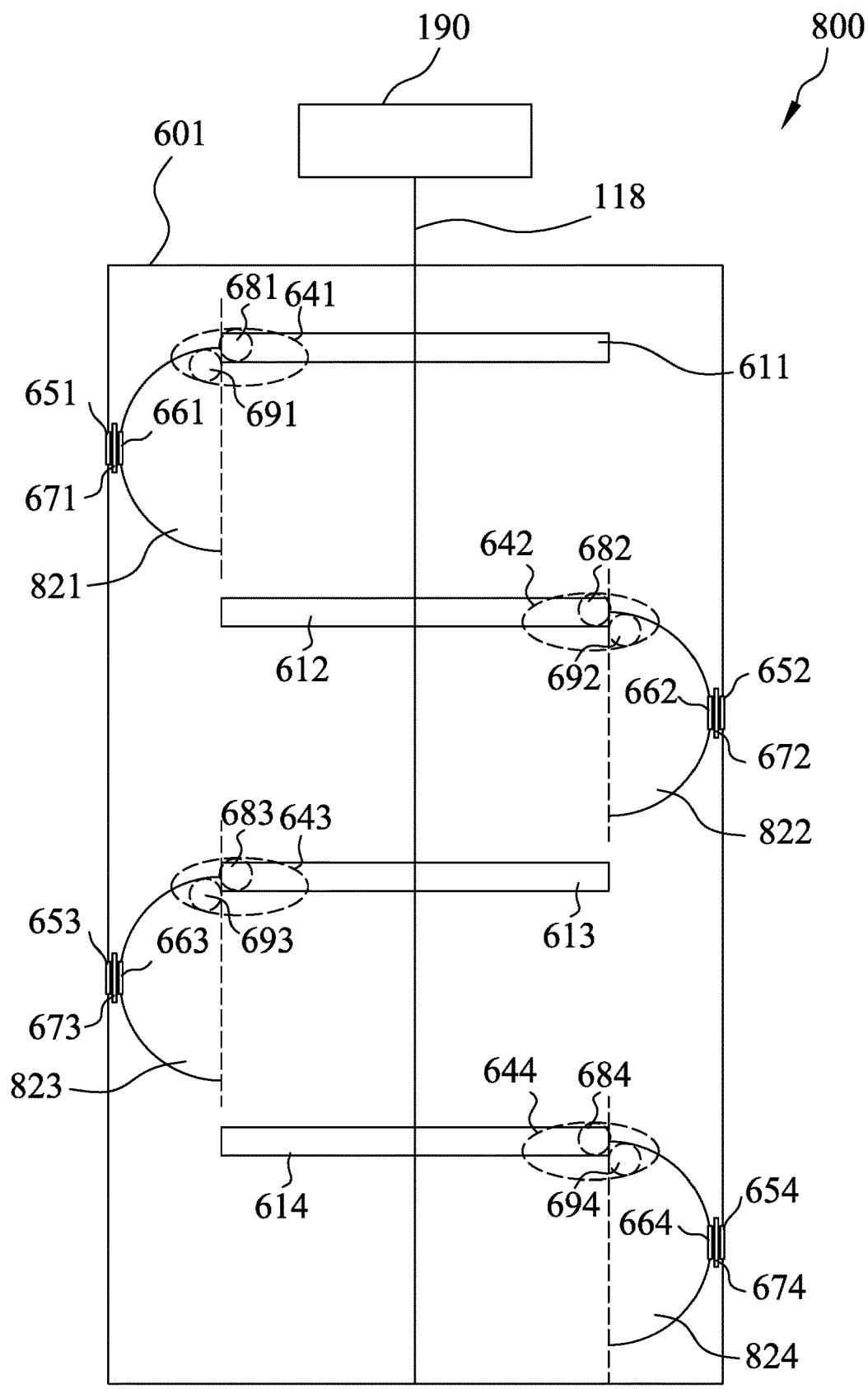
FIG. 8 is a simplified schematic diagram of a sixth embodiment of a valve of the present disclosure.

FIG. 8 is a simplified schematic diagram of a sixth embodiment of a valve of the present disclosure. The similarities between the valve 800 shown in FIG. 8 and the valve 600 shown in FIGS. 6A-6B are not described herein again. The difference between the valve 800 shown in FIG. 8 and the valve 600 shown in FIGS. 6A-6B is that: a first valve body 821, a second valve body 822, a third valve body 823, and a fourth valve body 824 of the valve 800 shown in FIG. 8 are hemispherical, while the first valve body 621, the second valve body 622, the third valve body 623, and the fourth valve body 624 of the valve 600 shown in FIGS. 6A-6B are spherical.

Figure 9:
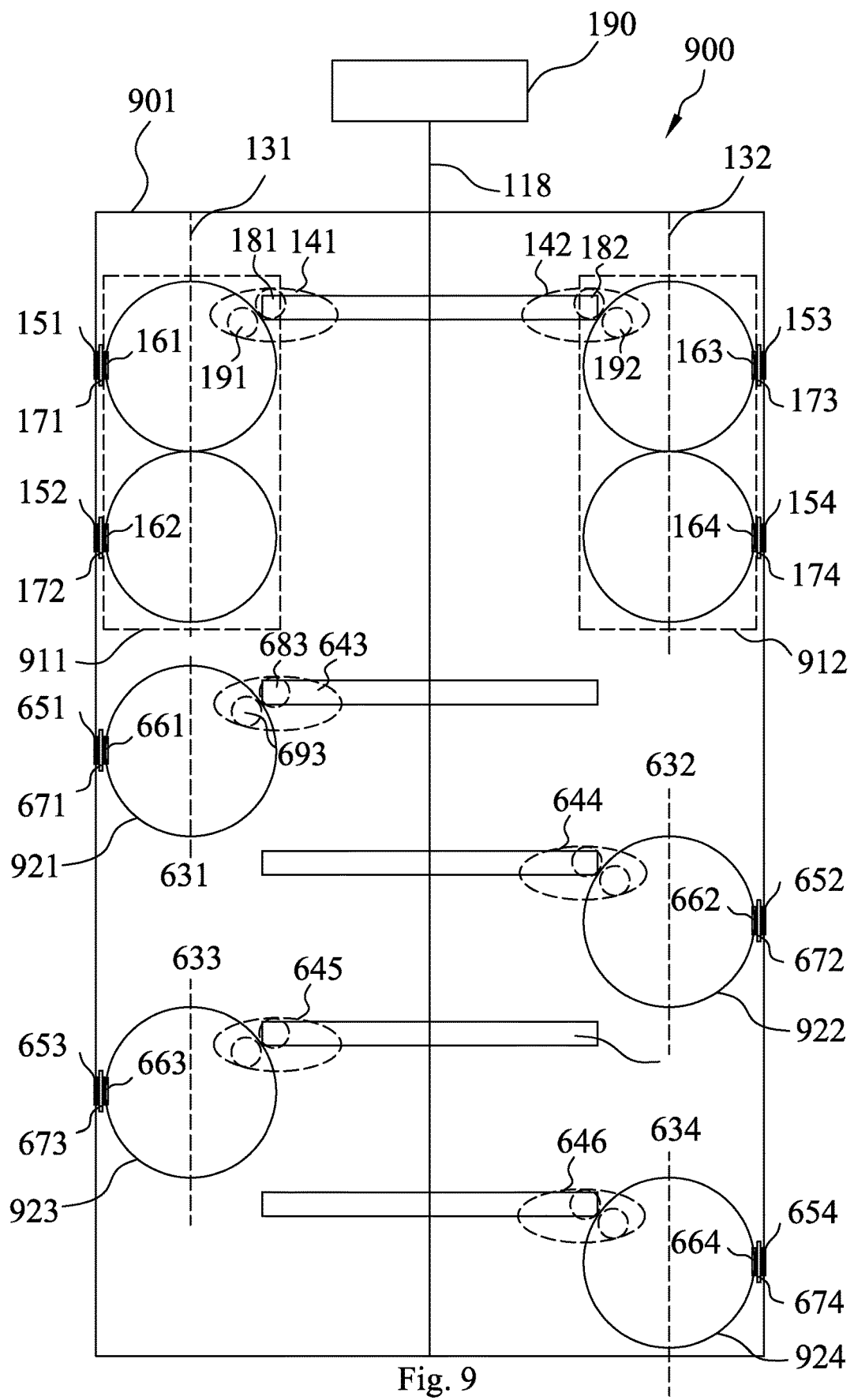
FIG. 9 is a simplified schematic diagram of a seventh embodiment of a valve of the present disclosure.

FIG. 9 is a simplified schematic diagram of a seventh embodiment of a valve of the present disclosure. As shown in FIG. 9, the valve 900 comprises six groups of valve body elements. Each of the first group of valve body elements 911 and the second group of valve body elements 912 comprises two valve bodies connected to each other. The cooperation relationships between the first group of valve body elements 911 and the second group of valve body elements 912, the engaging and disengaging structures and the housing 901 are similar to those of the valve 100 in FIGS. 1A-1B, and details are not described herein again.

The valve 900 also comprises other four groups of valve body elements. Each of the four groups of valve body elements comprises only one valve body element, and the engaging and disengaging structure corresponding to each group of valve body elements is arranged at a different height relative to the actuating shaft 118. Specifically, the four groups of valve body elements respectively comprise: a third valve body element 921, a fourth valve body element 922, a fifth valve body element 923, and a sixth valve body element 924. The cooperation relationships between the third valve body element 921, the fourth valve body element 922, the fifth valve body element 923 and the sixth valve body element 924, the engaging and disengaging structures and the housing 901 are similar to those of the valve 600 in FIGS. 6A-6B, and details are not described herein again.

Figure 10:
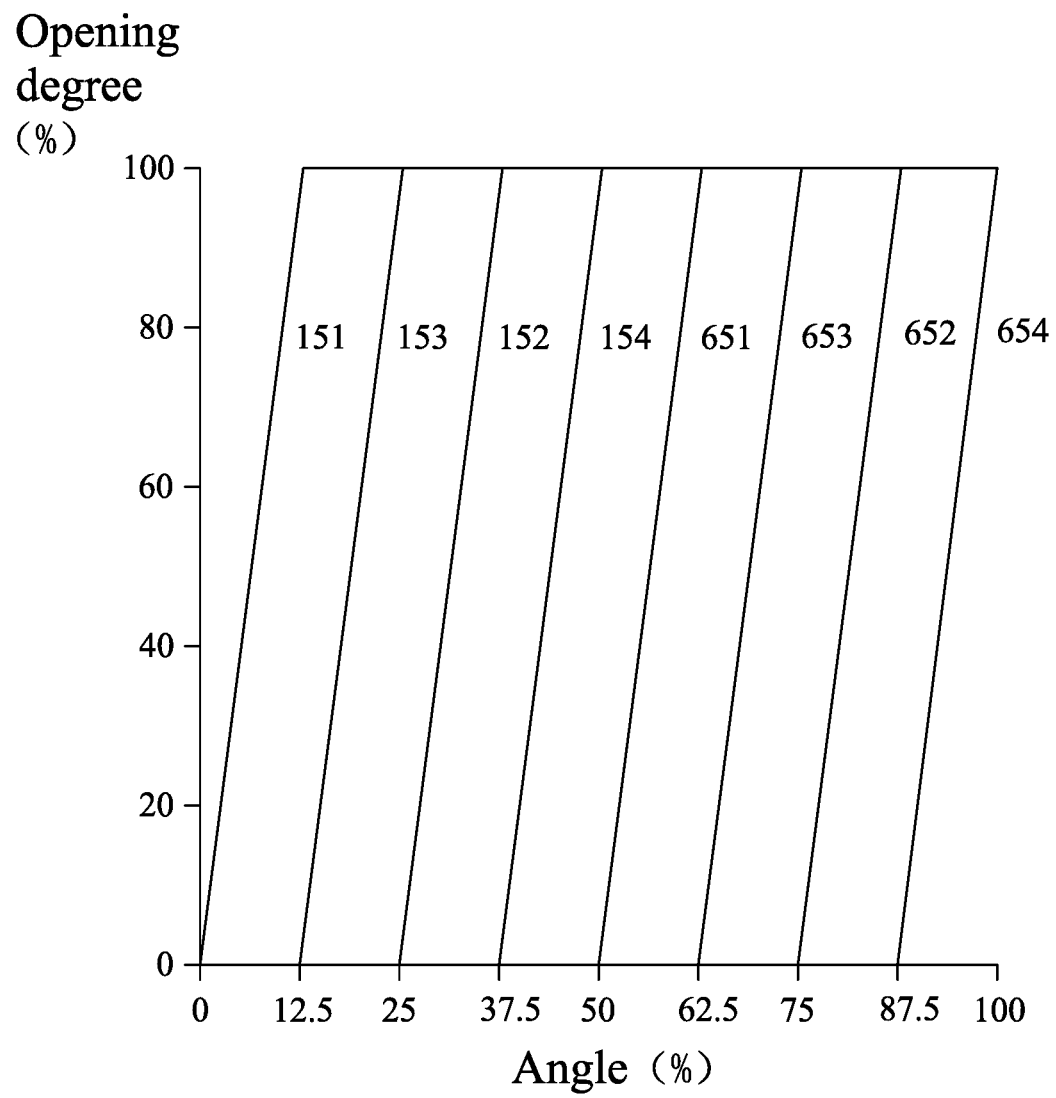
FIG. 10 is a schematic diagram of an embodiment showing the relationships between the rotation angles of the actuating shaft and the opening degrees of the housing openings shown in FIG. 9.

FIG. 10 is a schematic diagram of an embodiment showing the relationships between the rotation angles of the actuating shaft 118 and the opening degrees of the housing openings 151, 152, 153, 154, 651, 652, 653, 654 shown in FIG. 9. The relationships between the rotation angles of the actuating shaft 118 and the housing openings 151, 152, 153, 154, 651, 652, 653, 654 shown in FIG. 10 are similar to those in FIG. 2 and FIG. 7, different fluid passages in the valve 900 can also be connected or disconnected by opening and closing the housing openings 151, 152, 153, 154, 651, 652, 653, 654, and details are not described herein again.

In the embodiment shown in FIG. 6A to FIG. 10, the respective engaging and disengaging structures are arranged at different heights relative to the actuating shaft 118. By such an arrangement, the valve 100 can be small in circumferential size, and can thus be applied to an disclosure environment where the circumferential size of the valve is limited.

It should be noted that although in the embodiments shown in FIG. 1A to FIG. 10, each valve body element is provided with only one valve body opening portion, those skilled in the art could understand that each valve body element may also be provided with a plurality of valve body opening portions, so that different valve body opening portions function when the actuating shaft rotates to different angle ranges.

In the valves shown in FIG. 1A to FIG. 10, a plurality of engaging and disengaging structures can cause the actuating shaft to selectively actuate at least one group of valve bodies in a plurality of groups of valve body elements to rotate, thereby connecting or disconnecting at least one of a plurality of fluid passages in the valve. Since the actuating shaft selectively actuates at least one group of valve bodies in the plurality of groups of valve body elements to rotate at the same time, the actuating shaft only needs to overcome the frictional force generated by the sealing element between the actuated at least one group of valve bodies and the housing, so that when the output power of the actuator 190 is low, the valve body provided with a plurality of sealing elements can also be actuated to rotate. When the valve is required to provide more fluid passages, the housing of the valve is required to be provided with more housing openings, and the more the housing openings are, the more the sealing elements are. When the output power of the actuator is constant, the valve provided by the present disclosure is particularly suitable for disclosures that provide more fluid passages, because the actuating shaft of the valve of the present disclosure only needs to overcome the frictional force generated by the sealing element between the actuated at least one group of valve bodies and the housing, but not to overcome the frictional force generated by all the sealing elements between the valve bodies and the housing. Therefore, the output power of the actuator 190 does not need to increase with the increase of fluid passages in the valve.

The cooperation relationships between the housing, the valve body elements, and the engaging and disengaging structures are illustrated by a specific embodiment below with reference to FIG. 11A to FIG. 24.

Figure 11A:
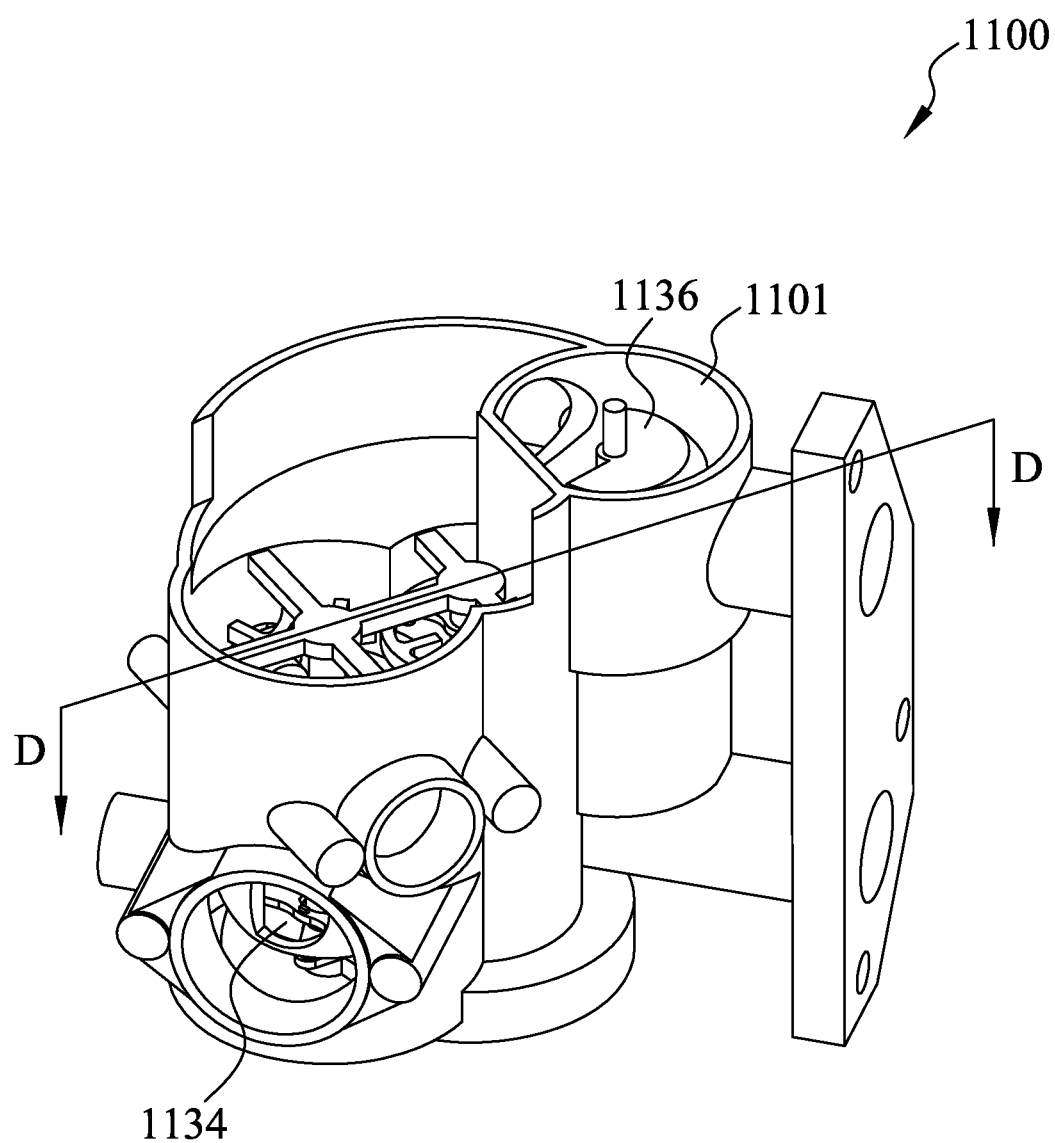
FIG. 11A is a perspective view of a valve according to an eighth embodiment of the present disclosure.
Figure 11B:
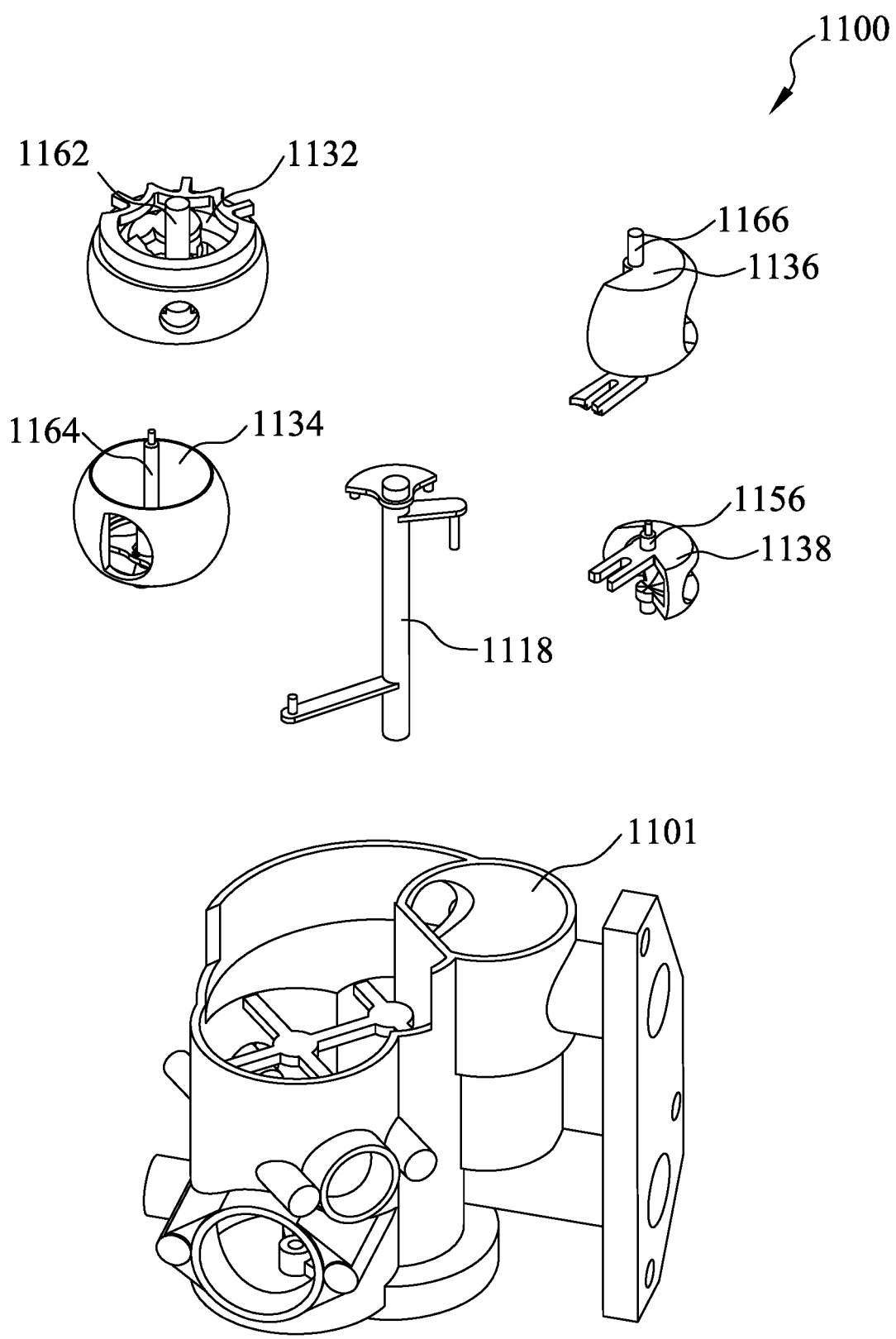
FIG. 11B is an exploded view of the regulating valve shown in FIG. 11A.
Figure 11C:
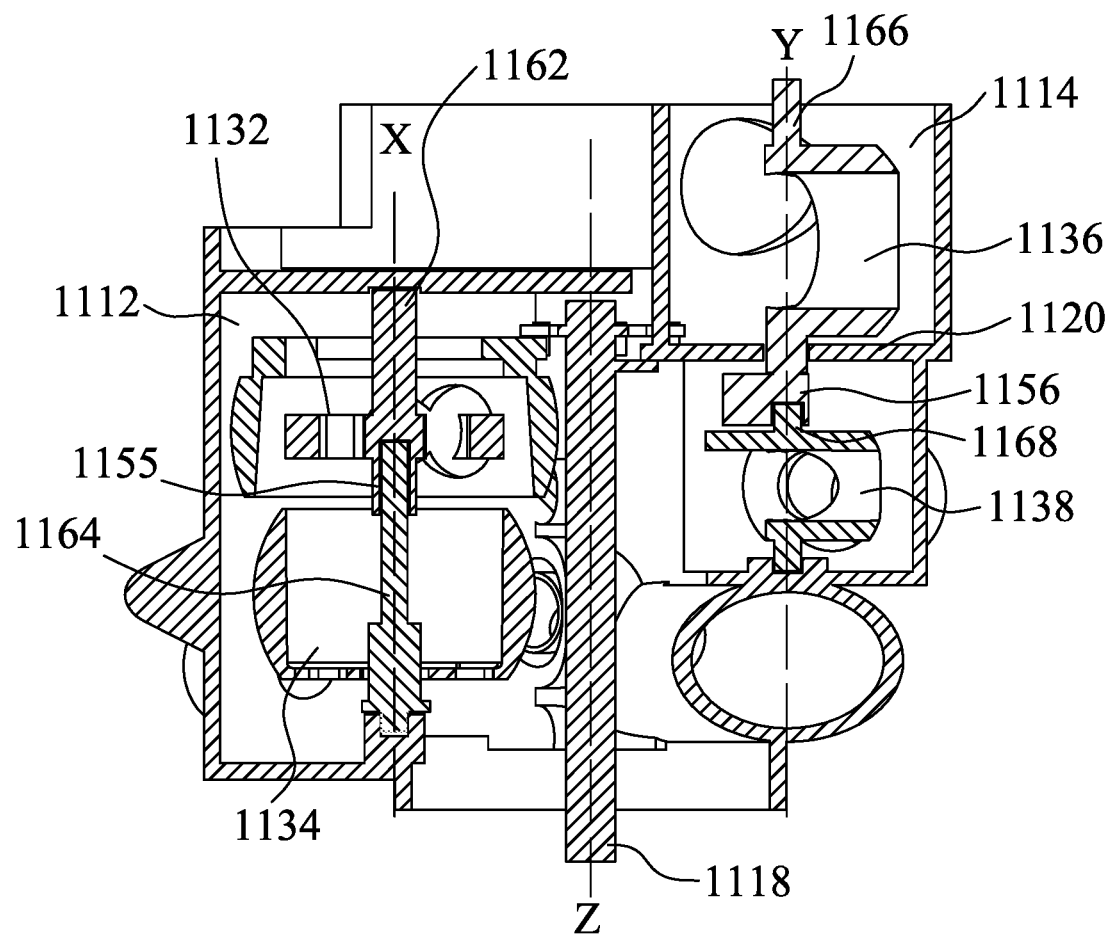
FIG. 11C is a cross-sectional view of the regulating valve shown in FIG. 11A taken along a section line D-D in FIG. 11A.

FIG. 11A is a perspective view of a valve 1100 according to an eighth embodiment of the present disclosure. FIG. 11B is an exploded view of the valve 1100 shown in FIG. 11A. FIG. 11C is a vertical downward cross-sectional view of the valve 1100 shown in FIG. 11A taken along a section line D-D in FIG. 11A. In order to clearly show main elements in the valve 1100, sealing elements provided at respective housing openings are not shown in FIGS. 11A-11C. As shown in FIGS. 11A-11C, the valve 1100 comprises a housing 1101, a first valve body 1132, a second valve body 1134, a third valve body 1136, and a fourth valve body 1138. The housing 1101 has a first cavity 1112 and a second cavity 1114. The first valve body 1132, the second valve body 1134, and the fourth valve body 1138 are disposed in the first cavity 1112, and the third valve body 1136 is disposed in the second cavity 1114. A sleeve 1155 is provided at the bottom of a rotating shaft 1162 of the first valve body 1132. The sleeve 1155 is sleeved at the top of a rotating shaft 1164 of the second valve body 1134, such that the first valve body 1132 and the second valve body 1134 can rotate about the same first axis X. A lower portion of a rotating shaft 1166 of the third valve body 1136 passes through a first transversal partition plate 1120 of the first cavity 1112 and the second cavity 1114 and then extends into the first cavity 1112. A sleeve 1156 is provided at the bottom of the third valve body 1136. The sleeve 1156 is sleeved at the top of a rotating shaft 1168 of the fourth valve body 1138, such that the third valve body 136 and the fourth valve body 1138 can rotate about the same second axis Y.

The valve 1100 further comprises an actuating shaft 1118. The actuating shaft 1118 is disposed in the first cavity 1112 and can rotate about a third axis Z. The first valve body 1132 and the second valve body 1134 are disposed on a left side of the actuating shaft 1118, and the third valve body 1136 and the fourth valve body 1138 are disposed on a right side of the actuating shaft 1118. The valve 1100 further comprises a first engaging and disengaging structure, a second engaging and disengaging structure, a third engaging and disengaging structure, and a fourth engaging and disengaging structure. When the actuating shaft 1118 rotates, the first valve body 1132, the second valve body 1134, the third valve body 1136, and the fourth valve body 1138 can respectively and selectively rotate together with the actuating shaft 1118 via the first engaging and disengaging structure, the second engaging and disengaging structure, the third engaging and disengaging structure, and the fourth engaging and disengaging structure.

Figure 12:
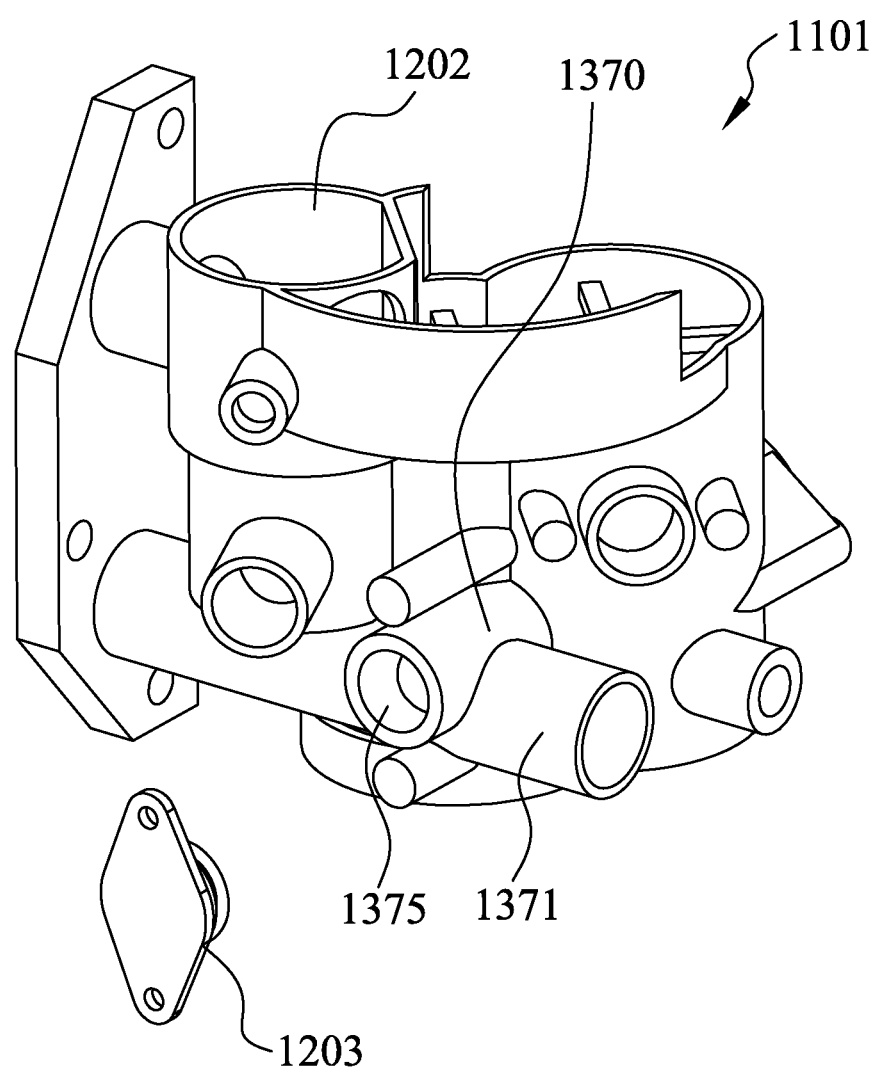
FIG. 12 is an exploded view of a casing shown in FIG. 11A.

FIG. 12 is an exploded view of the housing 1101 shown in FIG. 11A. As shown in FIG. 12A, the housing 1101 comprises a housing body 1202 and a cover 1203. The size of the cover 1203 can cooperating with the size of an orifice 1375 of a pipe 1370 on the housing body 1202. The cover 1203 can be mounted on the orifice 1375 and blocks the orifice 1375, so that a fluid in the housing 1101 cannot flow into or out of the housing 1101 through the orifice 1375.

Figure 13A:
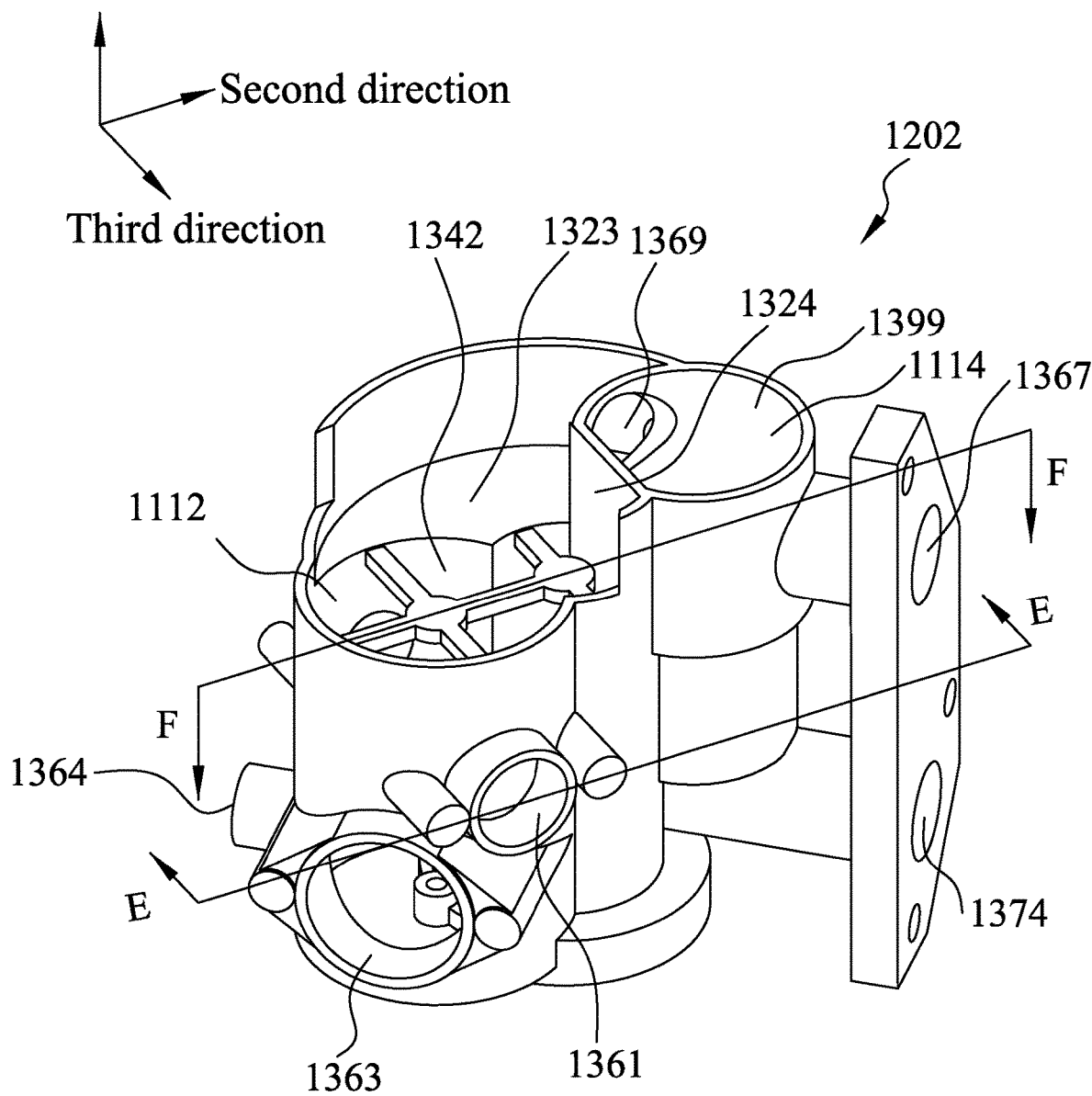
FIG. 13A is a perspective view of a casing body shown in FIG. 12 as viewed from top to bottom.
Figure 13B:
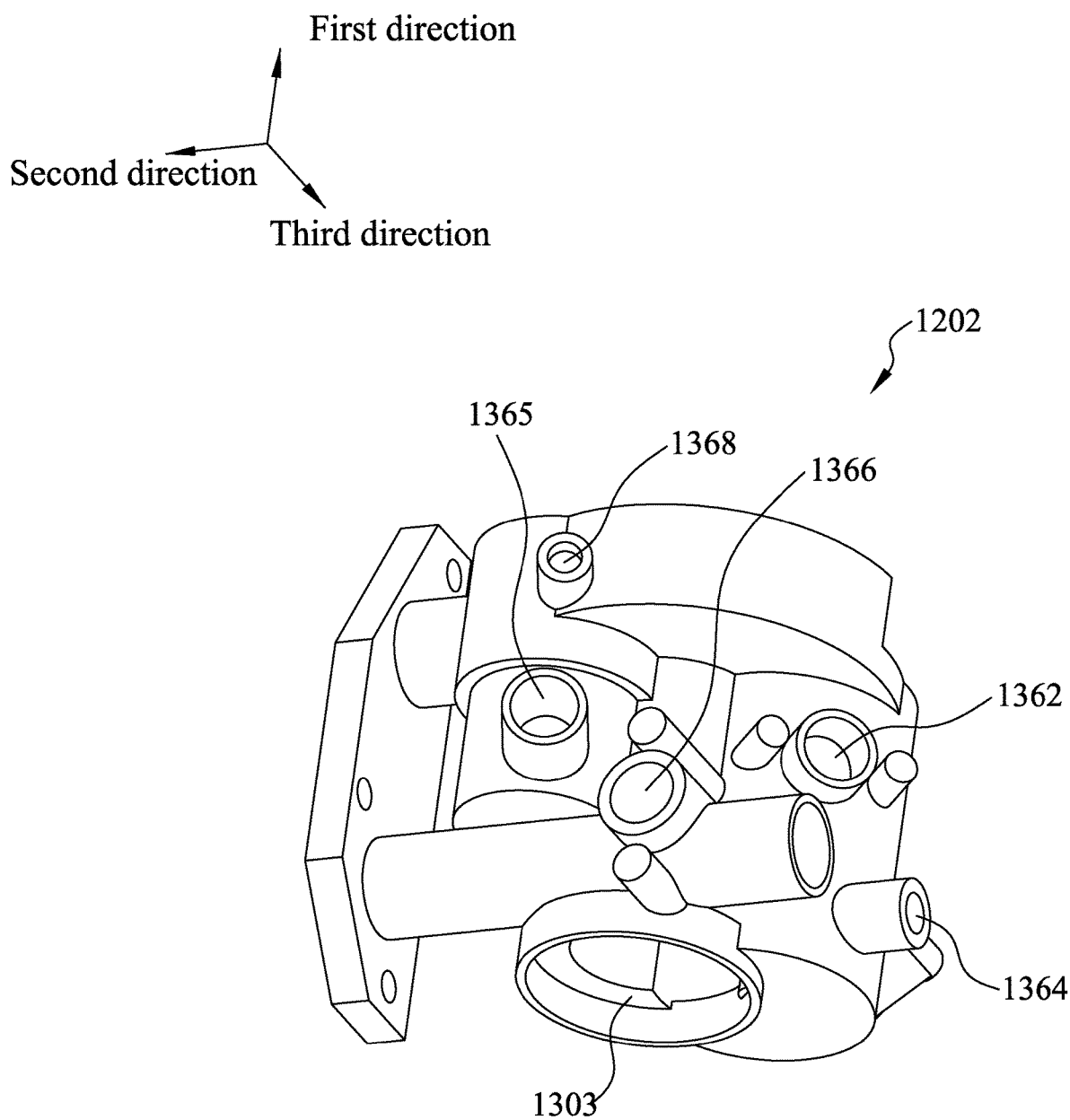
FIG. 13B is a perspective view of the casing body shown in FIG. 12 as viewed from bottom to top.
Figure 13C:
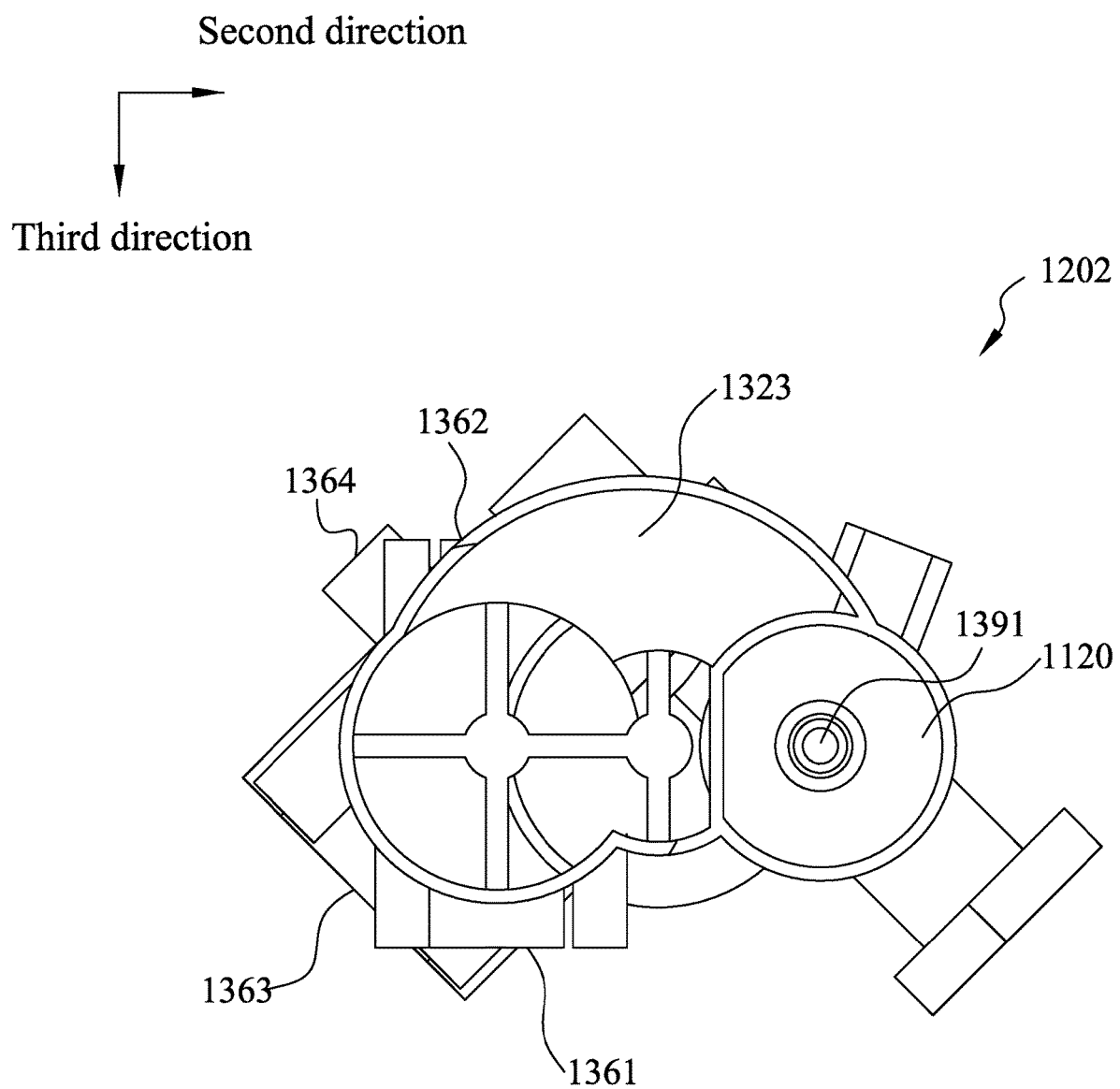
FIG. 13C is a top view of the casing body shown in FIG. 12.
Figure 13D:
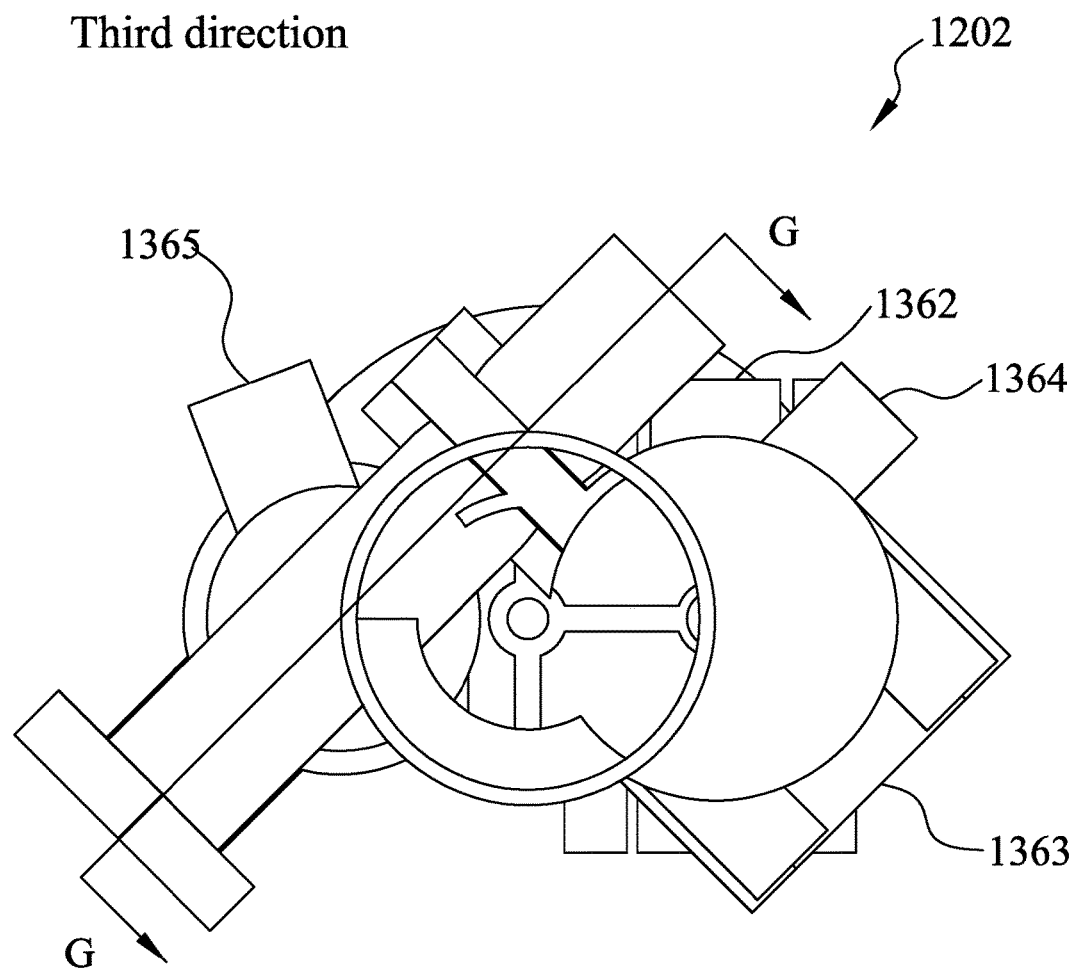
FIG. 13D is a bottom view of the casing body shown in FIG. 12.
Figure 13E:
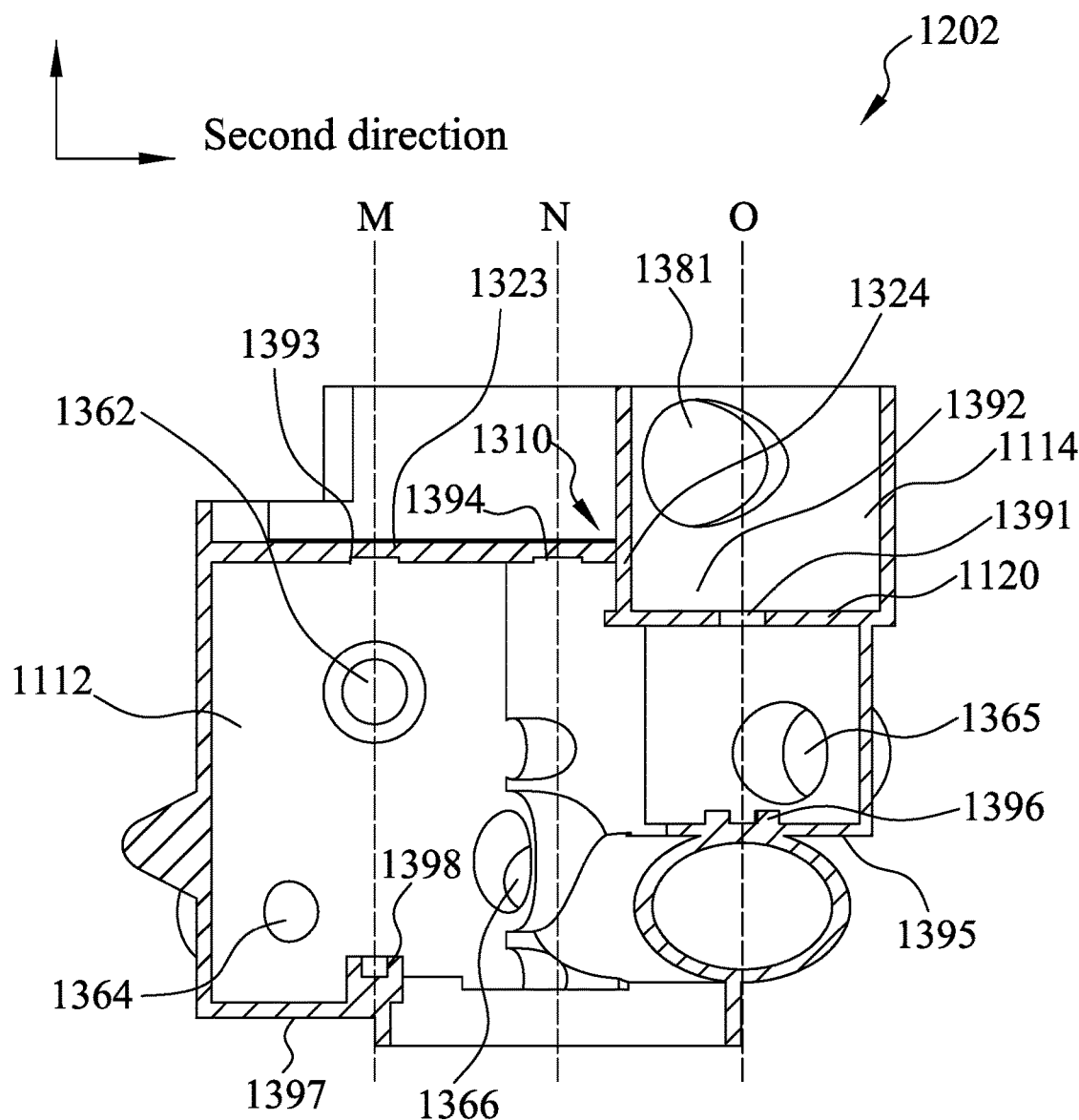
FIG. 13E is a cross-sectional view of the casing body shown in FIG. 12 taken along a section line E-E in FIG. 13A.

FIG. 13A is a perspective view of the housing body 1202 shown in FIG. 12 as viewed from top to bottom in front of the housing 1101. FIG. 13B is a perspective view of the housing body 1202 shown in FIG. 12 as viewed from bottom to top in back of the housing 1101. FIGS. 13C and 13D are respectively a top view and a bottom view of the housing body 1202 shown in FIG. 12. FIG. 13E is a vertical downward cross-sectional view of the housing body 1202 shown in FIG. 12 taken along a section line E-E in FIG. 13A, showing more structural details inside the housing body 1202. In order to better describe the structure of the housing body 1202, in the present disclosure, an extension direction of each of the first axis X, the second axis Y, and the third axis Z is taken as a first direction, the direction of a horizontal connecting line between the first axis X and the third axis Z is taken as a second direction, and the direction perpendicular to the first direction and the second direction is taken as a third direction.

As shown in FIGS. 13A-13E, the housing body 1202 has a top plate. The top plate comprises a first transversal partition plate 1120, a second transversal partition plate 1323, and a vertical partition plate 1324. The first transversal partition plate 1120 and the second transversal partition plate 1323 are provided to have a height difference in the first direction to form a step portion 1301. The first cavity 1112 is provided below the first transversal partition plate 1120 and the second transversal partition plate 1323, and the second cavity 1114 is provided above the first transversal partition plate 1120, so that the top of the second cavity 1114 is partially higher than the top of the first cavity 1112 in the first direction.

A perforation 1391 is provided in the first transversal partition plate 1120. The lower portion of the third valve body 1136 can pass through the perforation 1391, so that the lower portion of the third valve body 1136 extends into the first cavity 1112, and the third valve body 1136 can rotate about the second axis Y.

A first bottom plate 1395 of the first cavity 1112 has a concave portion 1396 for receiving a lower portion of the fourth valve body 1138. An upper portion of the fourth valve body 1138 is connected to the lower portion of the third valve body 1136, and the lower portion of the fourth valve body 1138 is received in the concave portion 1396 of the first bottom plate 1395, so the fourth valve body 1138 can be disposed in the first cavity 1112 and can rotate about the second axis Y.

The second transversal partition plate 1323 has a concave portion 1393 for receiving an upper portion of the first valve body 1132. A second bottom plate 1397 of the first cavity 1112 has a concave portion 1398 for receiving a lower portion of the second valve body 1134. Because a lower portion of the first valve body 1132 is sleeved with an upper portion of the second valve body 1134, the first valve body 1132 and the second valve body 1134 can be disposed together in the first cavity 1112 and can rotate about the first axis X.

The second transversal partition plate 1323 also has a concave portion 1394 for receiving an upper portion of the actuating shaft 1118, such that when an actuator (not shown) drives the actuating shaft 1118 to rotate, the actuating shaft 1118 can rotate about the third axis Z.

Figure 13F:
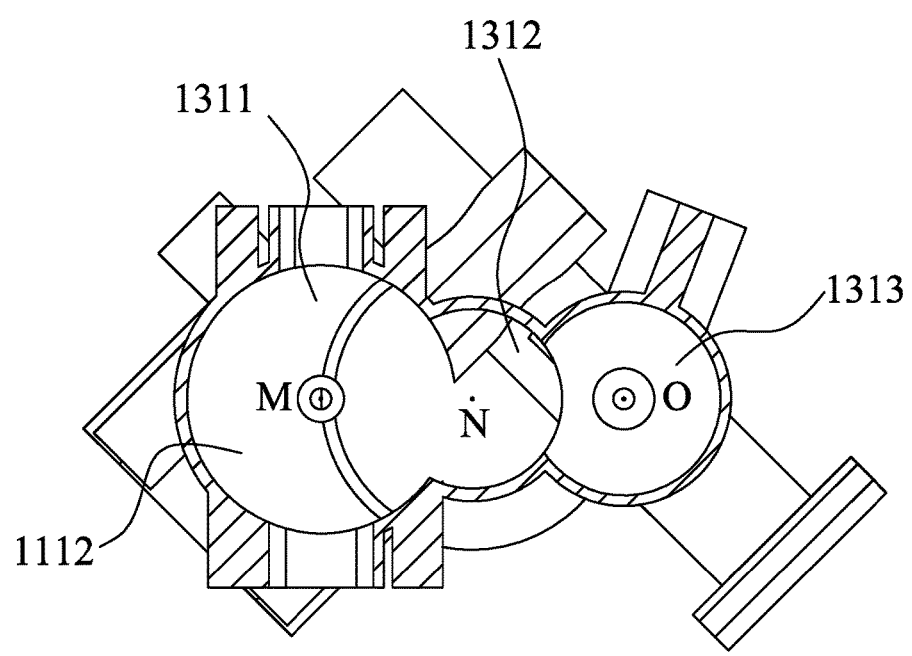
FIG. 13F is a cross-sectional view of the casing body shown in FIG. 12 taken along a section line F-F in FIG. 13A.

FIG. 13F is a cross-sectional view of the housing body 1202 shown in FIG. 12 taken along a parallel direction of a section line F-F in FIG. 13A, showing the shape of the first cavity 1112 more clearly. As shown in FIG. 13F, the first cavity 1112 is substantially in the shape of three intersecting cylinders, thereby forming a first cut cylindrical cavity 1311, a second cut cylindrical cavity 1312, and a third cut cylindrical cavity 1313. The first valve body 1132 and the second valve body 1134 are disposed in the first cut cylindrical cavity 1311. The actuating shaft 1118 is disposed in the second cut cylindrical cavity 1312. The fourth valve body 1138 is disposed in the third cut cylindrical cavity 1313. The central axis M of the first cut cylindrical cavity 1311 coincides with the first axis X. The central axis N of the second cut cylindrical cavity 1312 coincides with the third axis Z. The central axis O of the third cut cylindrical cavity 1313 coincides with the second axis Y.

It can be seen with reference to FIGS. 13A-13E that the wall of the first cavity 1112 is provided with a first group of housing openings including a first housing opening 1361 arranged in the third direction and a second housing opening 1362 arranged reversely in the third direction. The first housing opening 1361 and the second housing opening 1362 are arranged at the same height in the first direction, and the height of the first housing opening 1361 and the second housing opening 1362 is set to enable the first housing opening 1361 and the second housing opening 1362 to cooperate with the first valve body 1132. In other words, when the first valve body 1132 rotates, the first valve body 1132 can selectively connect or disconnect the first housing opening 1361 and/or the second housing opening 1362.

The first group of housing openings further include a third housing opening 1363. The third housing opening 1363 is arranged within the range of an included angle between the reverse direction of the second direction and the third direction, and the set height of the third housing opening is lower than that of the first housing opening 1361 and the second housing opening 1362 in the first direction. The height of the third housing opening 1363 is set to enable the third housing opening 1363 to cooperate with the second valve body 1134. In other words, when the second valve body 1134 rotates, the second valve body 1134 can selectively connect or disconnect the third housing opening 1363.

The first group of housing openings further include a fourth housing opening 1364. The fourth housing opening 1364 is arranged within the range of an included angle between the reverse direction of the second direction and the reverse direction of the third direction, and is slightly lower than the third housing opening 1363 in the first direction. The height of the fourth housing opening 1364 is lower than that of the second valve body 1134. In other words, regardless of the angle to which the second valve body 1134 rotates, the fourth housing opening 1364 remains fluidly connecting the first cavity 1112.

Each of the first housing opening 1361, the second housing opening 1362, the third housing opening 1363, and the fourth housing opening 1364 is provided on the wall (i.e., the housing 1101) of the first cut cylindrical cavity 1311 around the central axis M of the first cut cylindrical cavity 1311.

The first group of housing openings further include a fifth housing opening 1365, which is arranged within the range of an included angle between the reverse direction of the third direction and the second direction, and the height of the fifth housing opening is slightly lower than that of the second housing opening 1362 in the first direction. The height of the fifth housing opening 1365 is set to enable the fifth housing opening 1365 to cooperate with the fourth valve body 1138. In other words, when the fourth valve body 1138 rotates, the fourth valve body 1138 can selectively connect or disconnect the fifth housing opening 1365. In addition, the fifth housing opening 1365 is provided on the wall of the third cut cylindrical cavity 1313 around the central axis O of the third cut cylindrical cavity 1313.

Each of the first housing opening 1361, the second housing opening 1362, the third housing opening 1363, the fourth housing opening 1364, and the fifth housing opening 1365 is provided with a pipe that surrounds the housing opening and extends outward from the housing body 1202, such that each housing opening can be connected to other devices or pipes through the pipe.

Figure 13G:
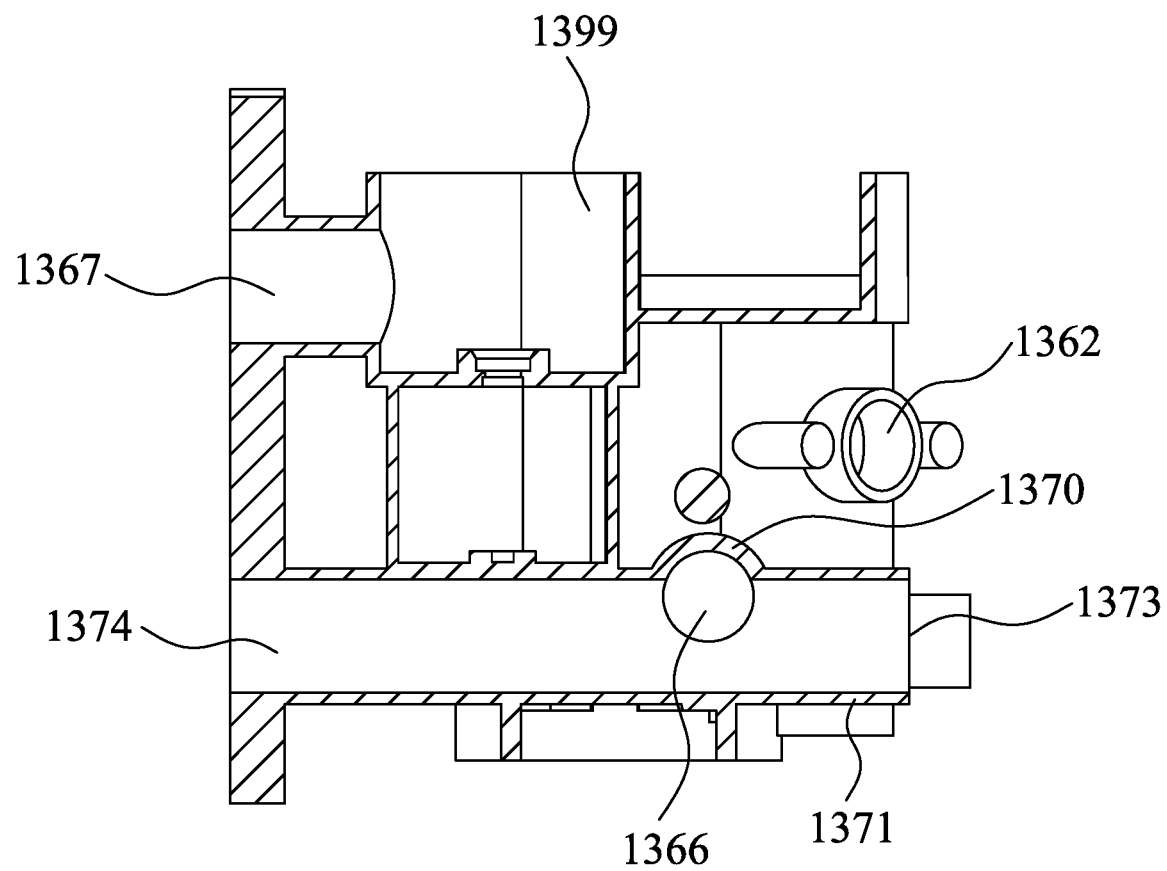
FIG. 13G is a cross-sectional view of the casing body shown in FIG. 12 taken along a section line G-G in FIG. 13D.

FIG. 13G is a cross-sectional view of the housing body 1202 shown in FIG. 12 taken along a section line G-G in FIG. 13D, showing the specific arrangement of a sixth housing opening 1366. As shown in FIG. 13G, the first group of housing openings further include the sixth housing opening 1366. The sixth housing opening 1366 is arranged at the junction between the wall of the first cut cylindrical cavity 1311 and the wall of the second cut cylindrical cavity 1312. The sixth housing opening 1366 is arranged within the range of an included angle between the reverse direction of the third direction and the second direction, and the height of the sixth housing opening is slightly lower than that of the second housing opening 1362 in the first direction. The height of the sixth housing opening 1366 is set to enable the sixth housing opening 1366 to cooperate with the second valve body 1134. In other words, when the second valve body 1134 rotates, the second valve body 1134 can selectively connect or disconnect the sixth housing opening 1366.

With reference to FIG. 12, the pipe 1370 is provided around the sixth housing opening 1366 and extends outward from the housing body 1202. The orifice 1375 of the pipe 1370 is blocked by the cover 1203, such that the fluid cannot flow into or out of the housing body 1202 from the orifice 1375. The housing body 1202 further comprises a pipe 1371 provided perpendicular to the pipe 1370. The pipe 1371 and the pipe 1370 can fluidly be connected. In this way, the fluid flowing out of or into the housing body 1202 through the sixth housing opening 1366 can flow through orifices 1373, 1374 of the pipe 1371.

With continued reference to FIGS. 13A-13E, a second group of housing openings are provided on the wall of the second cavity 1114. The second group of housing openings include a seventh housing opening 1367 and an eighth housing opening 1368. The seventh housing opening 1367 is arranged within the range of an included angle between the second direction and the third direction, and is arranged to be higher than the fourth housing opening 1364 in the first direction. The eighth housing opening 1368 is arranged within the range of an included angle between the reverse direction of the third direction and the second direction, and the set height of the eighth housing opening is slightly lower than that of the seventh housing opening 1367 in the first direction. The heights of the seventh housing opening 1367 and the eighth housing opening 1368 are set to enable the seventh housing opening 1367 and the eighth housing opening 1368 to cooperate with the third valve body 1136. In other words, when the third valve body 1136 rotates, the third valve body 1136 can selectively connect or disconnect the seventh housing opening 1367 and/or the eighth housing opening 1368.

Each of the seventh housing opening 1367 and the eighth housing opening 1368 is provided with a pipe that surrounds the housing opening and extends outward from the housing body 1202, such that each housing opening can be connected to other devices or pipes through the pipe.

The second group of housing openings further include a pump outlet housing opening 1369. The pump outlet housing opening 1369 is provided on the vertical partition plate 1324 for connecting with a pump outlet (not shown). Specifically, the pump outlet housing opening 1369 is arranged within the range of an included angle between the reverse direction of the second direction and the reverse direction of the third direction, and the height of the pump outlet housing opening 1369 is set to enable the pump outlet housing opening 1369 to cooperate with the third valve body 1136. In other words, when the third valve body 1136 rotates, the third valve body 1136 can selectively connect or disconnect the pump outlet housing opening 1369.

As an example, the valve 1100 in the present disclosure uses a pump (not shown) as a power source for fluid flow. As shown in FIG. 13A, the second transversal partition plate 1323 at the top of the first cavity 1112 is provided with a plurality of through holes 1342 for connecting with an inlet of the pump. An opening 1399 at the top of the second cavity 1114 can be covered by the pump. In this way, the fluid in the first cavity 1112 can flow out of the housing 1101 through a plurality of holes 1242 and enter the pump, and then the fluid flowing out through the pump outlet can enter the second cavity 1114 through the pump outlet housing opening 1369.

As an example, the actuator (not shown) is used as a power source for the rotation of the actuating shaft 1118 in the present disclosure. As shown in FIG. 13B, the bottom of the first cavity 1112 has a circular hole 1303 for disposing the actuator. The actuator can cover the hole 1303, and at the same time, the actuator can be connected to the actuating shaft 1118 through the hole 1303 to drive the actuating shaft 1118 to rotate.

Figure 14A:
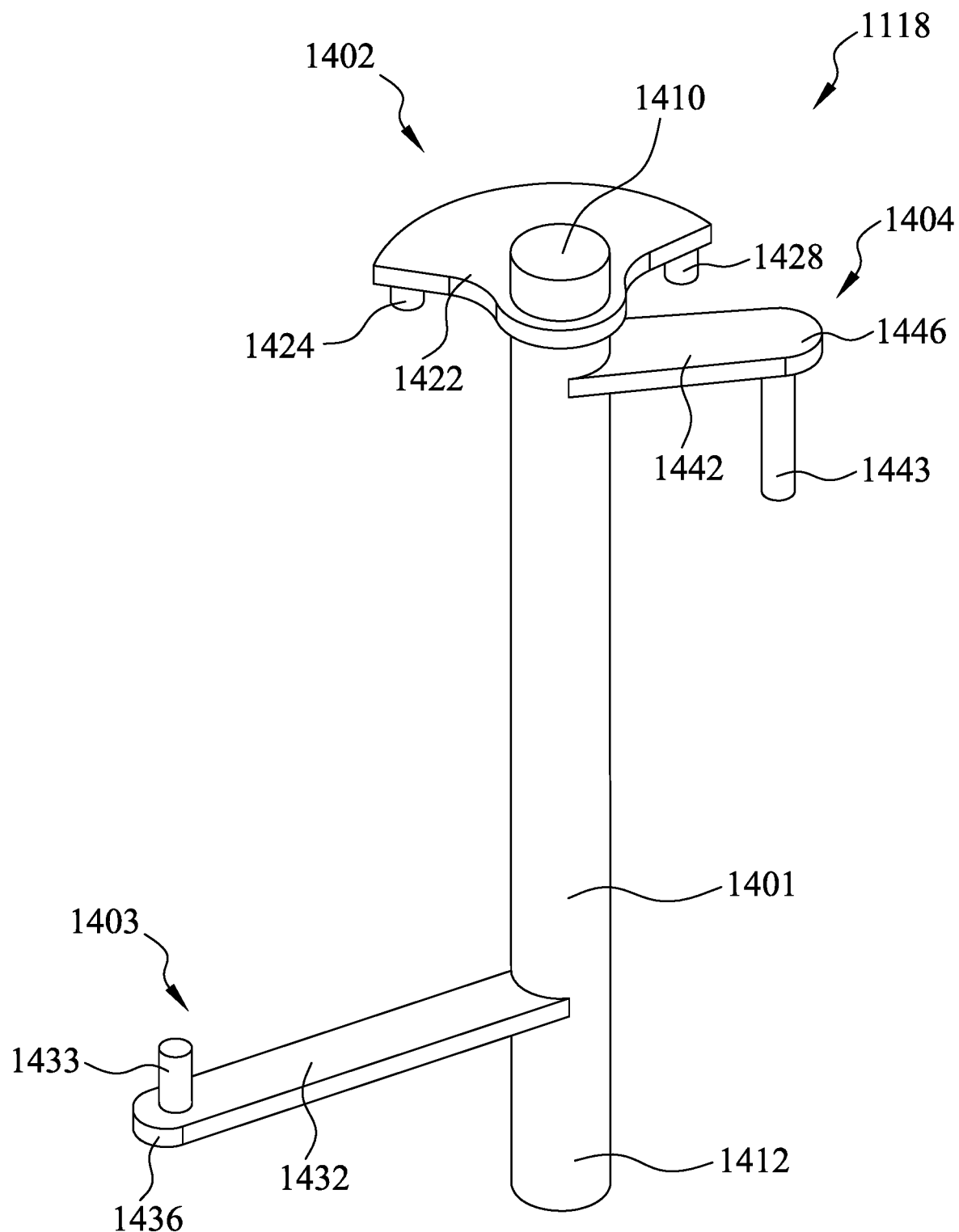
FIG. 14A is a perspective view of an actuating shaft shown in FIG. 11B as viewed from top to bottom.
Figure 14B:
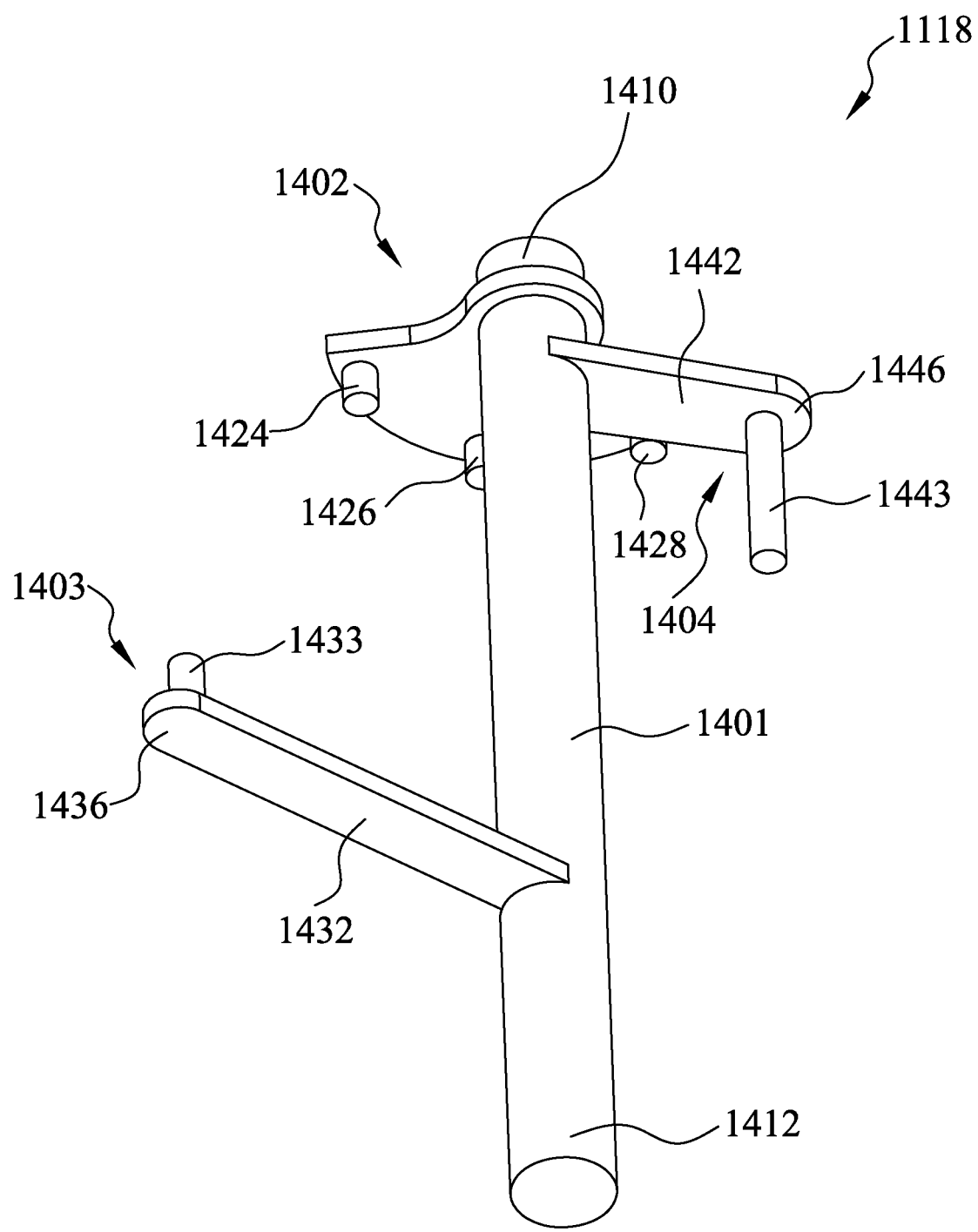
FIG. 14B is a perspective view of the actuating shaft shown in FIG. 11B as viewed from bottom to top.

FIG. 14A is a perspective view of the actuating shaft 1118 shown in FIG. 11B as viewed from top to bottom at an angle. FIG. 14B is a perspective view of the actuating shaft shown in FIG. 11B as viewed from bottom to top at another angle. As shown in FIGS. 14A and 14B, the actuating shaft 1118 comprises a shaft rod 1401. An upper end 1410 of the shaft rod 1401 is designed to cooperating with the concave portion 1394 in the housing body 1202, such that the shaft rod 1401 can be rotatably connected to the housing 1101. A lower end 1412 of the shaft rod 1401 is designed to cooperating with an output end of the actuator, such that the actuator can drive the actuating shaft 1118 to rotate during operation.

The regulating valve 1100 comprises a first engageable and disengageable actuating structure 1402, a second engageable and disengageable actuating structure 1403, and a third engageable and disengageable actuating structure 1404 that are provided on the shaft rod 1401. Specifically, the first engageable and disengageable actuating structure 1402 is provided at an upper portion of the shaft rod 1401. The first engageable and disengageable actuating structure 1402 comprises a first transversal plate 1422 and a plurality of first rods 1424, 1426, 1428. The first transversal plate 1422 is substantially sector-shaped, and is transversely provided at the upper portion of the shaft rod 1401, such that a circumferential direction of the sector is identical to a circumferential direction of the shaft rod 1401. The center of a circle of the sector on the axis of the shaft rod 401, such that when the actuating shaft 1118 rotates about the first axis X, the plurality of first rods 1424, 1426, 1428 on the first transversal plate 1422 can also rotate about the first axis X. The plurality of first rods 1424, 1426, 1428 are uniformly provided near an outer edge of the first transversal plate 1422 along a circumferential direction of the first transversal plate 1422, and extend downward from a bottom surface of the first transversal plate 1422. The plurality of first rods 1424, 1426, 1428 are provided to cooperate with a first engageable and disengageable actuated structure 1555 on the first valve body 1132, such that when the actuating shaft 1118 rotates within a first angle range, the first engageable and disengageable actuating structure 1402 (i.e., at least one of the plurality of first rods 1424, 1426, 1428) on the actuating shaft 1118 can drive the first valve body 1132 to rotate together.

The second engageable and disengageable actuating structure 1403 comprises a second transversal arm 1432 and a second rod 1433. The second transversal arm 1432 is substantially elongated, and extends perpendicularly from the shaft rod 1401 in a radial direction of the shaft rod 1401, such that when the shaft rod 1401 rotates, a distal end 1436 of the second transversal arm 1432 can move in the circumferential direction. The second rod 1433 is provided at the distal end 1436 of the second transversal arm 1432 and extends upward from an upper surface of the second transversal arm 1432. The second rod 1433 is provided to cooperate with a second engageable and disengageable actuated structure 1755 on the second valve body 1134, such that when the actuating shaft 1118 rotates within a second angle range, the second engageable and disengageable actuating structure 1403 (i.e., the second rod 1433) on the actuating shaft 1118 can drive the second valve body 1134 to rotate together.

The third engageable and disengageable actuating structure 1404 comprises a third transversal arm 1442 and a third rod 1443. The third transversal arm 1442 is substantially elongated, and extends perpendicularly from the upper portion of the shaft rod 1401 in the radial direction of the shaft rod 1401, such that when the shaft rod 1401 rotates, a distal end 1446 of the third transversal arm 1442 can move in the circumferential direction. The third rod 1443 is provided at the distal end 1446 of the third transversal arm 1442 and extends downward from a lower surface of the third transversal arm 1442. The third rod 1443 is provided to cooperate with a third engageable and disengageable actuated structure 1955 on the third valve body 1136 and a fourth engageable and disengageable actuated structure 2155 on the fourth valve body 1138, such that when the actuating shaft 1118 rotates within a third angle range, the third engageable and disengageable actuating structure 1404 (i.e., the third rod 1443) on the actuating shaft 1118 can drive the third valve body 1136 to rotate; and when the actuating shaft 1118 rotates within a fourth angle range, the third engageable and disengageable actuating structure 1404 (i.e., the third rod 1443) on the actuating shaft 1118 can drive the fourth valve body 1138 to rotate.

Figure 15A:
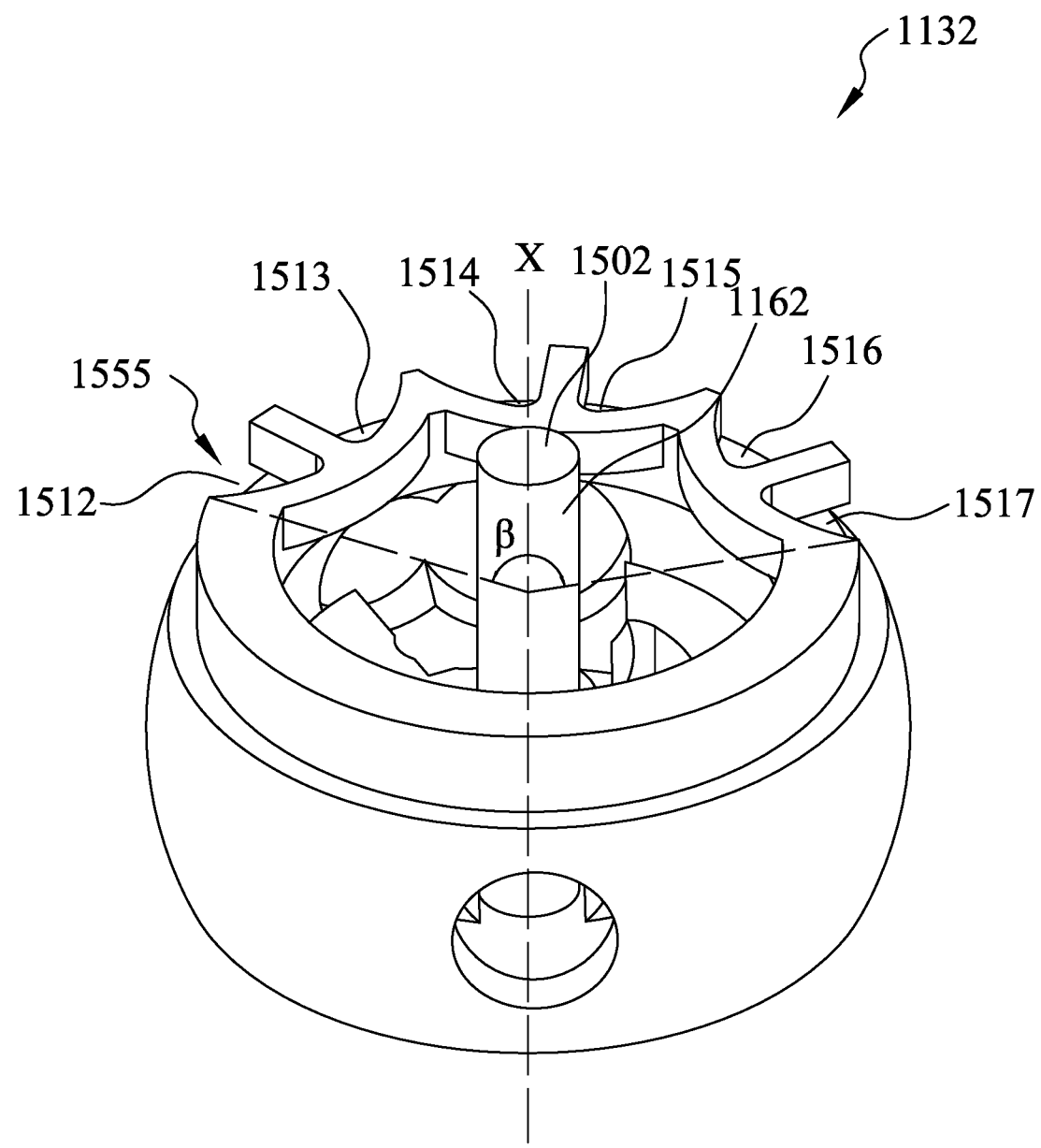
FIG. 15A is a perspective view of a first valve body shown in FIG. 11B as viewed from top to bottom.
Figure 15B:
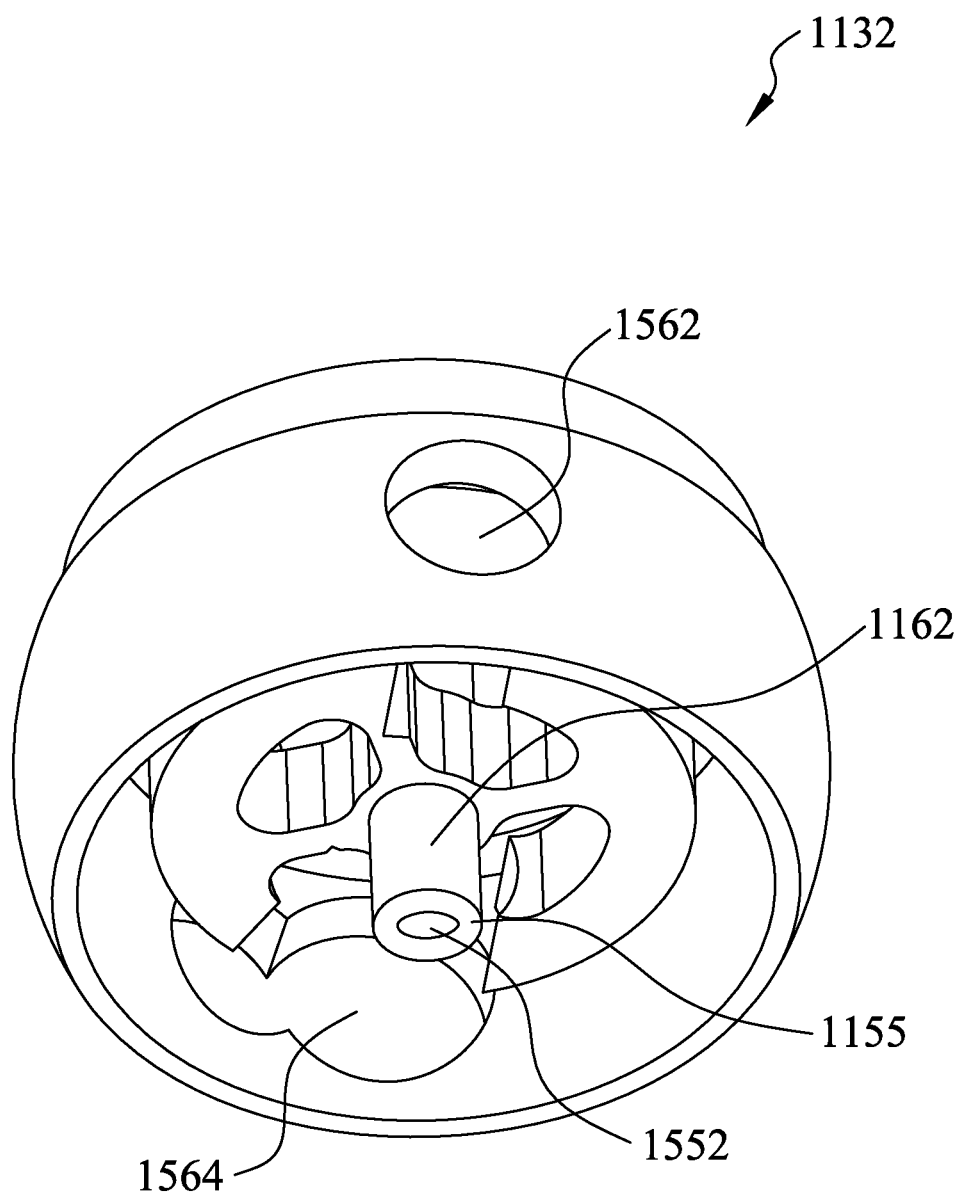
FIG. 15B is a perspective view of the first valve body shown in FIG. 11B as viewed from bottom to top.

FIG. 15A is a perspective view of the first valve body 1132 shown in FIG. 11B as viewed from top to bottom. FIG. 15B is a perspective view of the first valve body 1132 shown in FIG. 11B as viewed from bottom to top. As shown in FIGS. 15A and 15B, the first valve body 1132 is substantially a sphere with upper and lower portions cut, and has the rotating shaft 1162. A lower portion of the rotating shaft 1162 is provided with a recess 1552 to form the sleeve 1155. The sleeve 1155 is used to receive an upper end of the rotating shaft 1164 of the second valve body 1134, such that the first valve body 1132 and the second valve body 1134 can rotate about the same first axis X. An upper portion 1402 of the first valve body 1132 is designed to match the concave portion 1393 of the second transversal partition plate 1323, such that the upper portion 1402 of the first valve body 1132 can be received by the concave portion 1393.

The sphere of the first valve body 1132 is provided with the first engageable and disengageable actuated structure 1555. The first engageable and disengageable actuated structure 1555 includes a plurality of first grooves 1512, 1513, 1514, 1515, 1516, 1517. The plurality of first grooves 1512, 1513, 1514, 1515, 1516, 1517 are provided on an upper surface of the sphere of the first valve body 1132, and are arranged along a circumferential direction of the first valve body 1132. Specifically, the plurality of first grooves 1512, 1513, 1514, 1515, 1516, 1517 are formed by grooving from an edge of the sphere of the first valve body 1132 to the inside of the sphere, and the central angle formed by the distribution of the plurality of first grooves 1512, 1513, 1514, 1515, 1516, 1517 on the sphere of the first valve body 1132 is (3.

The first valve body 1132 is provided with two openings 1562, 1564, and the two openings 1562, 1564 are configured such that when the first valve body 1132 rotates, at least one of the two openings 1562, 1564 can be selectively aligned with the first housing opening 1361 and/or the second housing opening 1362 on the wall of the first cavity 1112, to respectively connect and disconnect the first housing opening 1361 and the second housing opening 1362.

Figure 16:
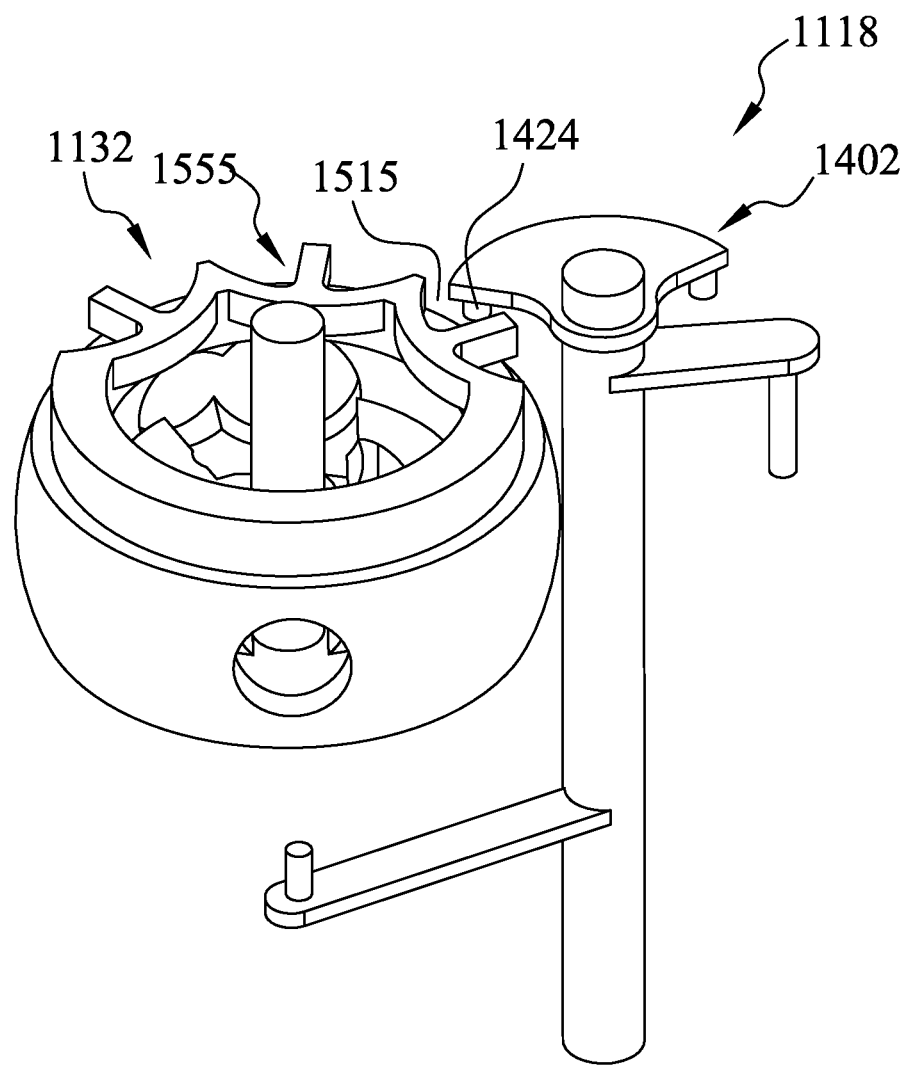
FIG. 16 is a schematic view of a cooperation relationship between the first valve body and the actuating shaft.

FIG. 16 is a schematic view of a cooperation relationship between the first valve body 1132 and the actuating shaft 1118, exemplarily showing one of the states when the first engageable and disengageable actuating structure 1402 engages with the first engageable and disengageable actuated structure 1555. As shown in FIG. 16, when the actuating shaft 1118 rotates within the first angle range, at least one of the plurality of first rods 1424, 1426, 1428 on the actuating shaft 118 can engage with at least one of the plurality of first grooves 1512, 1513, 1514, 1515, 1516, 1517. Thereby, the actuating shaft 1118 can drive the first valve body 1132 to rotate.

It should be noted that the first valve body 1132 is sleeved on the second valve body 1134, but due to the friction between the first valve body 1132 and the second valve body 1134, when the first valve body 1132 rotates, the second valve body 1134 does not rotate with the first valve body 1132.

Figure 17A:
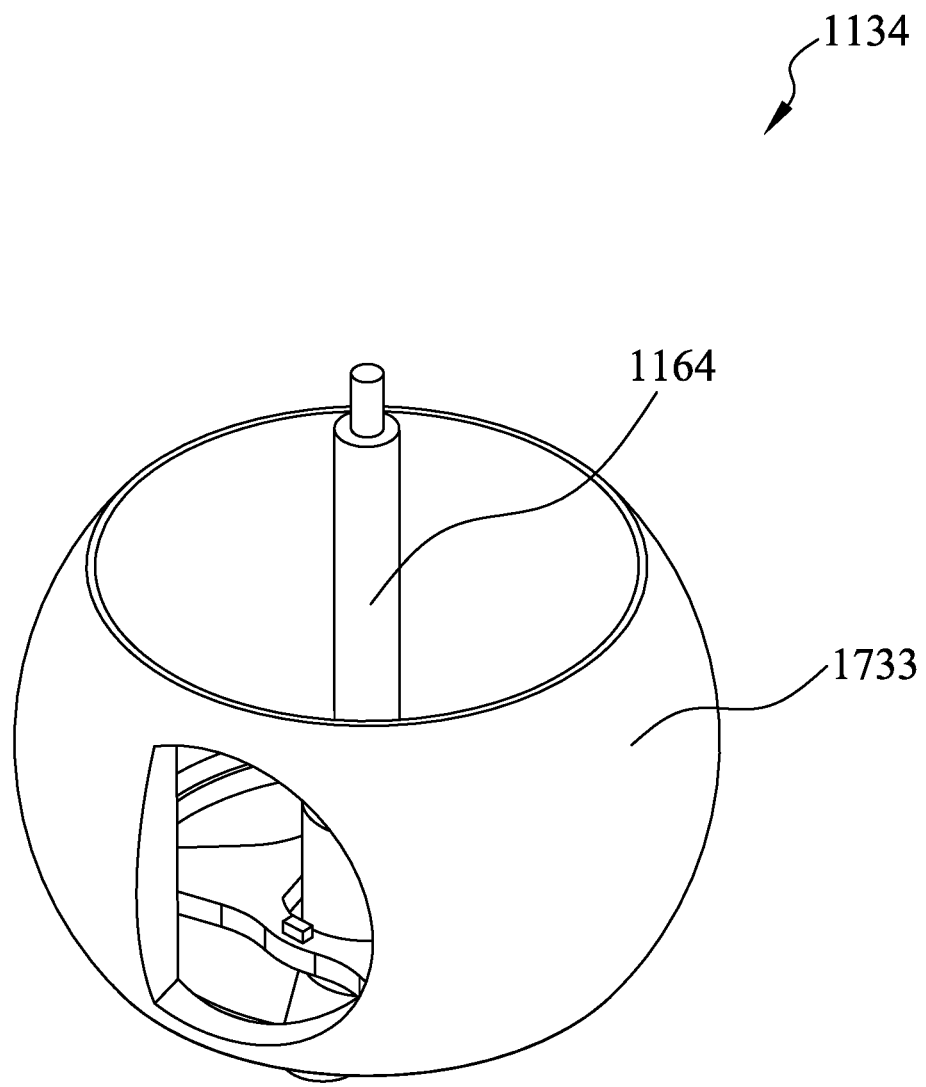
FIG. 17A is a perspective view of a second valve body shown in FIG. 11B as viewed from top to bottom.
Figure 17B:
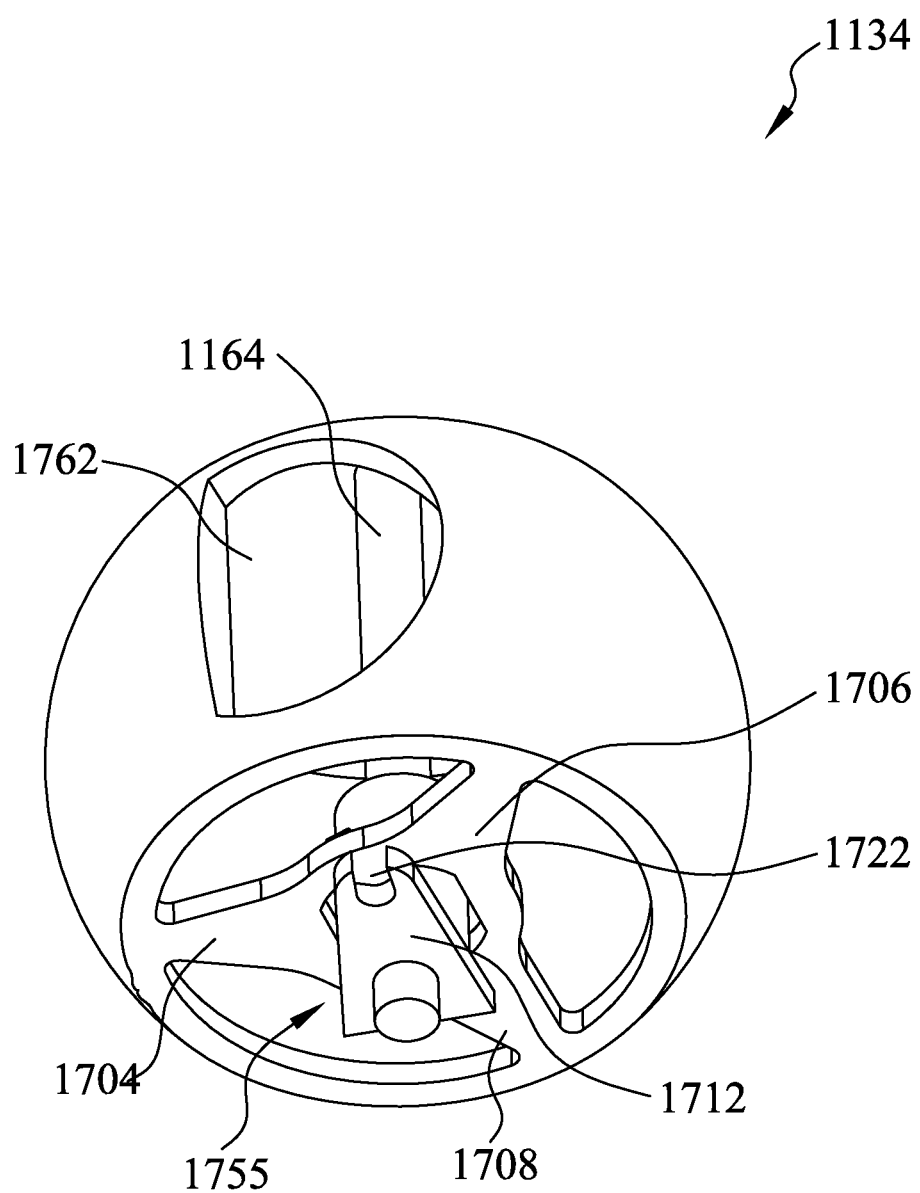
FIG. 17B is a perspective view of the second valve body shown in FIG. 11B as viewed from bottom to top.

FIG. 17A is a perspective view of the second valve body 1134 shown in FIG. 11B as viewed from top to bottom. FIG. 17B is a perspective view of the second valve body 1134 shown in FIG. 11B as viewed from bottom to top. As shown in FIGS. 17A and 17B, the second valve body 1134 comprises a second valve body main body 1733 and the rotating shaft 1164. The top of the rotating shaft 1164 is stepped, and can be received by the sleeve 1155 at the lower portion of the first valve body 1132, such that the first valve body 1132 and the second valve body 1134 can rotate about the same first axis X.

The second valve body main body 1733 is substantially a spherical shell with upper and lower portions cut, and the second valve body main body 1733 is disposed around the rotating shaft 1164. A lower portion of the second valve body main body 1733 is fixedly connected to the rotating shaft 1164 via a plurality of connecting posts 1704, 1706, 1708. The second valve body main body 1733 is provided with an opening 1762, and the opening 1762 is configured such that when the second valve body 1134 rotates, the opening 1762 can be selectively aligned with the third housing opening 1363 and/or the sixth housing opening 1366 on the wall of the first cavity 1112, to connect and disconnect the third housing opening 1363 and the sixth housing opening 1366.

A second engageable and disengageable actuated structure 1755 is provided at the lower portion of the rotating shaft 1164. The second engageable and disengageable actuated structure 1755 comprises a second valve body plate 1712. One end of the second valve body plate 1712 is connected to the lower portion of the rotating shaft 1164, the other end of the second valve body plate 1712 is provided with a second groove 1722. The second groove 1722 is arranged in a radial direction of the second valve body 1134. When the actuating shaft 1118 rotates within the second angle range, the second rod 1433 on the actuating shaft 1118 can engage with the second groove 1722 on the second valve body 1134.

Figure 18:
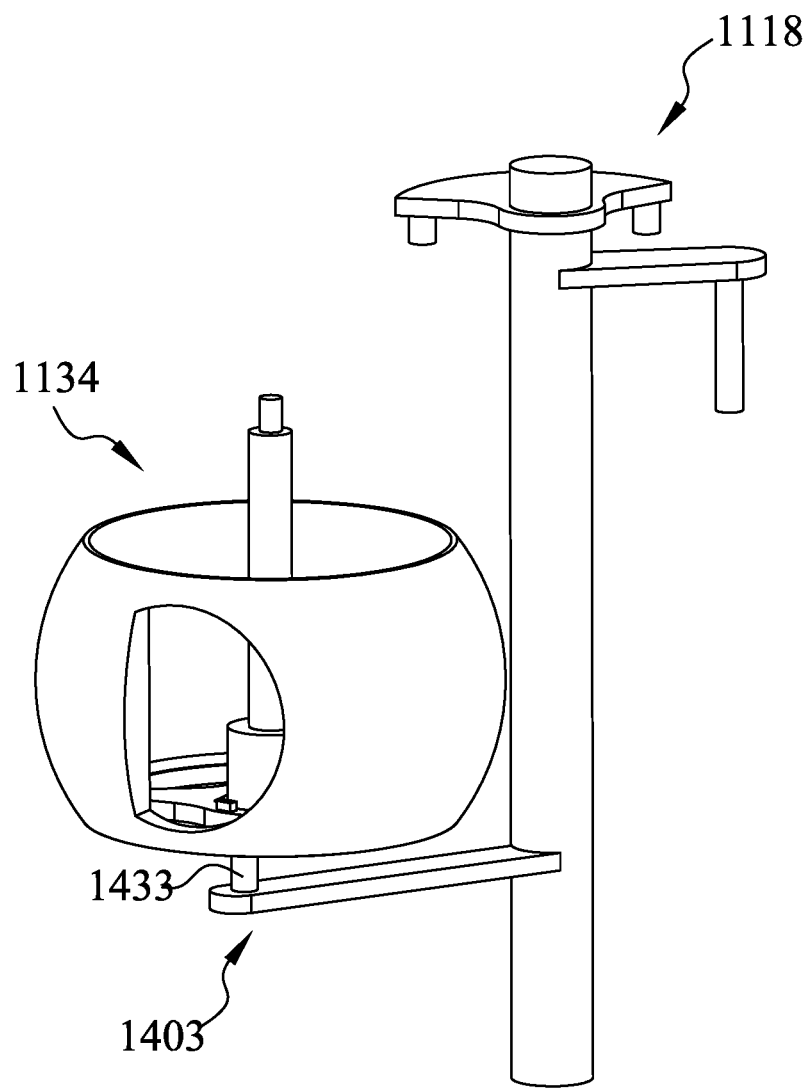
FIG. 18 is a schematic view of a cooperation relationship between the second valve body and the actuating shaft.

FIG. 18 is a schematic view of a cooperation relationship between the second valve body 1134 and the actuating shaft 1118, exemplarily showing one of the states when the second engageable and disengageable actuating structure 1403 engages with the second engageable and disengageable actuated structure 1755. As shown in FIG. 18, when the actuating shaft 1118 rotates within the second angle range, the second rod 1433 on the actuating shaft 1118 engages with the second groove 1722. Thereby, the actuating shaft 1118 can drive the second valve body 134 to rotate within the second angle range.

It should be noted that the first valve body 1132 is sleeved on the second valve body 1134, but due to the friction between the first valve body 1132 and the second valve body 1134, when the second valve body 1134 rotates, the first valve body 132 does not rotate with the rotation of the second valve body 1134.

Figure 19A:
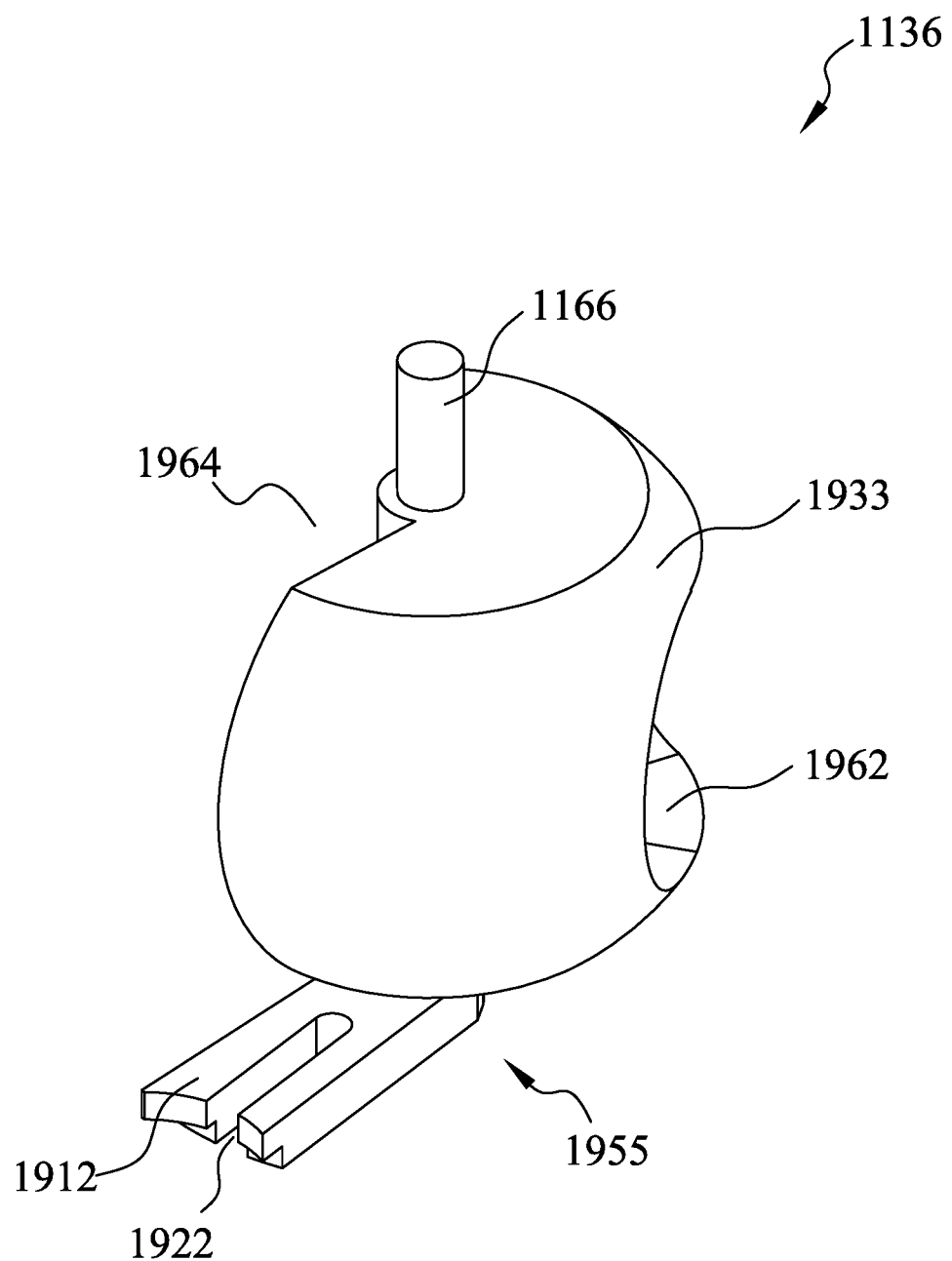
FIG. 19A is a perspective view of a third valve body shown in FIG. 11B as viewed from top to bottom.
Figure 19B:
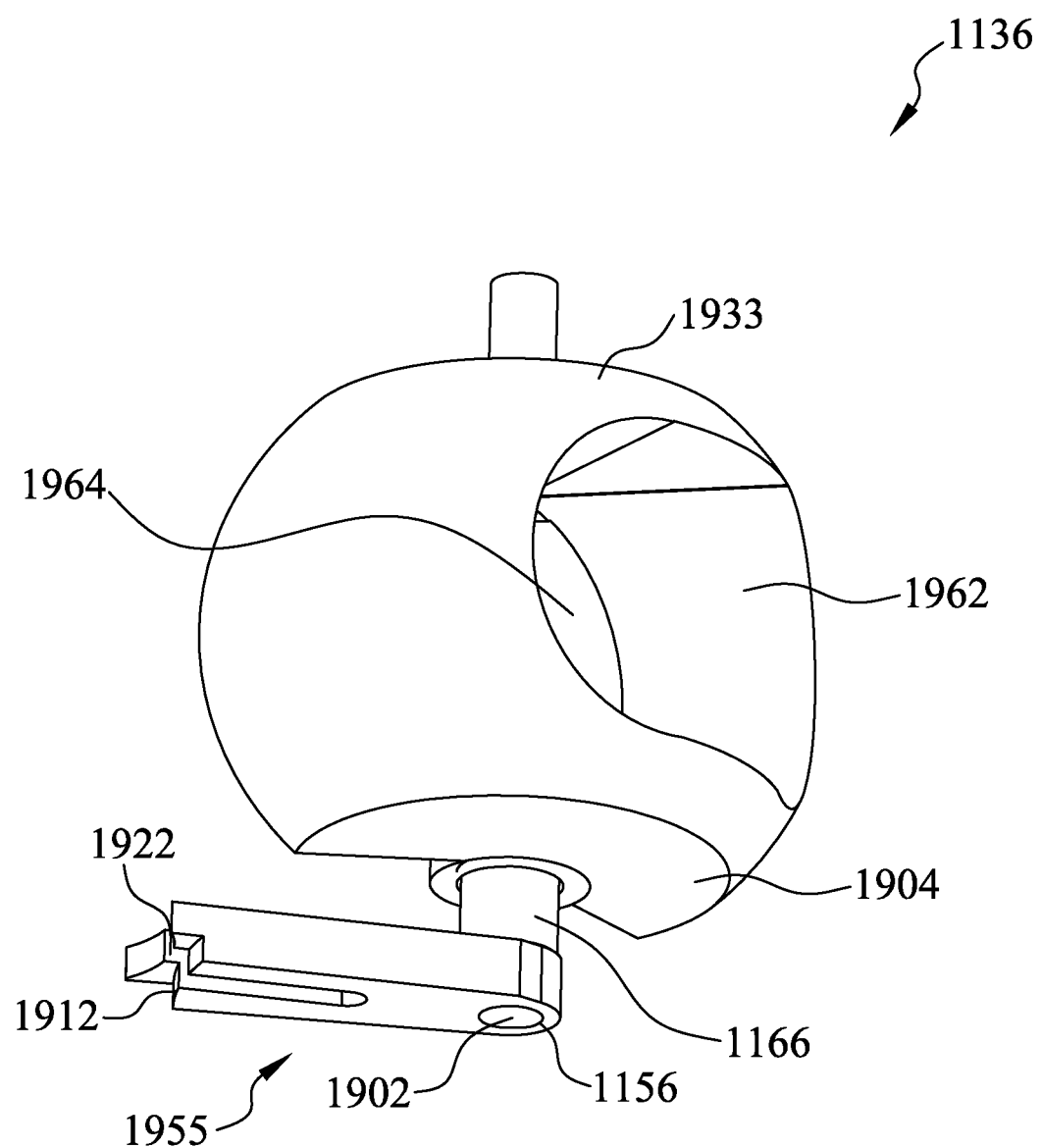
FIG. 19B is a perspective view of the third valve body shown in FIG. 11B as viewed from bottom to top.

FIG. 19A is a perspective view of the third valve body 1136 shown in FIG. 11B as viewed from top to bottom at an angle. FIG. 19B is a perspective view of the third valve body 1136 shown in FIG. 11B as viewed from bottom to top at another angle. As shown in FIGS. 19A and 19B, the third valve body 1136 comprises a third valve body main body 1933 and the rotating shaft 1166. The top of the rotating shaft 1166 is received by a connecting portion provided on the pump. The lower portion of the rotating shaft 1166 is provided with a recess 1902 to form the sleeve 1156. The sleeve 1156 is used to receive an upper end of the rotating shaft 1168 of the fourth valve body 1138, such that the third valve body 1136 and the fourth valve body 1138 can rotate about the same second axis Y.

The third valve body main body 1933 is substantially in the shape of a spherical shell, and is disposed around the rotating shaft 1166. A connecting plate 1904 is provided at a lower portion of the third valve body main body 1933. The third valve body main body 1933 is fixedly connected to the rotating shaft 1166 by the connecting plate 1904. The third valve body main body 1933 is provided with two openings 1962, 1964. The two openings 1962, 1964 are configured such that when the third valve body 1136 rotates, at least one of the two openings 1962, 1964 can be selectively aligned with the pump outlet housing opening 1369, the seventh housing opening 1367 and/or the eighth housing opening 1368 on the wall of the second cavity 1114, in order to connect and disconnect the pump outlet housing opening 1369, the seventh housing opening 1367 and the eighth housing opening 1368.

A third engageable and disengageable actuated structure 1955 is provided at the lower portion of the rotating shaft 1166. The third engageable and disengageable actuated structure 1955 comprises a third valve body plate 1912. One end of the third valve body plate 1912 is connected to the lower portion of the rotating shaft 1166, the other end of the third valve body plate 1912 is provided with a third groove 1922. The third groove 1922 is arranged in a radial direction of the third valve body 1136. When the actuating shaft 1118 rotates within the third angle range, the third rod 1443 on the actuating shaft 1118 can engage with the third groove 1922 on the third valve body 1136.

Figure 20:
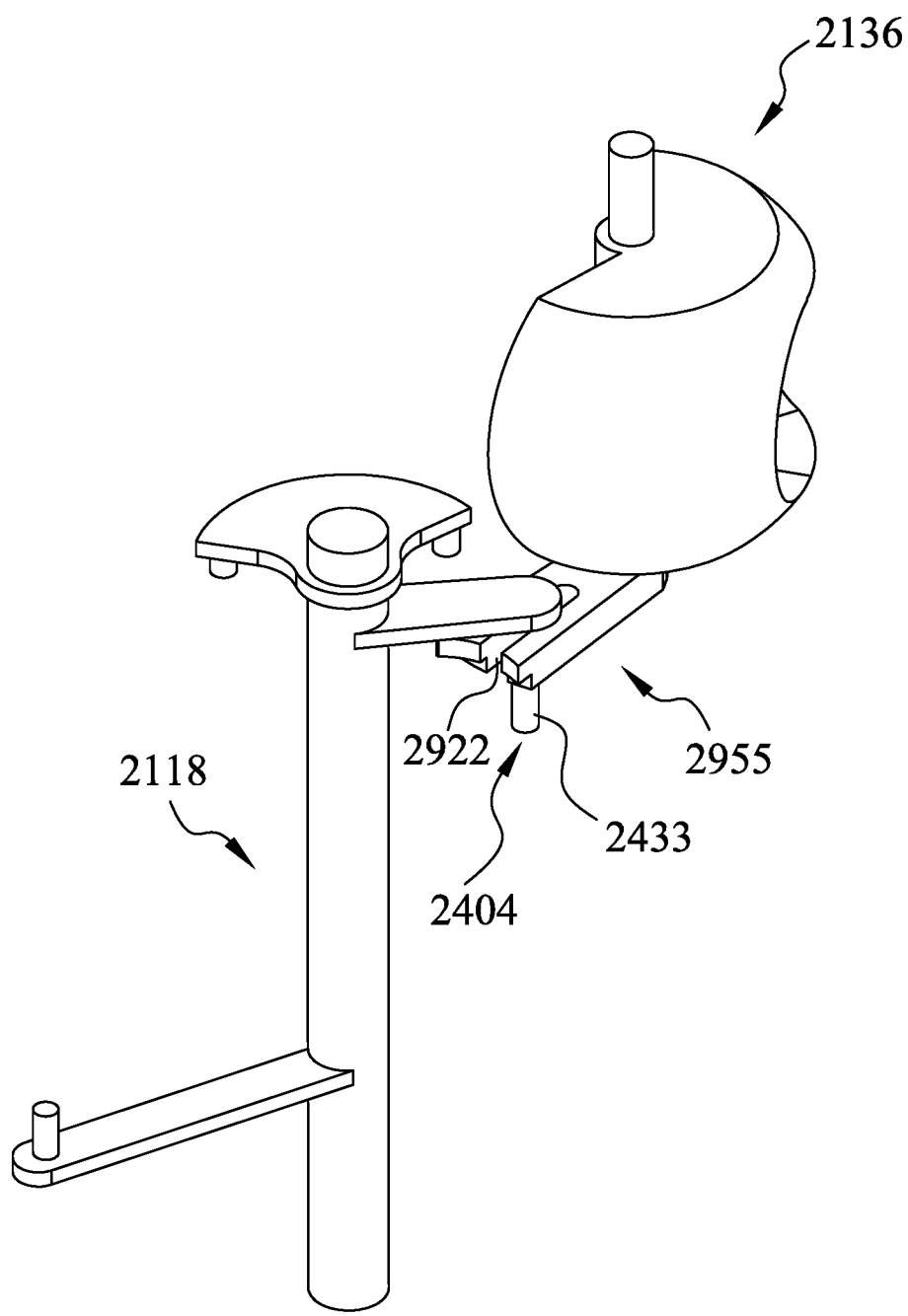
FIG. 20 is a schematic view of a cooperation relationship between the third valve body and the actuating shaft.

FIG. 20 is a schematic view of a cooperation relationship between the third valve body 1136 and the actuating shaft 1118, exemplarily showing one of the states when the third engageable and disengageable actuating structure 1404 engages with the third engageable and disengageable actuated structure 1955. As shown in FIG. 20, when the actuating shaft 1118 rotates within the third angle range, the third rod 1443 on the actuating shaft 1118 engages with the third groove 1922 on the third valve body 1136. Thereby, the actuating shaft 1118 can drive the third valve body 1136 to rotate within the third angle range.

It should be noted that fourth valve body 1138 is sleeved on the fourth valve body 1138, but due to the friction between the third valve body 1136 and the fourth valve body 1138, when the third valve body 1136 rotates, the fourth valve body 1138 does not rotate with the rotation of the second valve body 1134.

Figure 21A:
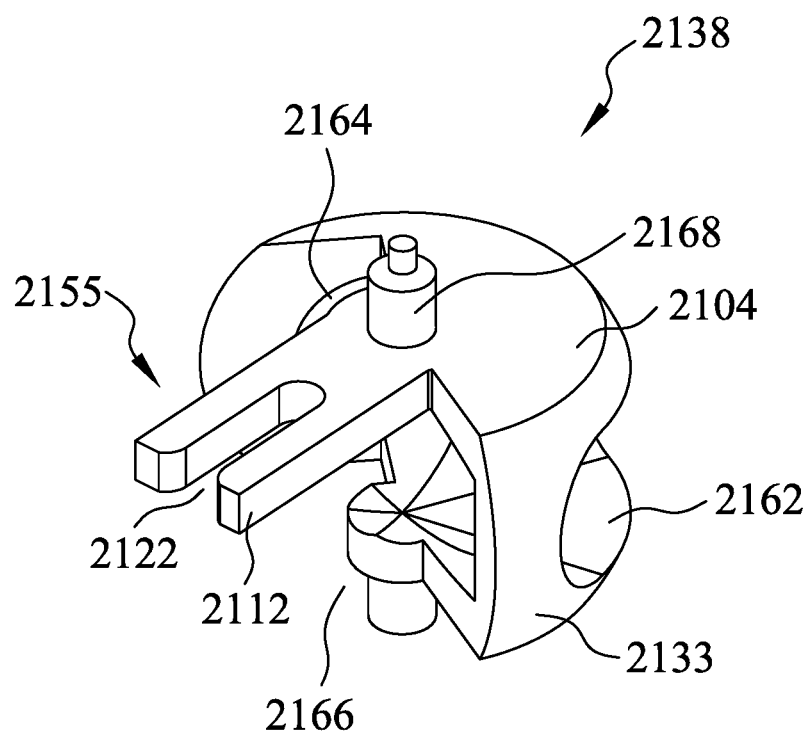
FIG. 21A is a perspective view of a fourth valve body shown in FIG. 11B as viewed from top to bottom at an angle.
Figure 21B:
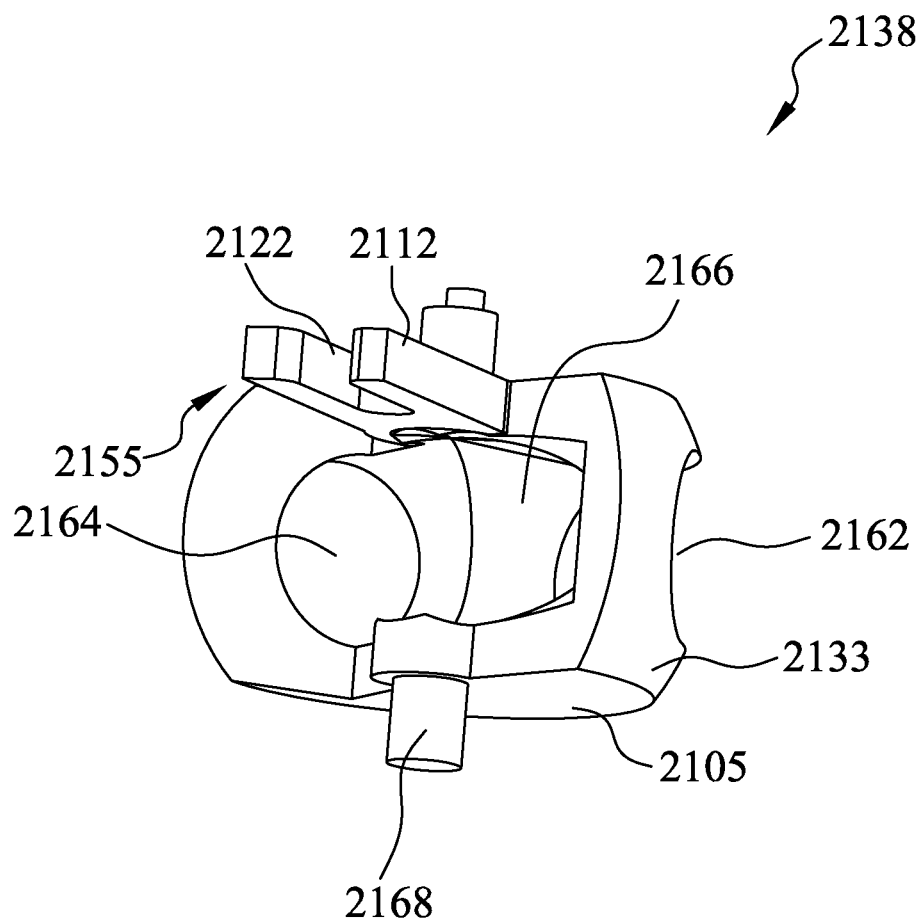
FIG. 21B is a perspective view of the fourth valve body shown in FIG. 11B as viewed from bottom to top at another angle.

FIG. 21A is a perspective view of the fourth valve body 1138 shown in FIG. 11B as viewed from top to bottom at an angle. FIG. 21B is a perspective view of the fourth valve body 1138 shown in FIG. 11B as viewed from bottom to top at another angle. As shown in FIGS. 21A and 21B, the fourth valve body 1138 comprises a fourth valve body main body 2133 and the rotating shaft 1168. The top of the rotating shaft 1166 is stepped, such that the top of the rotating shaft 1166 can be received by the sleeve 1156 at the lower portion of the third valve body 1136, and the third valve body 1136 and the fourth valve body 1138 can rotate about the same second axis Y.

The fourth valve body main body 2133 is substantially in the shape of a spherical shell, and is disposed around the rotating shaft 1168. Connecting plates 2104, 2105 are respectively provided at an upper portion and a lower portion of the fourth valve body main body 2133 and are fixedly connected to the rotating shaft 1168. The fourth valve body main body 2133 is provided with three openings 2162, 2164, 2166, and the three openings 2162, 2164, 2166 are configured such that when the fourth valve body 1138 rotates, at least one of the three openings 2162, 2164, 2166 can be selectively aligned with the fourth housing opening 1364 on the wall of the first cavity 1112, to connect and disconnect the fourth housing opening 1364.

A fourth engageable and disengageable actuated structure 2155 is provided at an upper portion of the rotating shaft 1168. The fourth engageable and disengageable actuated structure 2155 comprises a fourth valve body plate 2112. One end of the fourth valve body plate 2112 is connected to the upper portion of the rotating shaft 1168, the other end of the fourth valve body plate 2112 is provided with a fourth groove 2122, and the fourth groove 2122 is arranged in a radial direction of the fourth valve body 1138. When the actuating shaft 1118 rotates within the fourth angle range, the third rod 1443 on the actuating shaft 1118 can engage with the fourth groove 2122 on the fourth valve body 1138.

Figure 22:
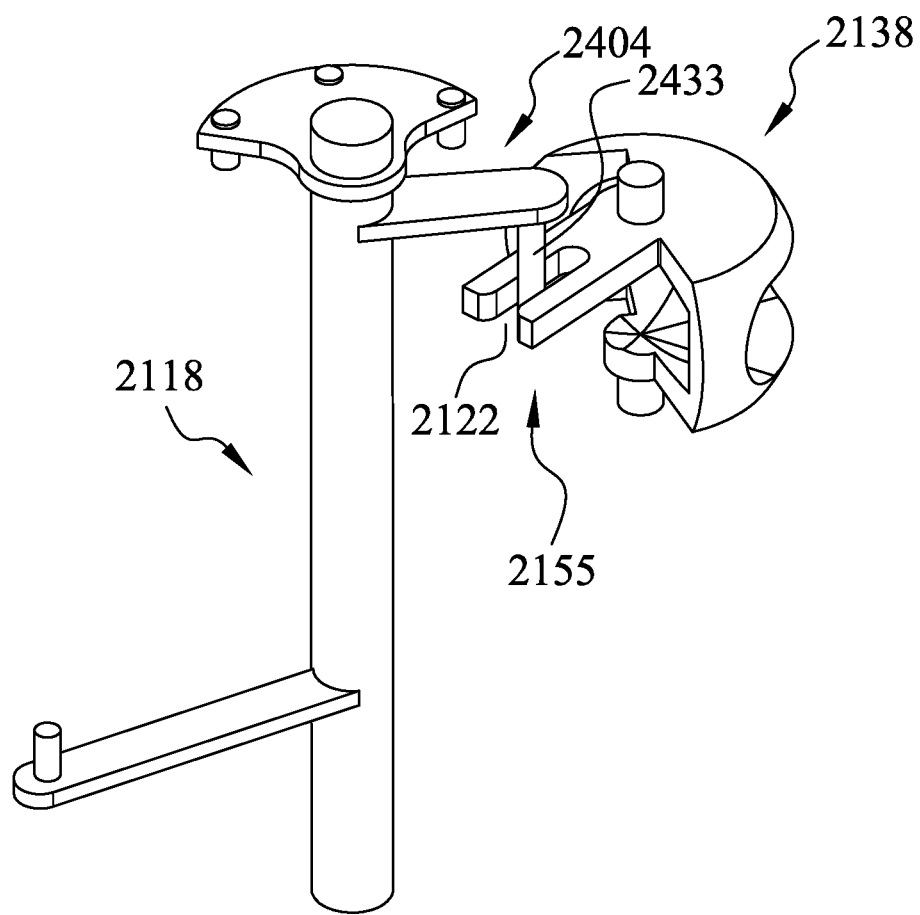
FIG. 22 is a schematic view of a cooperation relationship between the fourth valve body and the actuating shaft.

FIG. 22 is a schematic view of a cooperation relationship between the fourth valve body 1138 and the actuating shaft 1118, exemplarily showing one of the states when the third engageable and disengageable actuating structure 1404 engages with the fourth engageable and disengageable actuated structure 2155. As shown in FIG. 22, when the actuating shaft 1118 rotates within the fourth angle range, the third rod 1443 on the actuating shaft 1118 engages with the fourth groove 2122. Thereby, the actuating shaft 1118 can drive the fourth valve body 1138 to rotate within the fourth angle range.

It should be noted that the fourth valve body 1138 is sleeved on the fourth valve body 1138, but due to the friction between the third valve body 1136 and the fourth valve body 1138, when the fourth valve body 1138 rotates, the third valve body 1136 does not rotate with the rotation of the fourth valve body 1138.

It should also be noted that, in the embodiment of the present disclosure, the third engageable and disengageable actuated structure 1955 and the fourth engageable and disengageable actuated structure 2155 respectively cooperate with the third engageable and disengageable actuating structure 1404 to form the third engaging and disengaging structure and the fourth engaging and disengaging structure. However, since groove walls on two sides of the third groove 1922 and groove walls at two ends of the fourth groove 2122 are different in length, the moment for engagement and disengagement of the third engaging and disengaging structure and the fourth engaging and disengaging structure is also different. In the embodiment of the present disclosure, the third engaging and disengaging structure can be engaged when the actuating shaft 1118 rotates within the third angle range, and the fourth engaging and disengaging structure can be engaged when the actuating shaft 1118 rotates within the fourth angle range.

Since the first engaging and disengaging structure, the second engaging and disengaging structure, the third engaging and disengaging structure, and the fourth engaging and disengaging structure in the present disclosure substantially use the way of grooves and rods to achieve engagement and disengagement, in order to clearly illustrate the specific cooperation relationship in the engaging and disengaging structure, the third engaging and disengaging structure is taken as an example in the present disclosure for detailed description below.

FIGS. 23A-23H are schematic views of the third engaging and disengaging structure during operation, showing how the third engaging and disengaging structure achieves engagement and disengagement. Specifically, the third engaging and disengaging structure comprises the third engageable and disengageable actuating structure 1404 and the third engageable and disengageable actuated structure 1955. When the actuating shaft 1118 rotates within the third angle range, the third engageable and disengageable actuating structure 1404 can engage with the third engageable and disengageable actuated structure 1955, so as to drive the third engageable and disengageable actuated structure 1955 to rotate together. When the actuating shaft 1118 rotates beyond the third angle range, the third engageable and disengageable actuating structure 1404 is disengaged from the third engageable and disengageable actuated structure 1955, so as not to drive the third engageable and disengageable actuated structure 1955 to rotate. FIGS. 23A-23H schematically show the relative positional relationships among the shaft rod 1401 of the actuating shaft 1118, the third transversal arm 1442, and the third rod 1443. When the actuating shaft 1118 rotates, the shaft rod 1401, the third transversal arm 1442, and the third rod 1443 rotate together about the third axis Z. FIGS. 23A-23H also schematically show the relative positional relationships among the rotating shaft 1166 of the third valve body 1136, the third valve body plate 1912, and the third groove 1922. When the third valve body 1136 rotates, the rotating shaft 1166, the third valve body plate 1912, and the third groove 1922 rotate together about the second axis Y.

Figure 23A:
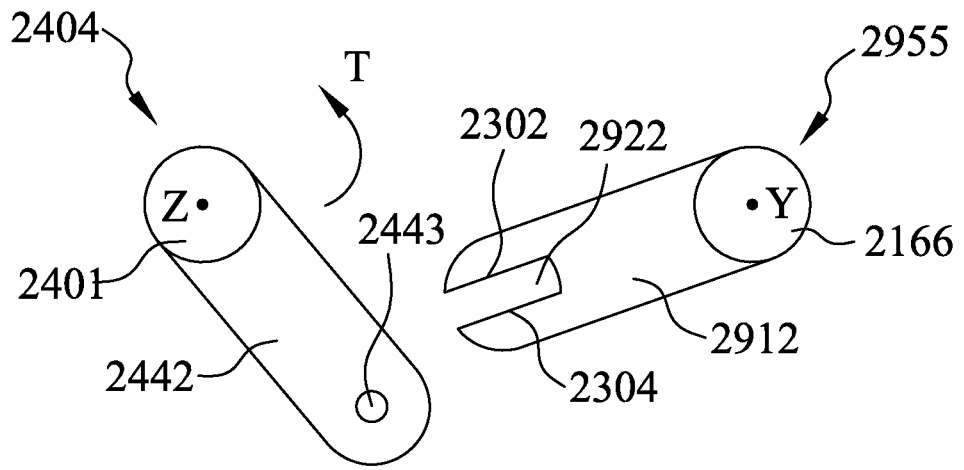
FIGS. 23A-23H are schematic views of a third engaging and disengaging structure during operation.

FIG. 23A shows the relative positional relationship between the third engageable and disengageable actuating structure 1404 and the third engageable and disengageable actuated structure 1955 when the actuating shaft 1118 has not yet rotated to an initial angle of the third angle range. Specifically, the actuator drives the actuating shaft 1118 to rotate counterclockwise (for example, as indicated by an arrow T in FIG. 23A), such that the third engageable and disengageable actuating structure 1404 also rotates counterclockwise. The third engageable and disengageable actuated structure 1955 stays in a first position because it is not driven by the actuator.

Figure 23B:
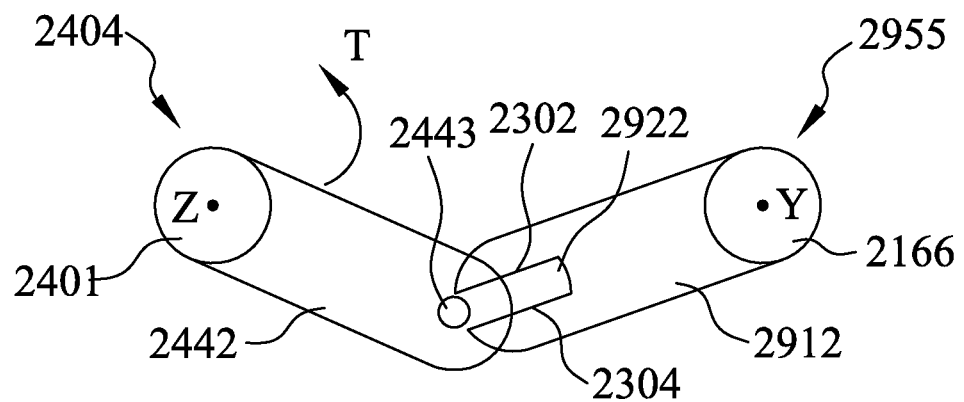

FIG. 23B shows the relative positional relationship between the third engageable and disengageable actuating structure 1404 and the third engageable and disengageable actuated structure 1955 when the actuating shaft 1118 rotates to a first boundary angle of the third angle range. Specifically, when the actuating shaft 1118 rotates counterclockwise to the initial angle of the third angle range, the third rod 1443 of the actuating shaft 1118 contacts a first side wall 2302 of the third groove 1922, such that the third rod 1443 is received in the third groove 1922.

Figure 23C:
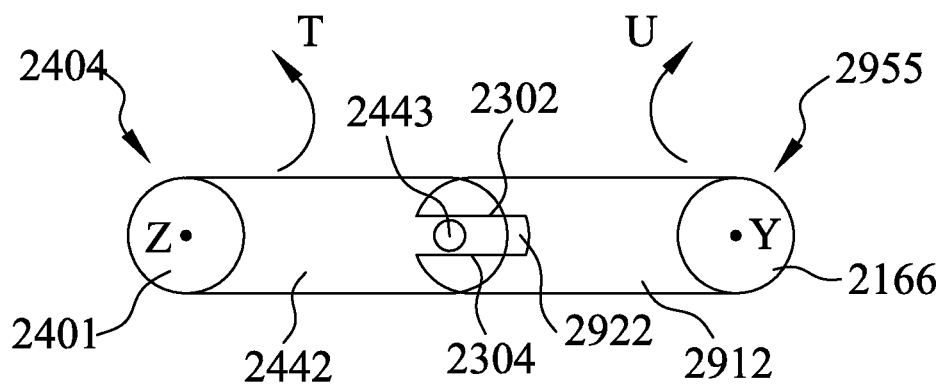

FIG. 23C shows the relative positional relationship between the third engageable and disengageable actuating structure 1404 and the third engageable and disengageable actuated structure 1955 when the actuating shaft 1118 rotates counterclockwise within the third angle range. Specifically, when the actuating shaft 1118 continues to rotate counterclockwise, the third rod 1443 pushes the first side wall 2302 of the third groove 1922, such that the third valve body plate 1912 rotates. Thereby, the third engageable and disengageable actuating structure 1404 drives the third engageable and disengageable actuated structure 1955 to rotate clockwise (for example, as indicated by an arrow U in FIG. 23C).

Figure 23D:
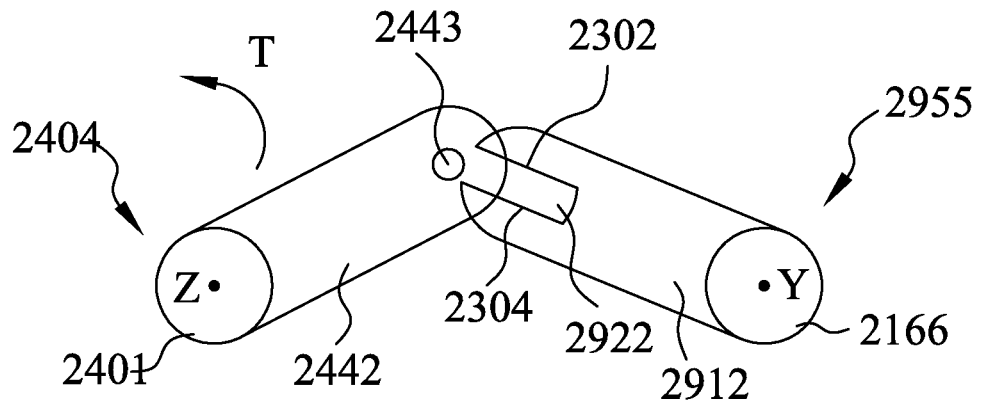
Figure 23E:
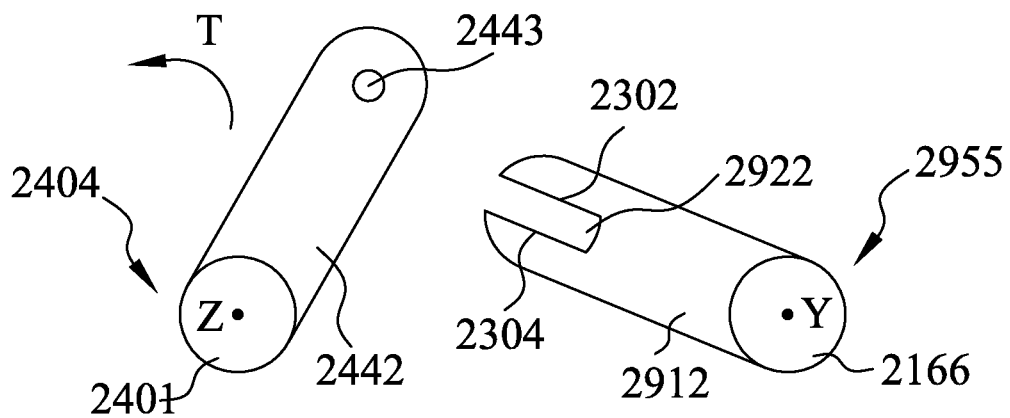

FIG. 23D shows that, when the actuating shaft 1118 rotates to a second boundary angle of the third angle range, the third engageable and disengageable actuating structure 1404 is disengaged from the third engageable and disengageable actuated structure 1955. FIG. 23E shows that, when the actuating shaft 1118 rotates beyond the third angle range, the third engageable and disengageable actuating structure 1404 is disengaged from the third engageable and disengageable actuated structure 1955. Specifically, when the actuating shaft 1118 continues to rotate counterclockwise, the third rod 1443 is disengaged from the third groove 1922, such that the actuating shaft 1118 continues to rotate counterclockwise while the third engageable and disengageable actuated structure 1955 retains in a second position. That is, at this time, the third engageable and disengageable actuating structure 1404 cannot drive the third engageable and disengageable actuated structure 1955 to rotate.

Figure 23F:
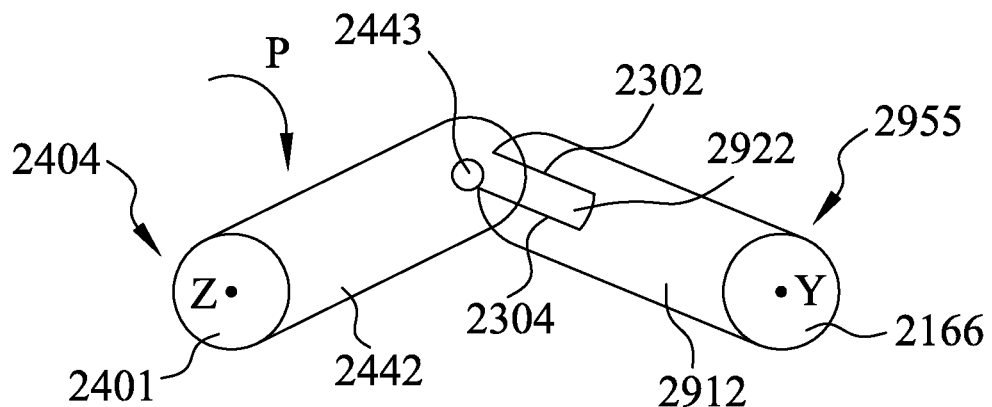

FIG. 23F shows the relative positional relationship between the third engageable and disengageable actuating structure 1404 and the third engageable and disengageable actuated structure 1955 when the actuating shaft 1118 rotates to the second boundary angle of the third angle range.

Specifically, when the actuating shaft 1118 rotates clockwise (for example, as indicated by an arrow P in FIG. 23F), the third engageable and disengageable actuating structure 1404 also rotates clockwise. The third rod 1443 of the actuating shaft 1118 contacts a second side wall 2304 of the third groove 1922, such that the third rod 1443 is received in the third groove 1922.

Figure 23G:
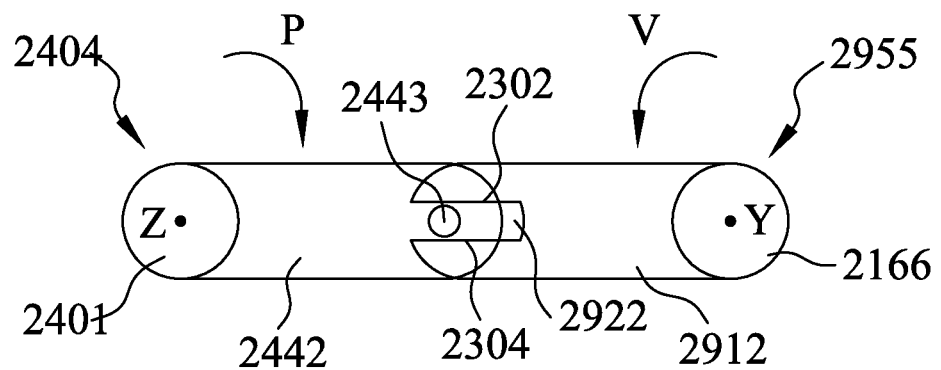

FIG. 23G shows the relative positional relationship between the third engageable and disengageable actuating structure 1404 and the third engageable and disengageable actuated structure 1955 when the actuating shaft 1118 rotates clockwise within the third angle range. Specifically, when the actuating shaft 1118 continues to rotate clockwise, the third rod 1443 pushes the second side wall 2304 of the third groove 1922, such that the third valve body plate 1912 rotates. Thereby, the third engageable and disengageable actuating structure 1404 drives the third engageable and disengageable actuated structure 1955 to rotate counter-clockwise (for example, as indicated by an arrow V in FIG. 23G).

Figure 23H:
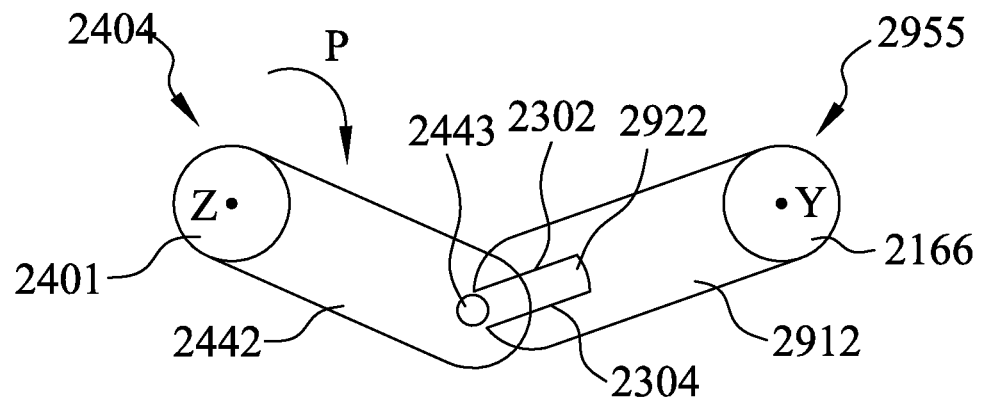

FIG. 23H shows that, when the actuating shaft 1118 rotates to the first boundary angle of the third angle range, the third engageable and disengageable actuating structure 1404 is disengaged from the third engageable and disengageable actuated structure 1955. Specifically, when the actuating shaft 1118 continues to rotate clockwise, the third rod 1443 is disengaged from the third groove 1922, such that the actuating shaft 1118 continues to rotate clockwise while the third engageable and disengageable actuated structure 1955 retains in the first position. That is, at this time, the third engageable and disengageable actuating structure 1404 cannot drive the third engageable and disengageable actuated structure 1955 to rotate.

valve body 1134, a third valve body 1136 and a fourth valve body 1138, as well as a first engaging and disengaging structure, a second engaging and disengaging structure, a third engaging and disengaging structure and a fourth engaging and disengaging structure can be configured such that: a valve body opening portion on the first valve body 1132 can cooperate with a first housing opening 1361 and a second housing opening 1362, so that the valve body opening portion on the first valve body 1132 can selectively open at least one of the first housing opening 1361 and the second housing opening 1362; a valve body opening portion on the second valve body 1134 can cooperate with a third housing opening 1363 and a sixth housing opening 1366, so that the valve body opening portion on the second valve body 1134 can selectively open at least one of the third housing opening 1363 and the sixth housing opening 1366; a valve body opening portion on the third valve body 1136 can cooperate with a seventh housing opening 1367 and an eighth housing opening 1368, so that the valve body opening portion on the third valve body 1136 can selectively open at least one of the seventh housing opening 1367 and the eighth housing opening 1368; and a valve body opening portion on the fourth valve body 1138 can cooperate with a fifth housing opening 1365, so that the valve body opening portion on the fourth valve body 1138 can selectively open the fifth housing opening 1365.

When the actuating shaft 1118 rotates, one or more of the first valve body 1132, the second valve body 1134, the third valve body 1136, and the fourth valve body 1138 can be selectively actuated to rotate, so that different fluid passages are formed inside a valve 1100. As an example, the valve 1100 can achieve multiple fluidly connection relationships as shown in Table 1.

TABLE 1

| No | First housing opening 1361 | Second housing opening 1362 | Third housing opening 1363 | Fourth housing opening 1364 | Fifth housing opening 1365 | Sixth housing opening 1366 | Seventh housing opening 1367 | Eighth housing opening 1368 |
|---|---|---|---|---|---|---|---|---|
| 1 | o | o | o | o | o | x | o | o |
| 2 | o | o | R | o | o | R | o | o |
| 3 | o | o | x | o | x | R | o | x |
| 4 | o | o | x | o | x | o | o | x |
| 5 | o | o | x | o | o | o | o | x |
| 6 | R | x | x | o | o | o | R | x |
| 7 | x | x | x | o | x | o | R | x |
| 8 | x | x | x | o | x | o | x | x |
| 9 | x | o | R | o | x | o | x | x |
| 10 | x | o | o | o | x | x | x | x |

It should be noted that the third angle range is the angle at which the third engageable and disengageable actuating structure 1404 can rotate to engage with the third engageable and disengageable actuated structure 1955 so as to drive the third engageable and disengageable actuated structure 1955 to rotate.

With continued reference to FIGS. 14A-14B, it can be seen that the first engageable and disengageable actuating structure 1402, the second engageable and disengageable actuating structure 1403, and the third engageable and disengageable actuating structure 1404 are provided along different angle directions of the shaft rod 1401. With such arrangement, when the shaft rod 1401 rotates at different angles, the engageable and disengageable actuating structures on the shaft rod 1401 can selectively engage with the engageable and disengageable actuated structures on the valve bodies, thereby driving different valve bodies to rotate.

In the present disclosure, the specific structures and positional relationships of a first valve body 1132, a second The serial numbers 1-10 on the left side of Table 1 indicate that the actuating shaft 1118 rotates at different angles. For example, the serial number 1 indicates that the actuating shaft 1118 rotates at a first angle. It should be noted that, as an example, the serial numbers 1-10 indicate the angles that the actuating shaft 1118 rotates from an initial angle in the same direction. It should also be noted that the actuating shaft 1118 is configured to rotate in both directions (i.e., rotating clockwise and counterclockwise).

The symbol "O" in Table 1 indicates that the communication port is fully connected, that is, the housing opening is aligned with the opening on the valve body, such that the fluid can flow through the entire area of the housing opening. The symbol "R" in Table 1 indicates that the communication port is partially connected, that is, the housing opening is partially aligned with the opening portion on the valve body, such that the fluid can only flow through the portion where the housing opening is aligned with the opening on the valve body. The symbol "x" in Table 1 indicates that the housing opening is disconnected, that is, the housing opening is blocked by the valve body main body, such that the fluid cannot flow through the housing opening. It should be noted that "connected" in the present disclosure includes a fully connected state and a partially connected state.

A plurality of fluid passages can be formed in the valve 1100 by controlling the opening and closing states of the housing openings, and the cooperation between the valve bodies; and each fluid passage is used to connect two corresponding housing openings, so that the external pipes connected to the two corresponding housing openings can be connected through the fluid passage. The plurality of fluid passages in the valve 1100 can be connected or disconnected by controlling the rotation of the respective valve bodies. For example, if the fourth housing opening 1364 listed in Table 1 is used as a fluid inlet of the valve 1100, and the remaining seven housing openings are used as fluid outlets of the valve 1100, there are seven fluid passages in the valve 1100, the seven fluid passages comprising a fluid passage 1, a fluid passage 2, a fluid passage 3, a fluid passage 5, a fluid passage 6, a fluid passage 7, and a fluid passage 8. The fluid passage 1 connects the fourth housing opening 1364 and the first housing opening 1361, the fluid passage 2 connects the fourth housing opening 1364 and the second housing opening 1362, the fluid passage 3 connects the fourth housing opening 1364 and the third housing opening 1363, the fluid passage 5 connects the fourth housing opening 1364 and the fifth housing opening 1365, the fluid passage 6 connects the fourth housing opening 1364 and the sixth housing opening 1366, the fluid passage 7 connects the fourth housing opening 1364 and the seventh housing opening 1367, and the fluid passage 8 connects the fourth housing opening 1364 and the eighth housing opening 1368.

When the valve 1100 is at a first angle, the valve body opening portion on the first valve body 1132 is aligned with the fourth housing opening 1364, so that the first housing opening 151 is opened; the valve body opening portion on the first valve body 1132 is aligned with the second housing opening 1362, so that the second housing opening 1362 is opened; the valve body opening portion on the second valve body 1134 is aligned with the third housing opening 1363, so that the third housing opening 1363 is opened; the valve body opening portion on the fourth valve body 1138 is aligned with the fifth housing opening 1365, so that the fifth housing opening 1365 is opened; the valve body opening portion on the third valve body 1136 is aligned with the seventh housing opening 1367, so that the seventh housing opening 1367 is opened; the valve body opening portion on the third valve body 1136 is aligned with the eighth housing opening 1368, so that the eighth housing opening 1368 is opened; and the valve body opening portion on the second valve body 1134 is not aligned with the sixth housing opening 1366, so that the sixth housing opening 1366 is closed or blocked. At this time, the fluid passage 1 that connects the fourth housing opening 1364 and the first housing opening 1361 is connected, the fluid passage 2 that connects the fourth housing opening 1364 and the second housing opening 1362 is connected, the fluid passage 3 that connects the fourth housing opening 1364 and the third housing opening 1363 is connected, the fluid passage 5 that connects the fourth housing opening 1364 and the fifth housing opening 1365 is connected, the fluid passage 7 that connects the fourth housing opening 1364 and the seventh housing opening 1367 is connected, the fluid passage 8 that connects the fourth housing opening 1364 and the eighth housing opening 1368 is connected, while the fluid passage 6 that connects the fourth housing opening 1364 and the sixth housing opening 1366 is disconnected.

When the valve 1100 is at a second angle, the valve body opening portion on the first valve body 1132 is aligned with the fourth housing opening 1364, so that the first housing opening 151 is opened; the valve body opening portion on the first valve body 1132 is aligned with the second housing opening 1362, so that the second housing opening 1362 is opened; the valve body opening portion on the second valve body 1134 is aligned with the third housing opening 1363, so that the third housing opening 1363 is opened; the valve body opening portion on the fourth valve body 1138 is aligned with the fifth housing opening 1365, so that the fifth housing opening 1365 is opened; the valve body opening portion on the second valve body 1134 is aligned with the sixth housing opening 1366, so that the sixth housing opening 1366 is opened; the valve body opening portion on the third valve body 1136 is aligned with the seventh housing opening 1367, so that the seventh housing opening 1367 is opened; and the valve body opening portion on the third valve body 1136 is aligned with the eighth housing opening 1368, so that the eighth housing opening 1368 is opened. At this time, the fluid passage 1 that connects the fourth housing opening 1364 and the first housing opening 1361 is connected, the fluid passage 2 that connects the fourth housing opening 1364 and the second housing opening 1362 is connected, the fluid passage 3 that connects the fourth housing opening 1364 and the third housing opening 1363 is connected, the fluid passage 5 that connects the fourth housing opening 1364 and the fifth housing opening 1365 is connected, the fluid passage 6 that connects the fourth housing opening 1364 and the sixth housing opening 1366 is connected, the fluid passage 7 that connects the fourth housing opening 1364 and the seventh housing opening 1367 is connected, and the fluid passage 8 that connects the fourth housing opening 1364 and the eighth housing opening 1368 is connected.

Similarly, when the valve 1100 is at the third to tenth angles, the connected and disconnected states of each fluid passage in the valve 1100 can be obtained according to Table 1.

It should be noted that the valve 1100 in the embodiment shown in FIGS. 11A to 24 is not limited to the above disclosure. According to the needs of a cooling path of a cooling system, a variety of fluid passages can be formed in the valve 1100 by configuring a power device such as a pump, so that the valve 1100 is used as a switching device of the cooling path to achieve the purpose of switching the cooling path.

Although the way of grooves and rods is used to achieve an engaging and disengaging structure in the present disclosure, those skilled in the art can understand that other cooperative ways to achieve such engagement and disengagement (for example, a clasping device, a gear engagement device) also fall within the scope of protection of the present disclosure.

The valve 1100 in the present disclosure can switch different passages for the fluid and can also control the flow of each passage by the arrangement of the openings on the valve bodies and the housing openings. With such arrangement, a control assembly in the system can switch different passages for the fluid by controlling less elements, and the stability of system control can be enhanced while integrated control is achieved.

In order to ensure the leakproofness between the housing openings and the valve bodies when each housing opening in the valve 1100 is not aligned with the opening on the valve body (that is, the housing opening is closed), the valve 1100 further comprises a first group of sealing elements and a second group of sealing elements. Each of the first group of sealing elements is disposed between the first valve body 1132, the second valve body 1134 or the fourth valve body 1138 and each of the first group of housing openings. Each of the first group of sealing elements is configured to abut against the cavity wall where each of the first group of housing openings is located, such that when the valve body rotates, the first group of sealing elements can abut against the cavity wall and does not rotate with the rotation of the valve body. The second group of sealing elements include two sealing elements, one of the two sealing elements is disposed between the seventh housing opening 1367 and the third valve body 1136, and the other one of the two sealing elements is disposed between the eighth housing opening 1368 and the third valve body 1136. Since the pump outlet housing opening 1369 in the second group of housing openings is connected to the outlet of the pump, no sealing element is provided there.

When the valve body rotates, because of the friction between the valve body and the sealing element, the actuator that drives the valve body to rotate requires a larger driving force to drive the valve body to rotate, so as to overcome the friction between the valve body and the sealing element. When the conventional valve drives one or more valve bodies to rotate, the actuating shaft of the valve needs to overcome the friction generated by the relative movement of all the sealing elements and the valve bodies provided in the housing, such that the required power of the actuator is relatively large.

The valve 1100 in the present disclosure also has the following advantages: when the fluid passage required in the valve 1100 can be realized by the rotation of the valve body on one side of the actuating shaft 1118, since the valve body on the other side does not rotate, there is no friction between the non-rotating valve body and the sealing element, the driving force provided by the actuator is reduced, and it is only required to provide the power to overcome the friction produced by the valve body which needs to be rotated by the actuating shaft 1118. The states of the valve bodies in the valve 1100 at the serial numbers 8-10 in Table 1 will be described below as an example.

Figure 24:
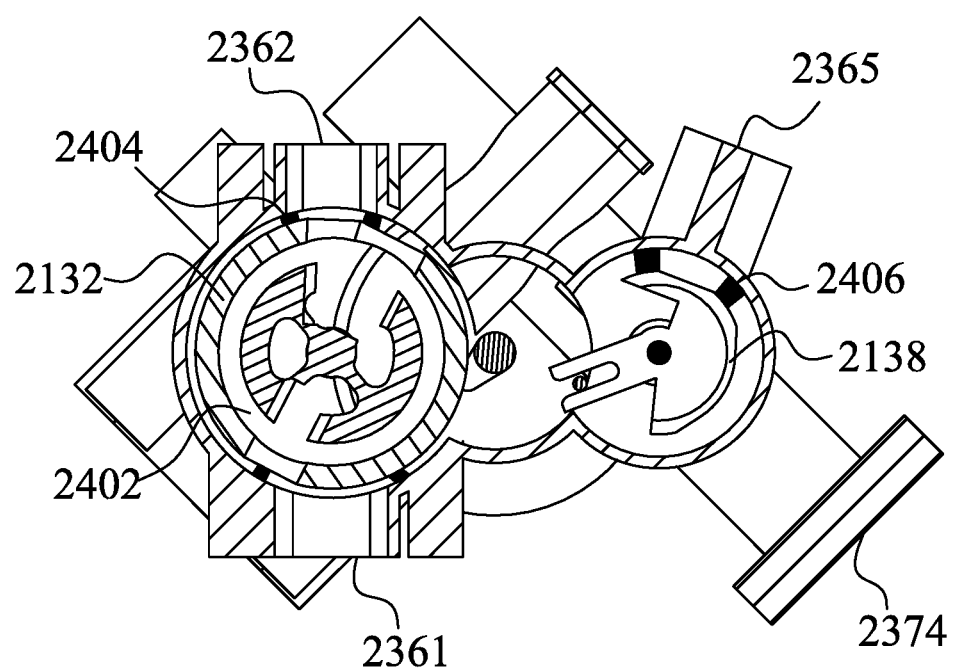
FIG. 24 is a schematic view of the regulating valve shown in FIG. 11A cut to a first housing opening and a second housing opening in a horizontal direction.

FIG. 24 is a schematic view of the valve 1100 shown in FIG. 11A cut to the first housing opening 1361 and the second housing opening 1362 in the horizontal direction. FIG. 24 shows a first sealing element 2402 disposed between the first valve body 1132 and the first housing opening 1361, a second sealing element 2404 disposed between the first valve body 1132 and the second housing opening 1362, and a third sealing element 2406 disposed between the fourth valve body 1138 and the fifth housing opening 1365. When the actuating shaft 1118 rotates within the angle range shown in the serial numbers 8-10, only the first valve body 1132 and the second valve body 1134 need to be rotated, so the actuator for driving the actuating shaft 1118 to rotate only needs to provide what can overcome the friction of the sealing elements on the first valve body 1132 and the second valve body 1134.

Figure 25A:
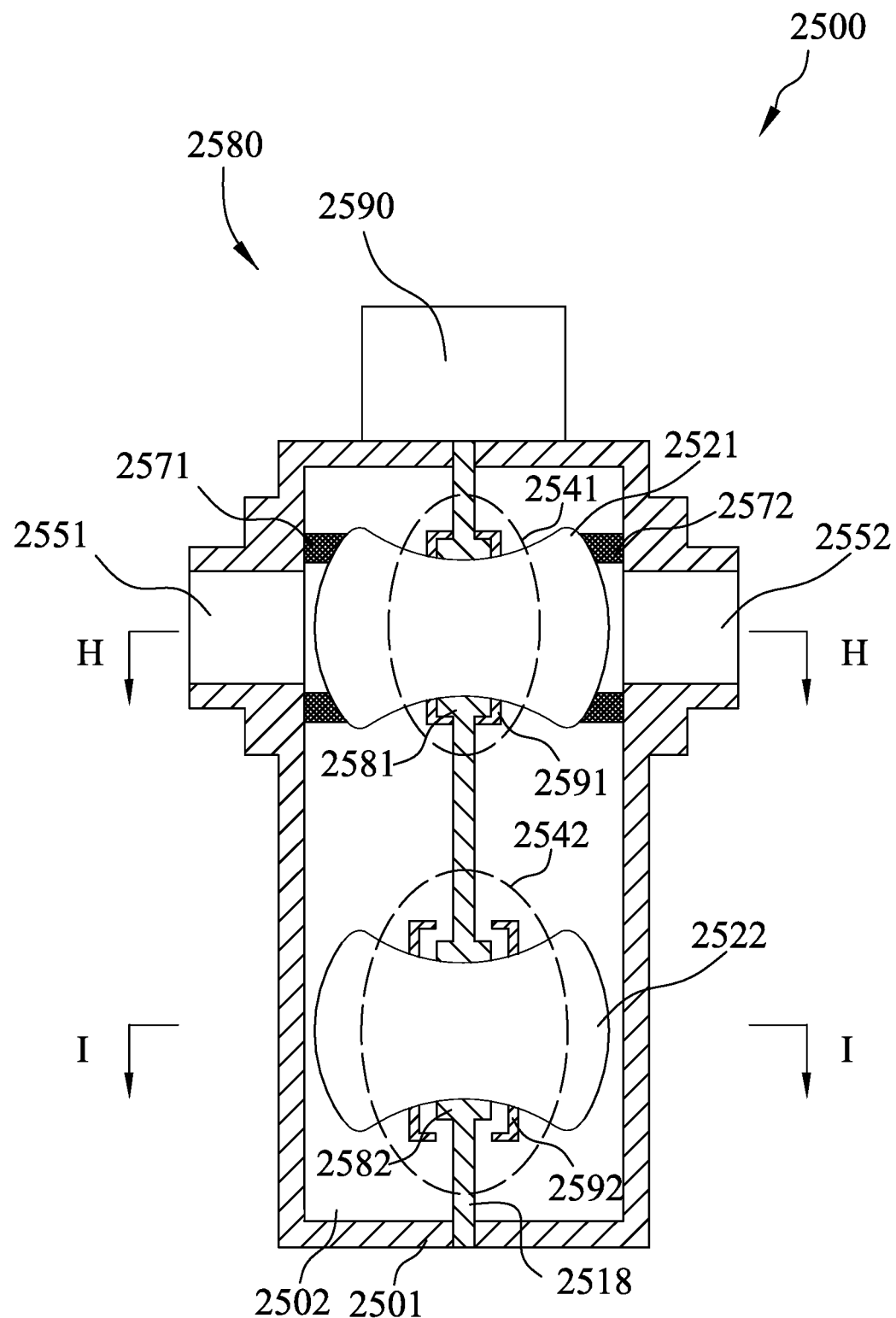
FIG. 25A is a side perspective structural diagram of a ninth embodiment of a valve according to the present disclosure.
Figure 25B:
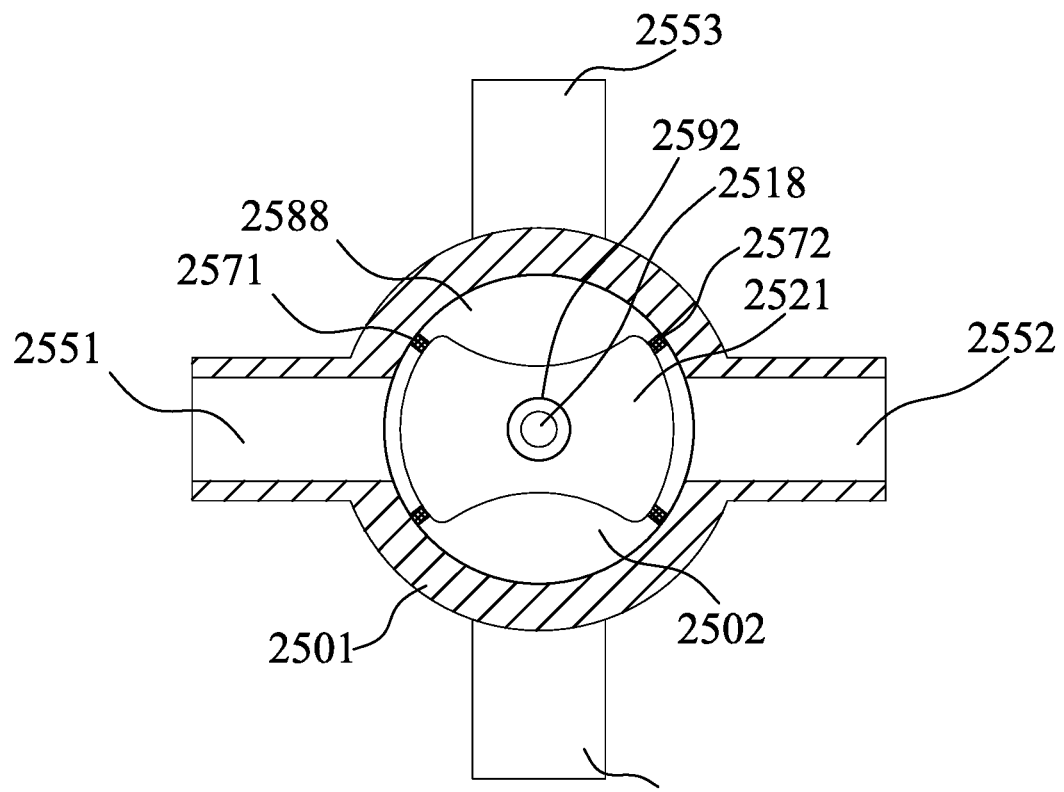
FIG. 25B is a cross-sectional view of the valve shown in FIG. 25A taken along a line H-H in FIG. 25A.
Figure 25C:
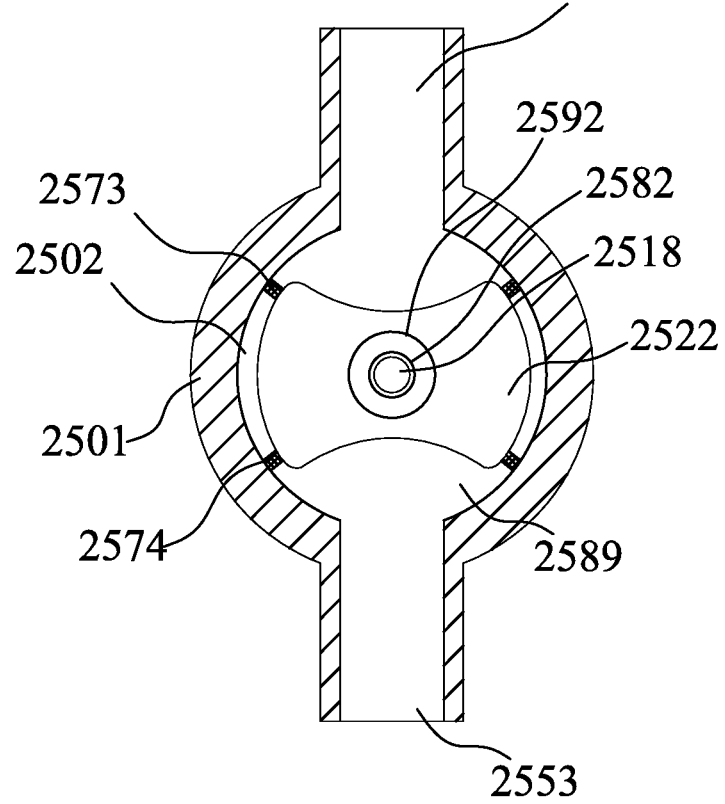
FIG. 25C is a cross-sectional view of the valve shown in FIG. 25A taken along a line I-I in FIG. 25A.

It should be noted that, in the embodiments shown in FIG. 1A to FIG. 24, the valve body opening portion on each valve body forms a valve body acting portion, which is used to cooperate with a corresponding housing opening in the plurality of housing openings when the actuated valve body element rotates at a predetermined angle, thereby selectively connecting at least one fluid passage. In other embodiments, the valve body acting portion may also be a valve body blocking portion, which is used to cooperate with at least one of the plurality of housing openings when the actuated valve body element rotates at a predetermined angle, so that the valve body blocking portion selectively blocks at least one of the plurality of housing openings, thereby selectively disconnecting at least one fluid passage. FIGS. 25A-25C will be described below as an example:

FIG. 25A is a side perspective structural diagram of a ninth embodiment of a valve according to the present disclosure. FIG. 25B is a cross-sectional view of the valve 2500 shown in FIG. 25A taken along a line H-H in FIG. 25A. FIG. 25C is a cross-sectional view of the valve 2500 shown in FIG. 25A taken along a line I-I in FIG. 25A, showing another embodiment of an acting portion of a valve body element. As shown in FIGS. 25A-25C, the valve 2500 comprises a housing 2501. The housing 2501 is substantially cylindrical, and has a housing cavity 2502 therein. The housing 2501 is provided with four housing openings, respectively a first housing opening 2551, a second housing opening 2552, a third housing opening 2553, and a fourth housing opening 2554. The housing cavity 2502 can fluidly connect the outside of the valve 2500 through any one of the first housing opening 2551, the second housing opening 2552, the third housing opening 2553, and the fourth housing opening 2554. The first housing opening 2551 and the second housing opening 2552 are arranged at the same height on left and right sides of the housing 2501, and the third housing opening 2553 and the fourth housing opening 2554 are arranged at the same height on front and back sides of the housing 2501 relative to the housing 2501.

The valve 2500 further comprises an actuating device 2580. The actuating device 2580 comprises an actuator 2590 and an actuating shaft 2518. The actuator 2590 is disposed outside the housing 2501. The actuating shaft 2518 is disposed in the housing 2501 along a height direction and is connected to the actuator 2590. The actuator 2590 can actuate the actuating shaft 118 to rotate.

The valve 2500 further comprises a first valve body 121 and a second valve body 122. The first valve body 121 is arranged substantially at the same height as the first housing opening 151 and the second housing opening 152, and the second valve body 122 is arranged substantially at the same height as the third housing opening 153 and the fourth housing opening 154. The first valve body 121 and the second valve body 122 are substantially rectangular bodies, and the waists thereof are recessed portions, so that a gap cavity 2588 is formed between the first valve body 121 and the housing 2501, and a gap cavity 2589 is formed between the second valve body 122 and the housing 2501.

The valve 2500 further comprises sealing elements 2571, 2572, 2573, 2574. The sealing elements 2571, 2572, 2573, 2574 are respectively disposed in the housing 2501 and around the housing openings 2551, 2552, 2553, 2554 to seal corresponding gaps between the plurality of housing openings 2551, 2552, 2553, 2554 and one of the plurality of valve bodies 2521, 2522, 2523, 2524.

The valve 2500 further comprises a first engaging and disengaging structure 2541 and a second engaging and disengaging structure 2542. The first engaging and disengaging structure 2541 comprises a first engageable and disengageable actuating structure 2581 and a first engageable and disengageable actuated structure 2591. The first engageable and disengageable actuating structure 2581 is provided on the actuating shaft 2518. The first engagable and disengagable actuated structure 2591 is provided on the first valve body 2521. The first engageable and disengageable actuating structure 2581 and the first engageable and disengageable actuated structure 2591 are configured to cooperate with each other, so that when the actuating shaft 2518 rotates within a first angle range, the first engageable and disengageable actuating structure 2581 on the actuating shaft 2518 can actuate the first valve body 2521 to rotate. The second engaging and disengaging structure 142 comprises a second engageable and disengageable actuating structure 2582 and a second engageable and disengageable actuated structure 2592. The second engageable and disengageable actuating structure 2582 is provided on the actuating shaft 2518. The second engageable and disengageable actuated structure 2592 is provided on the second valve body 2522. The second engageable and disengageable actuating structure 2582 and the second engageable and disengageable actuated structure 2592 are configured to cooperate with each other, so that when the actuating shaft 2518 rotates within a second angle range, the second engageable and disengageable actuating structure 2582 on the actuating shaft 2518 can actuate the second valve body 2522 to rotate.

As an example, the engaging and disengaging structure in FIGS. 25A-25C is a clasping device. The engageable and disengageable actuated structure is provided around the engageable and disengageable actuating structure. When the engageable and disengageable actuated structure clasps the engageable and disengageable actuating structure, the engageable and disengageable actuating structure can actuate the engageable and disengageable actuated structure to rotate. When the engageable and disengageable actuated structure does not clasp the engageable and disengageable actuating structure, the engageable and disengageable actuating structure cannot actuate the engageable and disengageable actuated structure to rotate.

The state shown in FIG. 25B is that the first engageable and disengageable actuated structure 2591 clasps the first engageable and disengageable actuating structure 2581. At this time, the first valve body 2521 blocks the first housing opening 2551 and the second housing opening 2552, so that the first housing opening 2551 and the second housing opening 2552 cannot fluidly connect the housing cavity 2502. In other words, the first housing opening 2551 and the second housing opening 2552 are disconnected.

The state shown in FIG. 25C is that the second engageable and disengageable actuated structure 2592 does not clasp the second engageable and disengageable actuating structure 2582. At this time, the second valve body 2522 does not block the third housing opening 2553 and the fourth housing opening 2554. The third housing opening 2553 and the fourth housing opening 2554 can connect each other through the gap cavity 2589 (that is, bypassing the second valve body 2522).

It can be seen that, in the valve 2500 shown in FIGS. 25A-25C, an acting portion of a valve body element is the valve body itself (that is, the valve body blocking portion). When the valve body blocking portion cooperates with the housing opening, the valve body element can block the housing opening, thereby disconnecting the fluid passage, and forming a fluid passage between the housing openings not blocked by the valve body blocking portion.

It should be noted that the embodiments shown in FIGS. 1A-10 can also open and block the housing openings by using the valve body blocking portions shown in FIGS. 25A-25C, so as to selectively connect or disconnect at least one of a plurality of fluid passages in the valve through the actuated valve body.

Although only some features of the present disclosure are illustrated and described herein, those skilled in the art may make various improvements and changes. Therefore, it should be understood that the appended claims are intended to cover all the foregoing improvements and changes that fall within the substantial spirit and scope of the present disclosure.

We claim:

1. A valve, comprising:
   a housing defining a housing cavity and a plurality of housing openings configured to fluidly connect the housing cavity to an outside of the housing, the plurality of housing openings including at least one inlet to allow a fluid to flow into the housing and at least one outlet to allow the fluid to flow out of the housing;
   an actuating shaft; and
   a plurality of valve body elements disposed in the housing and capable of rotating in the housing to control an opening and closing state of each of the plurality of housing openings, each of the plurality of valve body elements being configured to rotate about a respective axis to control the opening and closing state of at least one housing opening of the plurality of housing openings,
   wherein the actuating shaft is configured to selectively actuate each of the plurality of valve body elements to rotate, such that, when one of the valve body elements of the plurality of valve body elements is actuated, the other one or more valve body elements of the plurality of valve body elements are not actuated,
   wherein the housing cavity is provided with a plurality of flow paths therein, each flow path connecting at least two housing openings of the plurality of housing openings, and actuation of an actuated at least one valve body element connects or disconnects at least one of the plurality of flow paths by controlling the opening and closing state of the corresponding at least one housing opening of the plurality of housing openings, and
   wherein, in a closed state, each of the plurality of valve body elements fluidly isolates the housing cavity from the outside of the of the housing at a respective one or more of the plurality of housing openings.

2. The valve according to claim 1, further comprising:
   a plurality of engaging and disengaging structures, the actuating shaft being configured to selectively engage with or disengage from at least one valve body element in the plurality of valve body elements through at least one of the plurality of engaging and disengaging structures.

3. The valve according to claim 1, characterized in that the plurality of valve body elements are arranged at the same height relative to the actuating shaft.

4. The valve according to claim 1, characterized in that the plurality of valve body elements are arranged at different heights relative to the actuating shaft.

5. The valve according to claim 1, characterized in that each valve body element of the plurality of valve body elements comprises at least one valve body.

6. The valve according to claim 1, characterized in that each valve body element in the plurality of valve body elements is provided with at least one valve body acting portion,
   wherein when the actuated at least one valve body element rotates at a predetermined angle, at least one valve body acting portion of the actuated at least one valve body element cooperates with at least one corresponding housing opening in the plurality of housing openings, thereby selectively connecting at least one flow path of the plurality of flow paths.

7. The valve according to claim 6, characterized in that the at least one valve body acting portion comprises at least one valve body opening portion, and when the actuated at least one valve body element rotates at a predetermined angle, at least one valve body opening portion of the actuated at least one valve body element cooperates with at least one of the plurality of housing openings, so that the at least one valve body opening portion selectively at least partially opens the at least one of the plurality of housing openings to selectively connect the at least one flow path.

8. The valve according to claim 7, characterized in that the valve body opening portion of the at least one valve body acting portion is an inlet or an outlet of a valve body passage in the corresponding valve body element, and the at least one flow path can be connected through the valve body passage.

9. The valve according to claim 6, characterized in that the at least one valve body acting portion comprises at least one valve body blocking portion, and when the actuated at least one valve body element rotates at a predetermined angle, at least one valve body blocking portion of the actuated at least one valve body element cooperates with at least one of the plurality of housing openings, so that the at least one valve body blocking portion selectively blocks the at least one of the plurality of housing openings to selectively disconnect the at least one flow path.

10. The valve according to claim 9, characterized in that when the actuated at least one valve body element rotates at a predetermined angle, the at least one valve body acting portion can be aligned with and cooperate with the at least one of the plurality of housing openings.

11. The valve according to claim 1, further comprising:

a plurality of sealing elements, each of which is disposed between each of the plurality of housing openings and a corresponding one of the plurality of valve body elements.

12. The valve according to claim 2, characterized in that the plurality of engaging and disengaging structures are configured such that: when one of the valve body elements of the plurality of valve body elements engages with the actuating shaft, the other one or more valve body elements of the plurality of valve body elements disengage from the actuating shaft.

13. The valve according to claim 2, characterized in that each of the plurality of engaging and disengaging structures comprises an engageable and disengageable actuating structure and an engageable and disengageable actuated structure, the engageable and disengageable actuating structure is provided on the actuating shaft, and the engageable and disengageable actuated structure is provided on the corresponding one of the plurality of valve body elements.

14. The valve according to claim 2, characterized in that each of the plurality of engaging and disengaging structures comprises an engageable and disengageable actuating structure and an engageable and disengageable actuated structure; and the engageable and disengageable actuating structure is provided on the actuating shaft, and the engageable and disengageable actuated structure is fixedly connected to the corresponding one of the plurality of valve body elements.

15. The valve according to claim 5, characterized in that at least one of the plurality of valve body elements includes a plurality of valve bodies, wherein the plurality of valve bodies are corotated.

* * * * *